US010834375B2

United States Patent
Oh

(10) Patent No.: US 10,834,375 B2
(45) Date of Patent: Nov. 10, 2020

(54) METHOD AND APPARATUS FOR TRANSMITTING AND RECEIVING METADATA FOR COORDINATE SYSTEM OF DYNAMIC VIEWPOINT

(71) Applicant: LG ELECTRONICS INC., Seoul (KR)

(72) Inventor: Sejin Oh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/451,717

(22) Filed: Jun. 25, 2019

(65) Prior Publication Data

US 2020/0014905 A1    Jan. 9, 2020

(30) Foreign Application Priority Data

Jul. 6, 2018    (KR) ........................ 10-2018-0078651

(51) Int. Cl.
    *H04N 7/12*      (2006.01)
    *H04N 13/178*      (2018.01)
    *H04N 13/161*      (2018.01)

(52) U.S. Cl.
CPC ......... *H04N 13/178* (2018.05); *H04N 13/161* (2018.05)

(58) Field of Classification Search
CPC .... H04N 13/178; H04N 13/161; H04N 19/46; H04N 21/21805; H04N 21/26258; H04N 21/84; H04N 21/8456; H04N 21/235; H04N 21/816; H04N 19/00; H04N 13/117; H04N 13/139
See application file for complete search history.

(56) References Cited

U.S. PATENT DOCUMENTS

| 2014/0043340 | A1 | 2/2014 | Sobhy et al. |
| 2019/0014305 | A1* | 1/2019 | Wang ..................... H04N 19/70 |
| 2019/0158825 | A1* | 5/2019 | Ma ......................... H04N 19/105 |
| 2019/0306530 | A1* | 10/2019 | Fan ....................... H04N 19/167 |
| 2019/0387212 | A1* | 12/2019 | Oh ........................ G06T 3/0031 |

FOREIGN PATENT DOCUMENTS

| KR | 10-2017-0001869 | A | | 1/2017 | | |
| KR | 20180029473 | A | * | 3/2018 | ............ | G06T 11/60 |
| KR | 20180040507 | A | * | 4/2018 | ............ | G06T 19/20 |
| KR | 1020180038256 | A | | 4/2018 | | |
| WO | 2017082078 | A1 | | 5/2017 | | |
| WO | 2017142353 | A1 | | 8/2017 | | |
| WO | 2018038523 | A1 | | 3/2018 | | |

* cited by examiner

*Primary Examiner* — Richard T Torrente
(74) *Attorney, Agent, or Firm* — Dentons US LLP

(57) ABSTRACT

A 360-degree video data processing method performed by a 360-degree video reception apparatus according to an embodiment of the present invention includes: receiving information on 360-degree video data; obtaining information on an encoded picture and metadata from the information on the 360-degree video data; decoding the encoded picture based on the information on the encoded picture; and rendering the decoded picture based on the metadata, wherein the metadata comprises a dynamic global coordinate system rotation flag representing whether relative rotation angles between a common reference coordinate system of a dynamic viewpoint and a global coordinate system are changed.

11 Claims, 27 Drawing Sheets

FIG. 9A
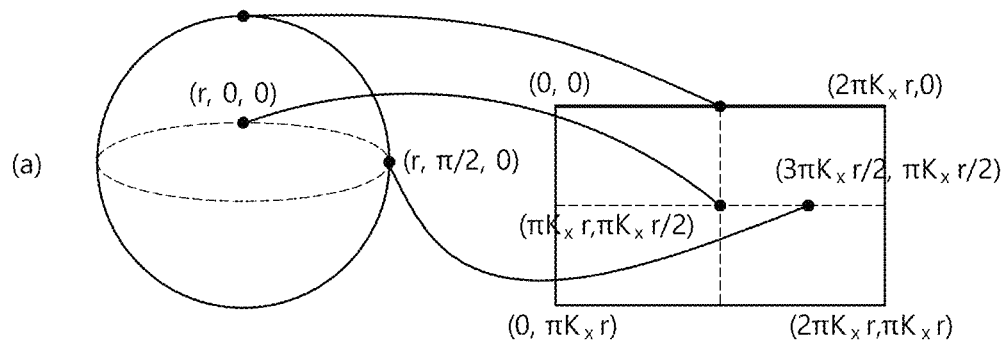
(a)
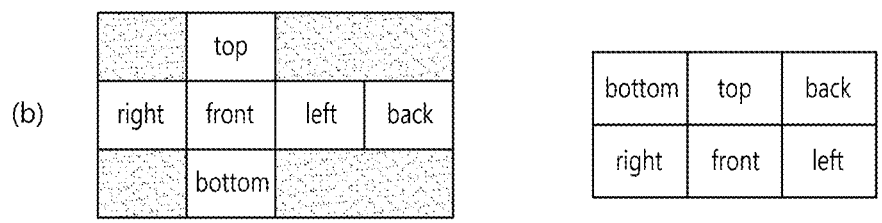
(b)
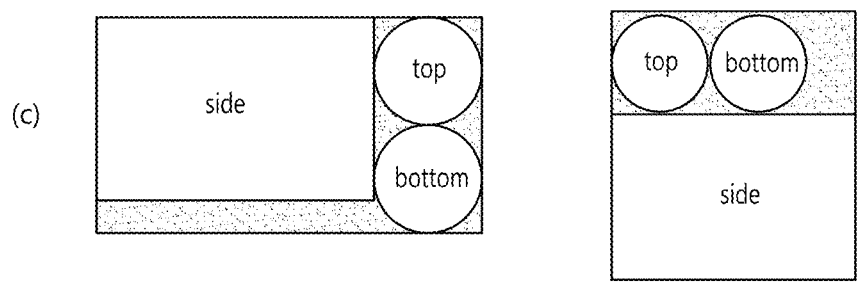
(c)
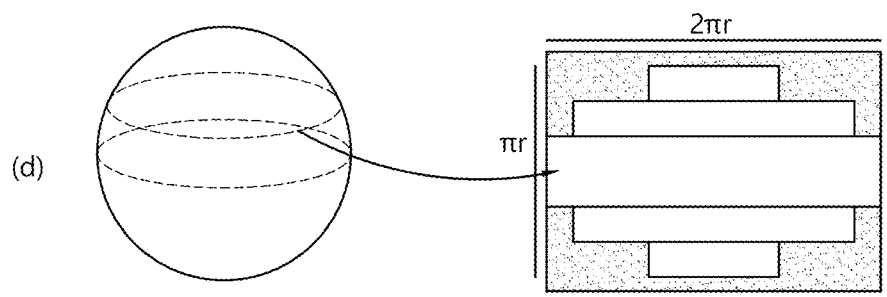
(d)

FIG. 9B
(e) 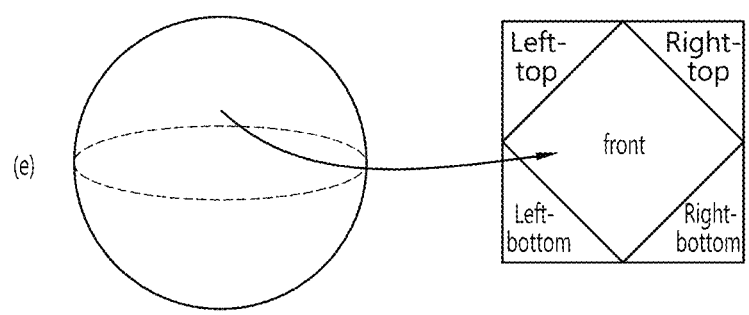
(f) 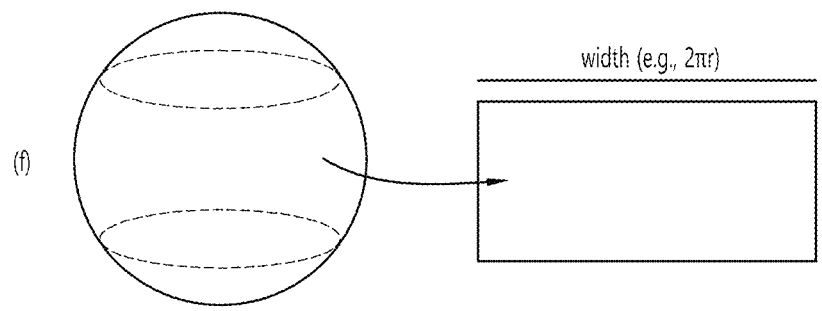
(g) 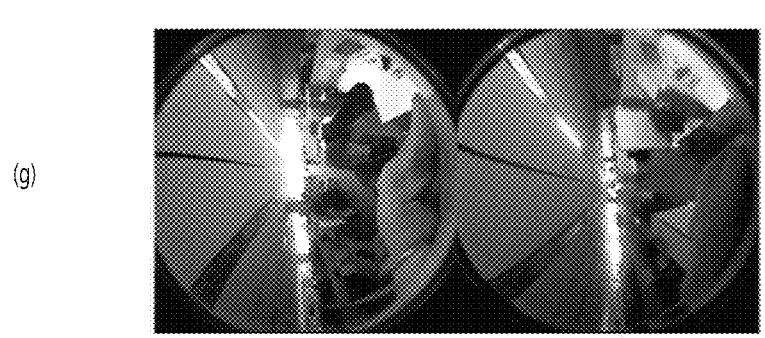

FIG. 11

```
...
        <Basic metadata>
unsigned    int(8)      vr_geometry;
unsigned    int(8)      projection_schme;
        <Stereocopic related data>
unsigned    int(1)      is_stereoscopic;
unsigned    int(3)      stereo_mode;
        <Initial View related data>
signed      int(8)      initial_view_yaw_degree;
signed      int(8)      initial_view_pitch_degree;
signed      int(8)      initial_view_roll_degree;
        <ROI related data>
unsigned int(1)         2d_roi_range_flag;
unsigned int(1)         3d_roi_range_flag;
if (2d_roi_region_flag==1) {
  unsigned int(16) min_top_left_x;
  unsigned int(16) max_top_left_x;
  unsigned int(16) min_top_left_y;
  unsigned int(16) max_top_left_y;
  unsigned int(16) min_width;
  unsigned int(16) max_width;
  unsigned int(16) min_height;
  unsigned int(16) max_height;
  unsigned int(16) min_x;
  unsigned int(16) max_x;
  unsigned int(16) min_y;
  unsigned int(16) max_y;
}
if (3d_roi_region_flag==1{
  unsigned int(16) min_yaw;
  unsigned int(16) max_yaw;
  unsigned int(16) min_pitch;
  unsigned int(16) max_pitch;
  unsigned int(16) min_roll;
  unsigned int(16) max_roll;
  unsigned int(16) min_field_of_view;
  unsigned int(16) max_field_of_view;
}
        <Field Of View related data>
unsigned int(1)         content_fov_flag;
if (content_fov_flag==1) {
  unsigned int(16)      content_fov;
}
        <Cropped Region related data>
unsigned int(1)         is_copped_region;
if (content_fov_flag==1) {
  unsigned int(16)      cr_region_left_top_x;
  unsigned int(16)      cr_region_left_top_y;
  unsigned int(16)      cr_region_width;
  unsigned int(16)      cr_region_height;
}
...
```

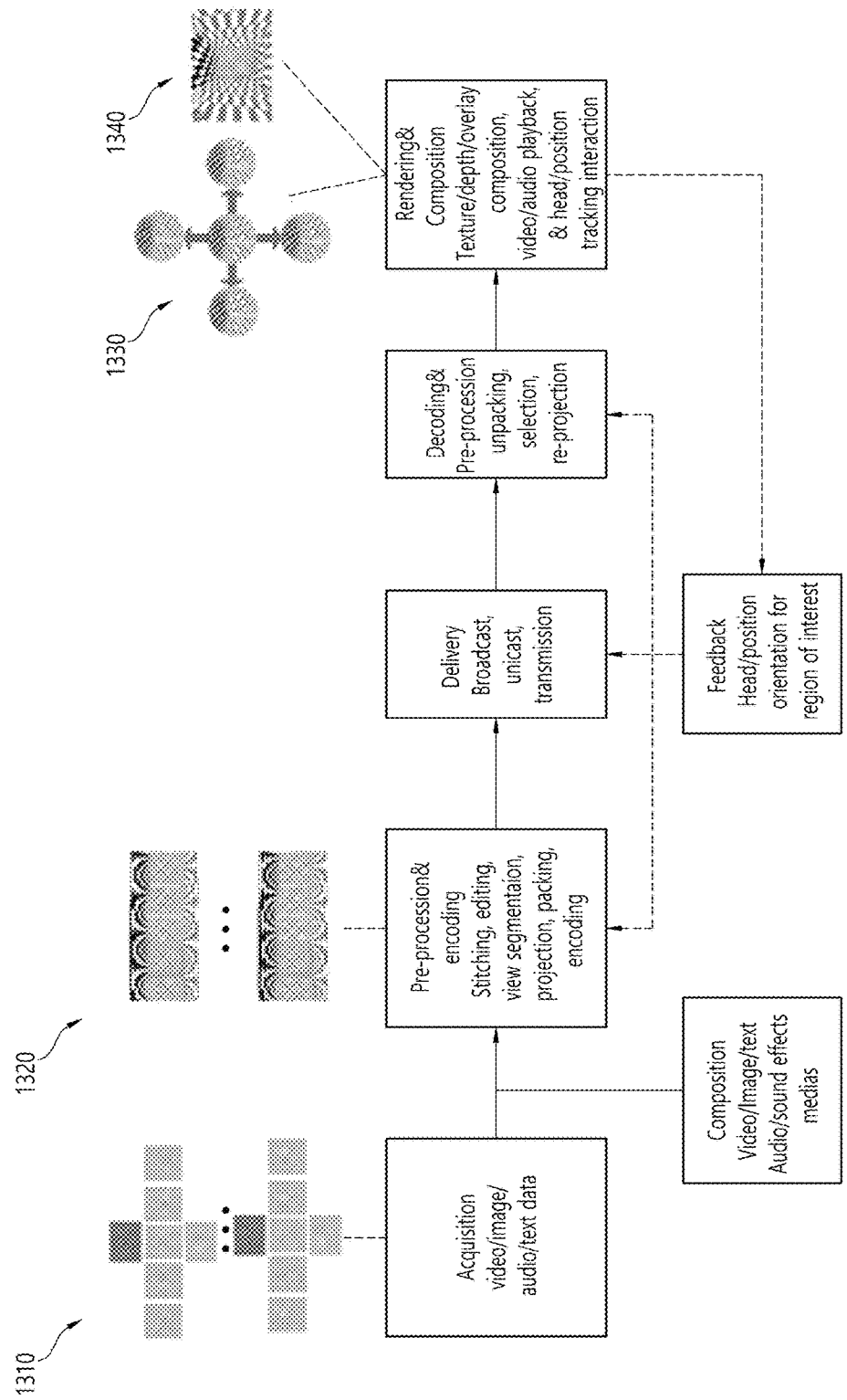

METHOD AND APPARATUS FOR TRANSMITTING AND RECEIVING METADATA FOR COORDINATE SYSTEM OF DYNAMIC VIEWPOINT

CROSS-REFERENCE TO RELATED APPLICATIONS

Pursuant to 35 U.S.C. § 119 (e), this application claims the benefit of Korean Patent Application No. 10-2018-0078651, filed on Jul. 6, 2018, the contents of which are all hereby incorporated by reference herein in their entirety.

BACKGROUND OF THE INVENTION

Field of the Invention

The present invention relates to metadata for 360-degree video data and, more specifically, to a method and apparatus for transmitting and receiving metadata for a coordinate system of a dynamic viewpoint.

Related Art

A virtual reality (VR) system provides a user with sensory experiences through which the user may feel as if he/she were in an electronically projected environment. An Augmented Reality (AR) system overlay a three-dimensional (3D) virtual image on an actual image or background of a real world, thereby allowing a user to feel as if the user is placed in an environment where a virtual reality and the real world are mixed. A system for providing VR may be further improved in order to provide higher-quality images and spatial sound. The VR or AR system may enable the user to interactively enjoy VR or AR content With increasing demands for VR or AR content, there are increasing need to develop a method for signaling information on multiple-viewpoints in the VR or AR contents.

SUMMARY OF THE INVENTION

An object of the present invention to provide a method and apparatus for processing 360-degree video data.

Another object of the present invention is to provide a method and apparatus for transmitting or receiving metadata about 360-degree video data.

Still another object of the present invention is to provide a method and apparatus for transmitting or receiving metadata about a coordinate system of a dynamic viewpoint.

Yet another object of the present invention is to provide a method and apparatus for transmitting or receiving a dynamic global coordinate system rotation flag indicating whether relative rotation angles between a common reference coordinate system of a dynamic viewpoint and a global coordinate system are changed.

According to an embodiment of the present invention, a 360-degree video data processing method performed by a 360-degree video reception apparatus is provided. The method includes: receiving information on 360-degree video data; obtaining information on an encoded picture and metadata from the information on the 360-degree video data; decoding the encoded picture based on the information on the encoded picture; and rendering the decoded picture based on the metadata, wherein the metadata comprises a dynamic global coordinate system rotation flag representing whether relative rotation angles between a common reference coordinate system of a dynamic viewpoint and a global coordinate system are changed.

According to another embodiment of the present invention, a 360-degree video reception apparatus for processing 360-degree video data is provided. The 360-degree video reception apparatus includes: a receiver for receiving information on 360-degree video data; a decapsulation processor for obtaining information on an encoded picture and metadata from the information on the 360-degree video data; a data decoder for decoding the encoded picture based on the information on the encoded picture; and a renderer for rendering the decoded picture based on the metadata, wherein the metadata comprises a dynamic global coordinate system rotation flag representing whether relative rotation angles between a common reference coordinate system of a dynamic viewpoint and a global coordinate system are changed.

According to another embodiment of the present invention, a 360-degree video data processing method performed by a 360-degree video transmission apparatus is provided. The method includes: obtaining 360-degree video data; deriving a two-dimensional picture including an omnidirectional image by processing the 360-degree video data; generating metadata for the 360-degree video data; encoding information on the two-dimensional picture; and performing encapsulation based on the information on the two-dimensional picture and the metadata, wherein the metadata comprises a dynamic global coordinate system rotation flag representing whether relative rotation angles between a common reference coordinate system of a dynamic viewpoint and a global coordinate system are changed.

According to another embodiment of the present invention, a 360-degree video transmission apparatus for processing 360-degree video data is provided. The 360-degree video transmission apparatus includes: a data input unit for obtaining 360-degree video data; a projection processor for deriving a two-dimensional picture including an omnidirectional image by processing the 360-degree video data; a metadata processor for generating metadata for the 360-degree video data; a data encoder for encoding information on the two-dimensional picture; and an encapsulation processor for performing encapsulation based on the information on the two-dimensional picture and the metadata, wherein the metadata comprises a dynamic global coordinate system rotation flag representing whether relative rotation angles between a common reference coordinate system of a dynamic viewpoint and a global coordinate system are changed.

According to the present invention, it is possible to efficiently transmit VR content (360 content) in an environment supporting next-generation hybrid broadcast using terrestrial broadcast networks and the Internet.

According to the present invention, it is possible to provide interactive experience to a user who consumes 360 content.

According to the present invention, it is possible to efficiently deliver 360 content information necessary for a user while increasing transmission capacity.

According to the present invention, it is possible to efficiently store and transmit signaling information on 360-degree video data through an international organization for standardization (ISO) based media file format such as ISO base media file format (ISOBMFF).

According to the present invention, it is possible to transmit signaling information on 360-degree video data through HyperText transfer protocol (HTTP) based adaptive streaming such as dynamic adaptive streaming over HTTP (DASH).

According to the present invention, it is possible to store and transmit signaling information on 360 video data through a supplemental enhancement information (SEI) message or video usability information (VUI) and thus improve overall transmission efficiency.

According to the present invention, it is possible to effectively signal metadata about a coordinate system of a dynamic viewpoint.

According to the present invention, it is possible to effectively signal a dynamic global coordinate system rotation flag indicating whether relative rotation angles between a common reference coordinate system of a dynamic viewpoint and a global coordinate system are changed.

BRIEF DESCRIPTION OF THE DRAWINGS

FIGS. 9A to 9B exemplarily show projection formats according to some embodiments of the present invention.

FIG. 11 is a diagram showing an example of 360-degree-video related metadata according to an embodiment of the present invention.

FIG. 13 is a diagram schematically showing an example of architecture for providing 3DoF+ video according to an embodiment of the present invention.

DESCRIPTION OF EXEMPLARY EMBODIMENTS

Figure 1:
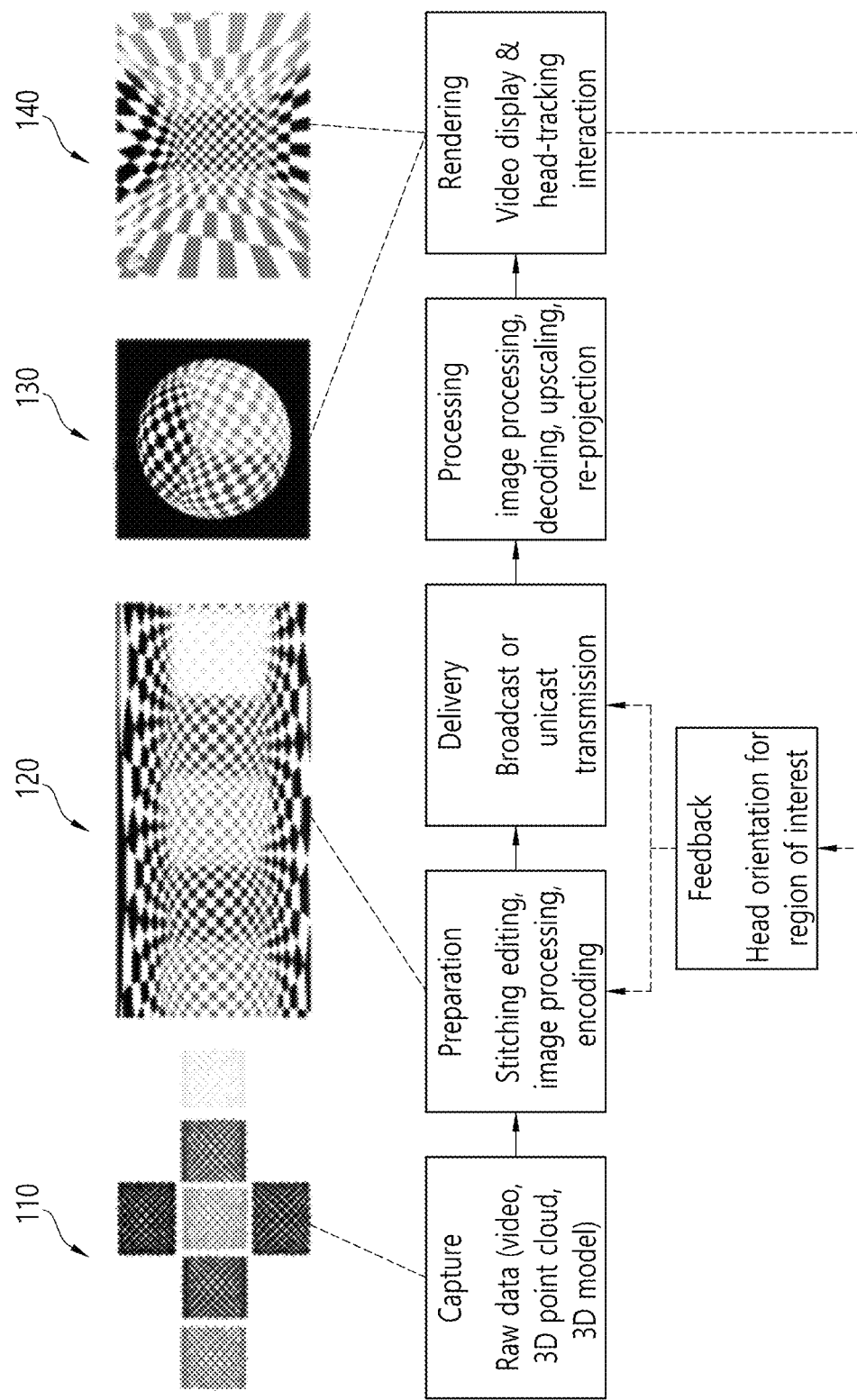
FIG. 1 is a diagram showing an overall architecture for providing 360 content according to an embodiment of the present invention.

Technical features described in the following may apply to a standard set by the Moving Picture Experts Group (MPEG), and may be employed in video, image, or audio-related fields. For example, a method or embodiment disclosed in the following description may be related to disclosure of MPEG-I standard (ISO/IEC 23090), or disclosure of next-generation standards following the MPEG-I standard (ISO/IEC 23090).

The present invention may be modified in various forms, and specific embodiments thereof will be described and illustrated in the drawings. However, the embodiments are not intended for limiting the invention. The terms used in the following description are used to merely describe specific embodiments, but are not intended to limit the invention. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

On the other hand, elements in the drawings described in the invention are independently drawn for the purpose of convenience for explanation of different specific functions, and do not mean that the elements are embodied by independent hardware or independent software. For example, two or more elements of the elements may be combined to form a single element, or one element may be divided into plural elements. The embodiments in which the elements are combined and/or divided belong to the invention without departing from the concept of the invention.

Hereinafter, preferred embodiments of the present invention will be described in more detail with reference to the attached drawings. Hereinafter, the same reference numbers will be used throughout this specification to refer to the same components and redundant description of the same component may be omitted.

FIG. 1 is a diagram showing an overall architecture for providing 360 content according to an embodiment of the present invention.

In the present specification, "image" may refer to a concept including a still image and a video that is a group of still images over time. In addition, the "video" does not necessarily refer to a group of still images over time, and, in some cases, a still image may be construed as being included in a video.

In order to provide a user with Virtual Reality (VR), a scheme for 360 content provision may be considered. Here, the 360-degree content may be called a three Degrees of Freedom (3DoF) contents, and VR may mean technology or an environment for replicating an actual or virtual environment or may mean the actual or virtual environment itself. VR artificially allow a user to experience with senses, and, through this experience, the user may feel as if he/she were in an electronically projected environment.

The term "360 content" means all content for realizing and providing VR, and may include 360-degree video and/or 360 audio. The term "360-degree video" and/or "360 audio" may be called a three-dimensional video and/or a three-dimensional audio. The term "360-degree video" may mean video or image content that is captured or reproduced in all directions (360 degrees) at the same time, which is necessary to provide VR. Hereinafter, the 360-degree video may refer to a 360-video. The 360-degree video may refer to a video or an image that appears in various kinds of 3D spaces depending on 3D models. For example, the 360-degree video may appear on a spherical surface. The term "360 audio", which is audio content for providing VR, may refer to spatial audio content in which the origin of a sound is recognized as being located in a specific 3D space. The 360 audio may be called 3D audio. The 360 content may be generated, processed, and transmitted to users, who may enjoy a VR experience using the 360 content. Hereinafter, 360 video may be called an omnidirectional video, and the 360 image may be called an omnidirectional image.

In order to provide a 360-degree video, the 360-degree video may be captured using at least one camera. The captured 360-degree video may be transmitted through a series of processes, and a reception side may process and render the received data into the original 360-degree video. As a result, the 360-degree video may be provided to a user.

Specifically, the overall processes of providing the 360-degree video may include a capturing process, a preparation process, a delivery process, a processing process, a rendering process, and/or a feedback process.

The capture process may refer to a process of capturing images or videos for a plurality of viewpoints through one or more cameras. Image/video data 110 shown in FIG. 1 may be generated through the capture process. Each plane of 110 in FIG. 1 may represent an image/video for each viewpoint. A plurality of captured images/videos may be referred to as raw data. Metadata related to capture may be generated during the capture process.

For capture, a special camera for VR may be used. When a 360 video with respect to a virtual space generated by a computer is provided according to an embodiment, capture through an actual camera may not be performed. In this case, a process of simply generating related data may substitute for the capture process.

The preparation process may be a process of processing captured images/videos and metadata generated in the capture process. Captured images/videos may be subjected to a stitching process, a projection process, a region-wise packing process and/or an encoding process during the preparation process.

First, each image/video may be subjected to the stitching process. The stitching process may be a process of connecting captured images/videos to generate one panorama image/video or spherical image/video.

Subsequently, stitched images/videos may be subjected to the projection process. In the projection process, the stitched images/videos may be projected on 2D image. The 2D image may be called a 2D image frame according to context. Projection on a 2D image may be referred to as mapping to a 2D image. Projected image/video data may have the form of a 2D image 120 in FIG. 1.

The video data projected on the 2D image may undergo the region-wise packing process in order to improve video coding efficiency. The region-wise packing process may be a process of individually processing the video data projected on the 2D image for each region. Here, the term "regions" may indicate divided parts of the 2D image on which the 360-degree video data are projected. In some embodiments, regions may be partitioned by uniformly or arbitrarily dividing the 2D image. Also, in some embodiments, regions may be partitioned depending on a projection scheme. The region-wise packing process is optional, and thus may be omitted from the preparation process.

In some embodiments, in order to improve video coding efficiency, this process may include a process of rotating each region or rearranging the regions on the 2D image. For example, the regions may be rotated such that specific sides of the regions are located so as to be adjacent to each other, whereby coding efficiency may be improved.

In some embodiments, this process may include a process of increasing or decreasing the resolution of a specific region in order to change the resolution for areas on the 360-degree video. For example, regions corresponding to relatively important areas in the 360-degree video may have higher resolution than other regions. The video data projected on the 2D image or the region-wise packed video data may undergo the encoding process via a video codec.

In some embodiments, the preparation process may further include an editing process. At the editing process, image/video data before and after projection may be edited. At the preparation process, metadata for stitching/projection/encoding/editing may be generated in the same manner. In addition, metadata for the initial viewport of the video data projected on the 2D image or a region of interest (ROI) may be generated.

The delivery process may be a process of processing and delivering the image/video data that have undergone the preparation process and the metadata. Processing may be performed based on an arbitrary transport protocol for delivery. The data that have been processed for delivery may be delivered through a broadcast network and/or a broadband connection. The data may be delivered to the reception side in an on-demand manner. The reception side may receive the data through various paths.

The processing process may be a process of decoding the received data and re-projecting the projected image/video data on a 3D model. In this process, the image/video data projected on the 2D image may be re-projected in a 3D space. Depending on the context, this process may be called mapping or projection. At this time, the mapped 3D space may have different forms depending on the 3D model. For example, the 3D model may be a sphere, a cube, a cylinder, or a pyramid.

In some embodiments, the processing process may further include an editing process and an up-scaling process. At the editing process, the image/video data before and after re-projection may be edited. In the case where the image/video data are down-scaled, the size of the image/video data may be increased through up-scaling at the up-scaling process. As needed, the size of the image/video data may be decreased through down-scaling.

The rendering process may be a process of rendering and displaying the image/video data re-projected in the 3D space. Depending on the context, a combination of re-projection and rendering may be expressed as rendering on the 3D model. The image/video re-projected on the 3D model (or rendered on the 3D model) may have the form as indicated 130 in FIG. 1. The image/video indicated by 130 in FIG. 1 is re-projected on a spherical 3D model. The user may view a portion of the rendered image/video through a VR display. At this time, the portion of the image/video viewed by the user may have the form shown in (140) of FIG. 1.

The feedback process may be a process of transmitting various kinds of feedback information that may be acquired at a display process to a transmission side. Interactivity may be provided in enjoying the 360-degree video through the feedback process. In some embodiments, head orientation information, information about a viewport, which indicates the area that is being viewed by the user, etc. may be transmitted to the transmission side in the feedback process. In some embodiments, the user may interact with what is realized in the VR environment. In this case, information related to the interactivity may be provided to the transmission side or to a service provider side at the feedback process. In some embodiments, the feedback process may not be performed.

The head orientation information may be information about the position, angle, and movement of the head of the user. Information about the area that is being viewed by the user in the 360-degree video, i.e. the viewport information, may be calculated based on this information.

The viewport information may be information about the area that is being viewed by the user in the 360-degree video. Gaze analysis may be performed therethrough, and therefore it is possible to check the manner in which the user enjoys the 360-degree video, the area of the 360-degree video at which the user gazes, and the amount of time during which the user gazes at the 360-degree video. The gaze analysis may be performed on the reception side and may be delivered to the transmission side through a feedback channel. An apparatus, such as a VR display, may extract a viewport area based on the position/orientation of the head of the user, a vertical or horizontal FOV that is supported by the apparatus, etc.

In some embodiments, the feedback information may not only be delivered to the transmission side, but may also be used in the reception side. That is, the decoding, re-projection, and rendering processes may be performed in the reception side using the feedback information. For example, only the portion of the 360-degree video that is being viewed by the user may be decoded and rendered first using the head orientation information and/or the viewport information.

Here, the viewport or the viewport area may be the portion of the 360-degree video that is being viewed by the user. The viewport, which is the point in the 360-degree video that is being viewed by the user, may be the very center of the viewport area. That is, the viewport is an area based on the viewport. The size or shape of the area may be set by a field of view (FOV), a description of which will follow.

In the entire architecture for 360-degree video provision, the image/video data that undergo a series of capturing/projection/encoding/delivery/decoding/re-projection/rendering processes may be called 360-degree video data. The term "360-degree video data" may be used to conceptually include metadata or signaling information related to the image/video data.

In order to store and transmit media data such as the above-described audio or video, a formalized media file format may be defined. In some embodiments, the media file according to the present invention may have a file format based on ISO base media file format (ISO BMFF).

Figure 2:
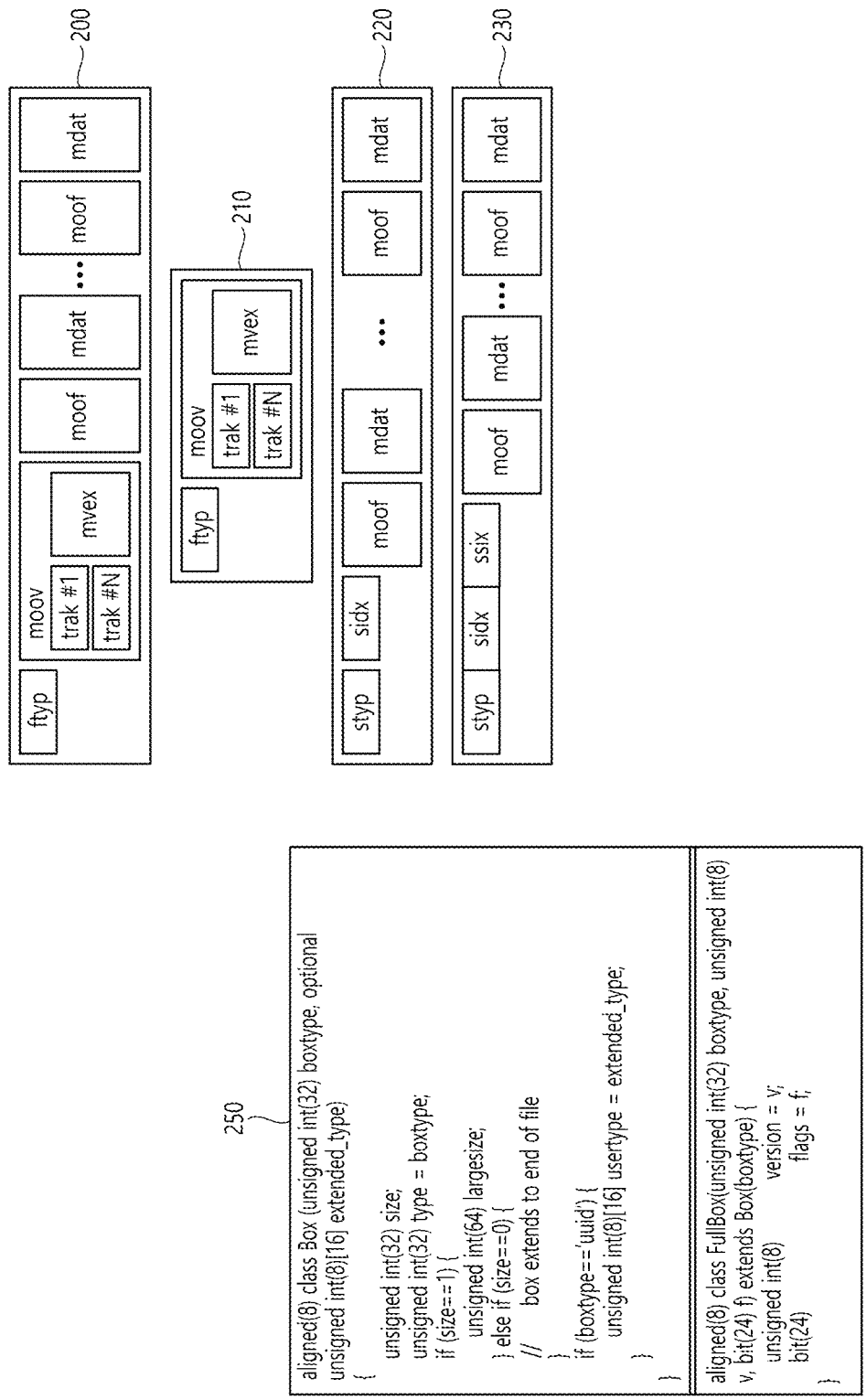
FIGS. 2 and 3 are diagrams illustrating the structure of a media file according to embodiments of the present invention.
Figure 3:
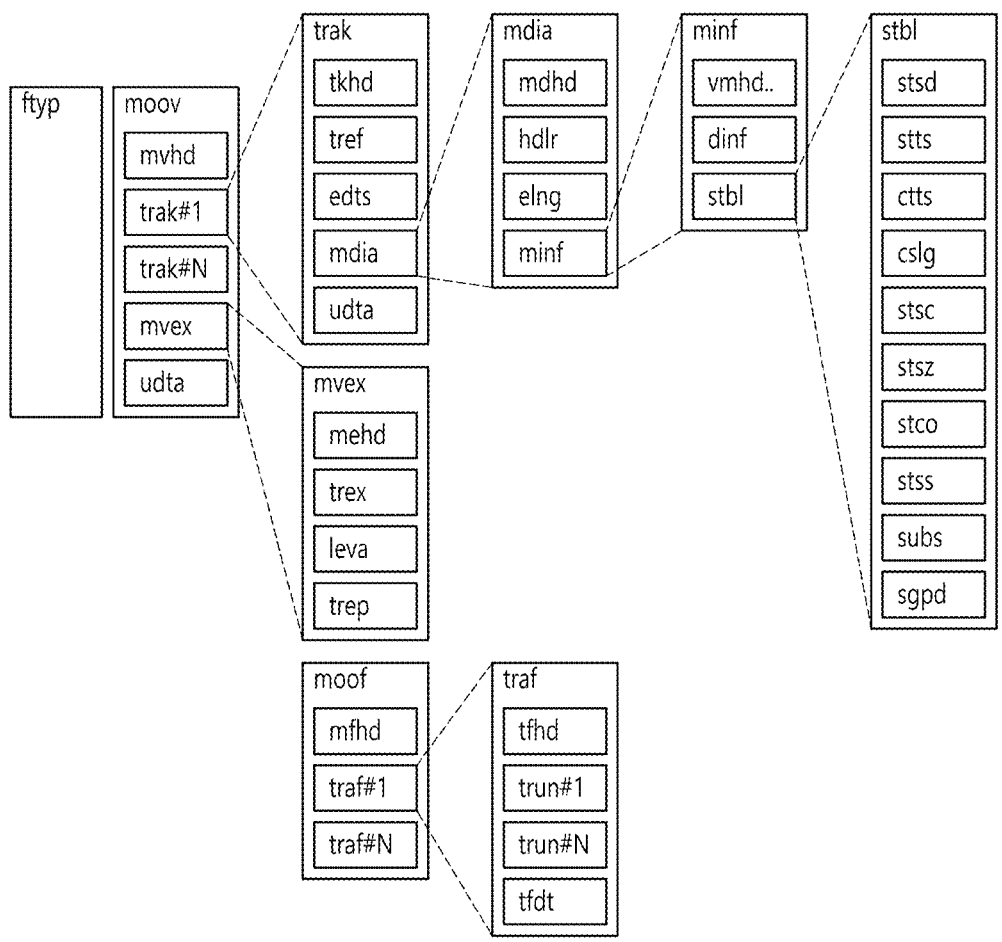

FIGS. 2 and 3 are diagrams illustrating the structure of a media file according to an aspect of the present invention.

The media file according to an embodiment may include at least one box. Here, a box may be a data block or an object including media data or metadata related to media data. Boxes may be in a hierarchical structure and thus data may be classified and media files may have a format suitable for storage and/or transmission of large-capacity media data. Further, media files may have a structure which allows users to easily access media information such as moving to a specific point of media content.

The media file according to an embodiment may include an ftyp box, a moov box and/or an mdat box.

The ftyp box (file type box) may provide file type or compatibility related information about the corresponding media file. The ftyp box may include configuration version information about media data of the corresponding media file. A decoder may identify the corresponding media file with reference to ftyp box.

The moov box (movie box) may be a box including metadata about media data of the corresponding media file. The moov box may serve as a container for all metadata. The moov box may be a highest layer among boxes related to metadata. According to an embodiment, only one moov box may be present in a media file.

The mdat box (media data box) may be a box containing actual media data of the corresponding media file. Media data may include audio samples and/or video samples. The mdat box may serve as a container containing such media samples.

According to an embodiment, the aforementioned moov box may further include an mvhd box, a trak box and/or an mvex box as lower boxes.

The mvhd box (movie header box) may include information related to media presentation of media data included in the corresponding media file. That is, the mvhd box may include information such as a media generation time, change time, time standard and period of corresponding media presentation.

The trak box (track box) may provide information about a track of corresponding media data. The trak box may include information such as stream related information, presentation related information and access related information about an audio track or a video track. A plurality of trak boxes may be present depending on the number of tracks.

The trak box may further include a tkhd box (track head box) as a lower box. The tkhd box may include information about the track indicated by the trak box. The tkhd box may include information such as a generation time, a change time and a track identifier of the corresponding track.

The mvex box (movie extend box) may indicate that the corresponding media file may have a moof box which will be described later. To recognize all media samples of a specific track, moof boxes may need to be scanned.

According to an embodiment, the media file according to an embodiment may be divided into a plurality of fragments (200). Accordingly, the media file may be fragmented and stored or transmitted. Media data (mdat box) of the media file may be divided into a plurality of fragments and each fragment may include a moof box and a divided mdat box. According to an embodiment, information of the ftyp box and/or the moov box may be required to use the fragments.

The moof box (movie fragment box) may provide metadata about media data of the corresponding fragment. The moof box may be a highest-layer box among boxes related to metadata of the corresponding fragment.

The mdat box (media data box) may include actual media data as described above. The mdat box may include media samples of media data corresponding to each fragment corresponding thereto.

According to an embodiment, the aforementioned moof box may further include an mfhd box and/or a traf box as lower boxes.

The mfhd box (movie fragment header box) may include information about correlation between divided fragments. The mfhd box may indicate the order of divided media data of the corresponding fragment by including a sequence number. Further, it is possible to check whether there is missed data among divided data using the mfhd box.

The traf box (track fragment box) may include information about the corresponding track fragment. The traf box may provide metadata about a divided track fragment included in the corresponding fragment. The traf box may provide metadata such that media samples in the corresponding track fragment may be decoded/reproduced. A plurality of traf boxes may be present depending on the number of track fragments.

According to an embodiment, the aforementioned traf box may further include a tfhd box and/or a trun box as lower boxes.

The tfhd box (track fragment header box) may include header information of the corresponding track fragment. The tfhd box may provide information such as a basic sample size, a period, an offset and an identifier for media samples of the track fragment indicated by the aforementioned traf box.

The trun box (track fragment run box) may include information related to the corresponding track fragment. The trun box may include information such as a period, a size and a reproduction time for each media sample.

The aforementioned media file and fragments thereof may be processed into segments and transmitted. Segments may include an initialization segment and/or a media segment.

A file of the illustrated embodiment 210 may include information related to media decoder initialization except media data. This file may correspond to the aforementioned initialization segment, for example. The initialization segment may include the aforementioned ftyp box and/or moov box.

A file of the illustrated embodiment 220 may include the aforementioned fragment. This file may correspond to the aforementioned media segment, for example. The media segment may further include an styp box and/or an sidx box.

The styp box (segment type box) may provide information for identifying media data of a divided fragment. The styp box may serve as the aforementioned ftyp box for a divided fragment. According to an embodiment, the styp box may have the same format as the ftyp box.

The sidx box (segment index box) may provide information indicating an index of a divided fragment. Accordingly, the order of the divided fragment may be indicated.

According to an embodiment 230, an ssix box may be further included. The ssix box (sub-segment index box) may provide information indicating an index of a sub-segment when a segment is divided into sub-segments.

Boxes in a media file may include more extended information based on a box or a FullBox as shown in the illustrated embodiment 250. In the present embodiment, a size field and a largesize field may represent the length of the corresponding box in bytes. A version field may indicate the version of the corresponding box format. A type field may indicate the type or identifier of the corresponding box. A flags field may indicate a flag associated with the corresponding box.

Meanwhile, fields (properties) related to 360-degree video according to an embodiment of the present invention may be included in a DASH-based adaptive streaming model to be transmitted.

Figure 4:
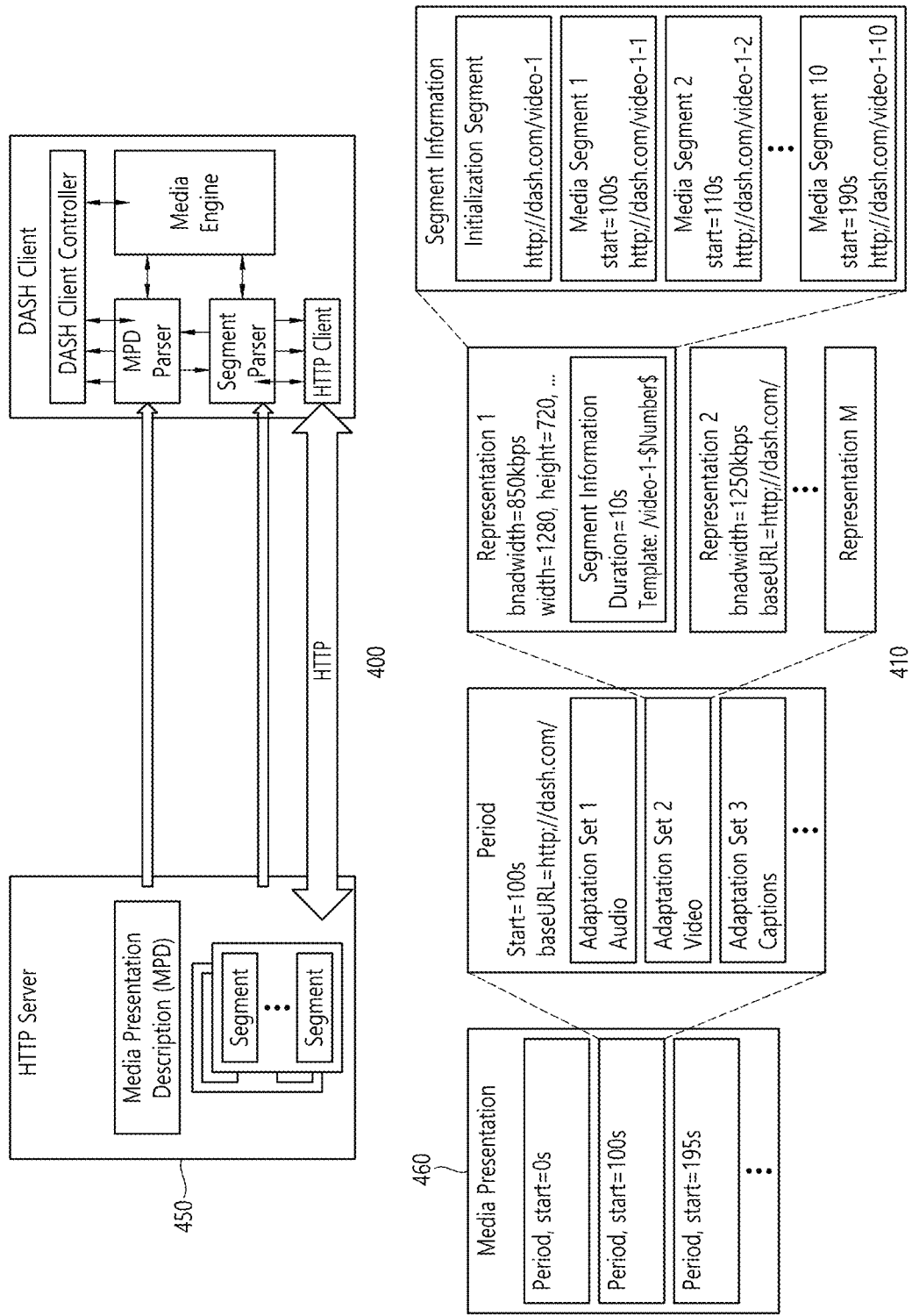
FIG. 4 is a diagram illustrating the overall operation of a Dynamic Adaptive Streaming over HTTP (DASH)-based adaptive streaming model according to an embodiment of the present invention.

FIG. 4 is a diagram illustrating the overall operation of a DASH-based adaptive streaming model according to an embodiment of the present invention.

A DASH-based adaptive streaming model according to the embodiment shown in (400) describes the operation between an HTTP server and a DASH client. Here, Dynamic Adaptive Streaming over HTTP (DASH), which is a protocol for supporting HTTP-based adaptive streaming, may dynamically support streaming depending on network conditions. As a result, AV content may be reproduced without interruption.

First, the DASH client may acquire MPD. The MPD may be delivered from a service provider such as an HTTP server. The DASH client may request a segment described in the MPD from the server using information about access to the segment. Here, this request may be performed in consideration of network conditions.

After acquiring the segment, the DASH client may process the segment using a media engine, and may display the segment on a screen. The DASH client may request and acquire a necessary segment in real-time consideration of reproduction time and/or network conditions (Adaptive Streaming). As a result, content may be reproduced without interruption.

Media Presentation Description (MPD) is a file including detailed information enabling the DASH client to dynamically acquire a segment, and may be expressed in the form of XML.

A DASH client controller may generate a command for requesting MPD and/or a segment in consideration of network conditions. In addition, this controller may perform control such that the acquired information may be used in an internal block such as the media engine.

An MPD parser may parse the acquired MPD in real time. In doing so, the DASH client controller may generate a command for acquiring a necessary segment.

A segment parser may parse the acquired segment in real time. The internal block such as the media engine may perform a specific operation depending on information included in the segment.

An HTTP client may request necessary MPD and/or a necessary segment from the HTTP server. In addition, the HTTP client may deliver the MPD and/or segment acquired from the server to the MPD parser or the segment parser.

The media engine may display content using media data included in the segment. In this case, information of the MPD may be used.

A DASH data model may have a hierarchical structure (410). Media presentation may be described by the MPD. The MPD may describe the temporal sequence of a plurality of periods making media presentation. One period may indicate one section of the media content.

In one period, data may be included in adaptation sets. An adaptation set may be a set of media content components that may be exchanged with each other. Adaptation may include a set of representations. One representation may correspond to a media content component. In one representation, content may be temporally divided into a plurality of segments. This may be for appropriate access and delivery. A URL of each segment may be provided in order to access each segment.

The MPD may provide information related to media presentation. A period element, an adaptation set element, and a representation element may describe a corresponding period, adaptation set, and representation, respectively. One representation may be divided into sub-representations. A sub-representation element may describe a corresponding sub-representation.

Here, common attributes/elements may be defined. The common attributes/elements may be applied to (included in) the adaptation set, the representation, and the sub-representation. EssentialProperty and/or SupplementalProperty may be included in the common attributes/elements.

EssentialProperty may be information including elements considered to be essential to process data related to the media presentation. SupplementalProperty may be information including elements that may be used to process data related to the media presentation. In some embodiments, in the case where signaling information, a description of which will follow, is delivered through the MPD, the signaling information may be delivered while being defined in EssentialProperty and/or SupplementalProperty.

Figure 5:
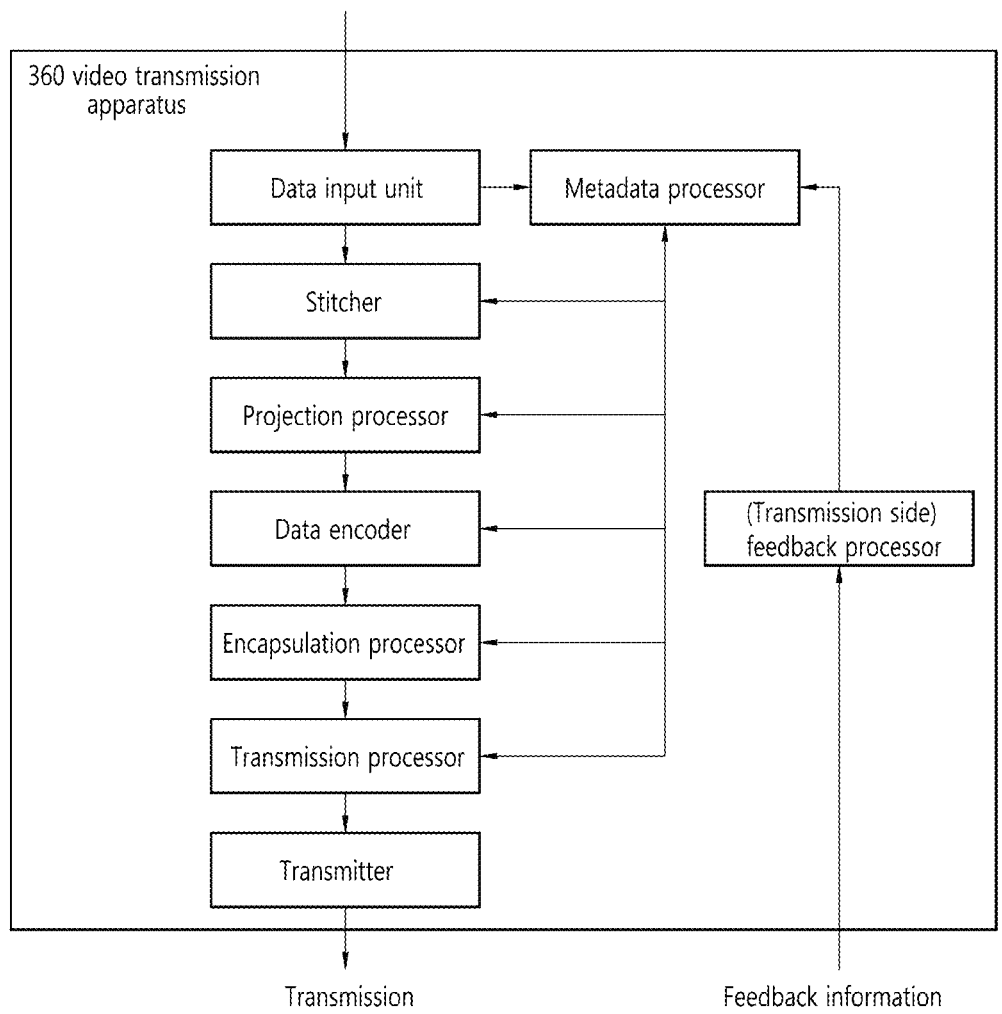
FIG. 5 is a diagram schematically showing a configuration of a 360 video transmission apparatus according to an embodiment of the present invention.

FIG. 5 is a diagram schematically showing configuration of a 360 video transmission apparatus according to an embodiment of the present invention.

The 360 video transmission apparatus according to an embodiment may perform operations related the above-described preparation process and the transmission process. The 360 video transmission apparatus may include a data input unit, a stitcher, a projection processor, a region-wise packing processor (not shown), a metadata processor, a (transmission side) feedback processor, a data encoder, an encapsulation processor, a transmission processor and/or a transmitter as internal/external elements.

The data input unit may receive captured images/videos for respective viewpoints. The images/videos for the respective viewpoints may be images/videos captured by one or more cameras. Further, data input unit may receive metadata generated in a capture process. The data input unit may forward the received images/videos for the viewpoints to the stitcher and forward metadata generated in the capture process to the signaling processor.

The stitcher may perform a stitching operation on the captured images/videos for the viewpoints. The stitcher may forward stitched 360 video data to the projection processor. The stitcher may receive necessary metadata from the metadata processor and use the metadata for the stitching operation as necessary. The stitcher may forward metadata generated in the stitching process to the metadata processor. The metadata in the stitching process may include information such as information representing whether stitching has been performed, and a stitching type.

The projection processor may project the stitched 360 video data on a 2D image. The projection processor may perform projection according to various schemes which will be described later. The projection processor may perform mapping in consideration of the depth of 360 video data for each viewpoint. The projection processor may receive metadata necessary for projection from the metadata processor and use the metadata for the projection operation as necessary. The projection processor may forward metadata generated in the projection process to the metadata processor. Metadata generated in the projection processor may include a projection scheme type and the like.

The region-wise packing processor (not shown) may perform the aforementioned region-wise packing process. That is, the region-wise packing processor may perform the process of dividing the projected 360 video data into regions and rotating and rearranging regions or changing the resolution of each region. As described above, the region-wise packing process is optional and thus the region-wise packing processor may be omitted when region-wise packing is not performed. The region-wise packing processor may receive metadata necessary for region-wise packing from the metadata processor and use the metadata for a region-wise packing operation as necessary. The region-wise packing processor may forward metadata generated in the region-wise packing process to the metadata processor. Metadata generated in the region-wise packing processor may include a rotation degree, size and the like of each region.

The aforementioned stitcher, projection processor and/or the region-wise packing processor may be integrated into a single hardware component according to an embodiment.

The metadata processor may process metadata which may be generated in a capture process, a stitching process, a projection process, a region-wise packing process, an encoding process, an encapsulation process and/or a process for transmission. The metadata processor may generate 360 video related metadata using such metadata. According to an embodiment, the metadata processor may generate the 360 video related metadata in the form of a signaling table. 360 video related metadata may also be called metadata or 360 video related signaling information according to signaling context. Further, the metadata processor may forward the acquired or generated metadata to internal elements of the 360 video transmission apparatus as necessary. The metadata processor may forward the 360 video related metadata to the data encoder, the encapsulation processor and/or the transmission processor such that the 360 video related metadata may be transmitted to a reception side.

The data encoder may encode the 360 video data projected on the 2D image and/or region-wise packed 360 video data. The 360 video data may be encoded in various formats.

The encapsulation processor may encapsulate the encoded 360 video data and/or 360 video related metadata in a file format. Here, the 360 video related metadata may be received from the metadata processor. The encapsulation processor may encapsulate the data in a file format such as ISOBMFF, CFF or the like or process the data into a DASH segment or the like. The encapsulation processor may include the 360 video related metadata in a file format. The 360 video related metadata may be included in a box having various levels in SOBMFF or may be included as data of a separate track in a file, for example. According to an embodiment, the encapsulation processor may encapsulate the 360 video related metadata into a file. The transmission processor may perform processing for transmission on the encapsulated 360 video data according to file format. The transmission processor may process the 360 video data according to an arbitrary transmission protocol. The processing for transmission may include processing for delivery over a broadcast network and processing for delivery over a broadband. According to an embodiment, the transmission processor may receive 360 video related metadata from the metadata processor as well as the 360 video data and perform the processing for transmission on the 360 video related metadata.

The transmitter may transmit the 360 video data and/or the 360 video related metadata processed for transmission through a broadcast network and/or a broadband. The transmitter may include an element for transmission through a broadcast network and/or an element for transmission through a broadband.

According to an embodiment of the 360 video transmission apparatus according to an embodiment, the 360 video transmission apparatus may further include a data storage unit (not shown) as an internal/external element. The data storage unit may store encoded 360 video data and/or 360 video related metadata before the encoded 360 video data and/or 360 video related metadata are delivered to the transmission processor. Such data may be stored in a file format such as ISOBMFF. Although the data storage unit may not be required when 360 video is transmitted in real time, encapsulated 360 data may be stored in the data storage unit for a certain period of time and then transmitted when the encapsulated 360 data is delivered over a broadband.

According to another embodiment of the 360 video transmission apparatus according to an embodiment, the 360 video transmission apparatus may further include a (transmission side) feedback processor and/or a network interface (not shown) as internal/external elements. The network interface may receive feedback information from a 360 video reception apparatus according to an embodiment and forward the feedback information to the transmission side feedback processor. The transmission side feedback processor may forward the feedback information to the stitcher, the projection processor, the region-wise packing processor, the data encoder, the encapsulation processor, the metadata processor and/or the transmission processor. According to an embodiment, the feedback information may be delivered to the metadata processor and then delivered to each internal element. Internal elements which have received the feedback information may reflect the feedback information in the following 360 video data processing.

According to another embodiment of the 360 video transmission apparatus according to an embodiment, the region-wise packing processor may rotate regions and map the rotated regions on a 2D image. Here, the regions may be rotated in different directions at different angles and mapped on the 2D image. Region rotation may be performed in consideration of neighboring parts and stitched parts of 360 video data on a spherical surface before projection. Information about region rotation, that is, rotation directions, angles and the like may be signaled through 360 video related metadata. According to another embodiment of the 360 video transmission apparatus according to an embodiment, the data encoder may perform encoding differently for respective regions. The data encoder may encode a specific region in high quality and encode other regions in low quality. The transmission side feedback processor may forward feedback information received from the 360 video reception apparatus to the data encoder such that the data encoder may use encoding methods differentiated for respective regions. For example, the transmission side feedback processor may forward viewport information received from a reception side to the data encoder. The data encoder may encode regions including an area indicated by the viewport information in higher quality (UHD and the like) than that of other regions.

According to another embodiment of the 360 video transmission apparatus according to an embodiment, the transmission processor may perform processing for transmission differently for respective regions. The transmission processor may apply different transmission parameters (modulation orders, code rates, and the like) to the respective regions such that data delivered to the respective regions have different robustnesses.

Here, the transmission side feedback processor may forward feedback information received from the 360 video reception apparatus to the transmission processor such that the transmission processor may perform transmission processes differentiated for respective regions. For example, the transmission side feedback processor may forward viewport information received from a reception side to the transmission processor. The transmission processor may perform a transmission process on regions including an area indicated by the viewport information such that the regions have higher robustness than other regions.

The above-described internal/external elements of the 360 video transmission apparatus according to an embodiment may be hardware elements. According to an embodiment, the internal/external elements may be changed, omitted, replaced by other elements or integrated.

Figure 6:
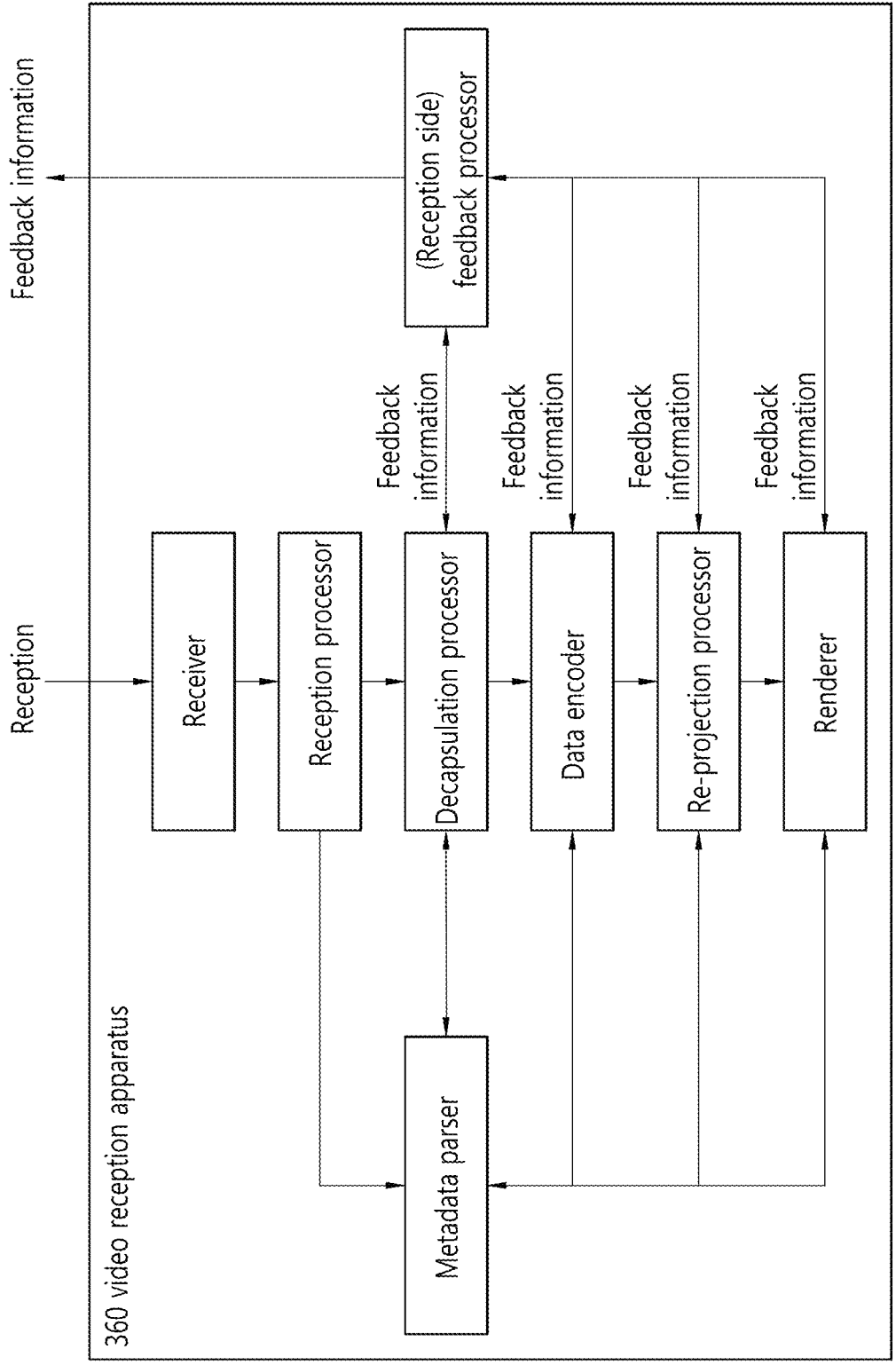
FIG. 6 is a diagram schematically illustrating a configuration of a 360 video reception apparatus according to an embodiment.

FIG. 6 is a diagram schematically illustrating a configuration of a 360 video reception apparatus according to an embodiment.

The 360 video reception apparatus according to an embodiment may perform operations related to the above-described processing process and/or the rendering process. The 360 video reception apparatus may include a receiver, a reception processor, a decapsulation processor, a data decoder, a metadata parser, a (reception side) feedback processor, a re-projection processor and/or a renderer as internal/external elements. A signaling parser may be called the metadata parser.

The receiver may receive 360 video data transmitted from the 360 video transmission apparatus according to an embodiment. The receiver may receive the 360 video data through a broadcast network or a broadband depending on a channel through which the 360 video data is transmitted.

The reception processor may perform processing according to a transmission protocol on the received 360 video data. The reception processor may perform a reverse process of the process of the aforementioned transmission processor such that the reverse process corresponds to processing for transmission performed at the transmission side. The reception processor may forward the acquired 360 video data to the decapsulation processor and forward acquired 360 video related metadata to the metadata parser. The 360 video related metadata acquired by the reception processor may have the form of a signaling table.

The decapsulation processor may decapsulate the 360 video data in a file format received from the reception processor. The decapsulation processor may obtain 360 video data and 360 video related metadata by decapsulating files in ISOBMFF or the like. The decapsulation processor may forward the acquired 360 video data to the data decoder and forward the acquired 360 video related metadata to the metadata parser. The 360 video related metadata acquired by the decapsulation processor may have the form of a box or a track in a file format. The decapsulation processor may receive metadata necessary for decapsulation from the metadata parser as necessary.

The data decoder may decode the 360 video data. The data decoder may receive metadata necessary for decoding from the metadata parser. The 360 video related metadata acquired in the data decoding process may be forwarded to the metadata parser.

The metadata parser may parse/decode the 360 video related metadata. The metadata parser may forward acquired metadata to the data decapsulation processor, the data decoder, the re-projection processor and/or the renderer.

The re-projection processor may perform re-projection on the decoded 360 video data. The re-projection processor may re-project the 360 video data on a 3D space. The 3D space may have different forms depending on 3D models. The re-projection processor may receive metadata necessary for re-projection from the metadata parser. For example, the re-projection processor may receive information about the type of a used 3D model and detailed information thereof from the metadata parser. According to an embodiment, the re-projection processor may re-project only 360 video data corresponding to a specific area of the 3D space on the 3D space using metadata necessary for re-projection.

The renderer may render the re-projected 360 video data. As described above, re-projection of 360 video data on a 3D space may be represented as rendering of 360 video data on the 3D space. When two processes simultaneously occur in this manner, the re-projection processor and the renderer may be integrated and the renderer may perform the processes. According to an embodiment, the renderer may render only a part viewed by a user according to viewpoint information of the user.

The user may view a part of the rendered 360 video through a VR display or the like. The VR display is a device which reproduces 360 video and may be included in a 360 video reception apparatus (tethered) or connected to the 360 video reception apparatus as a separate device (un-tethered).

According to an embodiment of the 360 video reception apparatus according to an embodiment, the 360 video reception apparatus may further include a (reception side) feedback processor and/or a network interface (not shown) as internal/external elements. The reception side feedback processor may acquire feedback information from the renderer, the re-projection processor, the data decoder, the decapsulation processor and/or the VR display and process the feedback information. The feedback information may include viewport information, head orientation information, gaze information, and the like. The network interface may receive the feedback information from the reception side feedback processor and transmit the feedback information to a 360 video transmission apparatus.

As described above, the feedback information may be consumed at the reception side as well as being transmitted to the transmission side. The reception side feedback processor may forward the acquired feedback information to internal elements of the 360 video reception apparatus such that the feedback information is reflected in processes such as rendering. The reception side feedback processor may forward the feedback information to the renderer, the re-projection processor, the data decoder and/or the decapsulation processor. For example, the renderer may preferentially render an area viewed by the user using the feedback information. In addition, the decapsulation processor and the data decoder may preferentially decapsulate and decode an area being viewed or will be viewed by the user.

The above-described internal/external elements of the 360 video reception apparatus according to an embodiment may be hardware elements. According to an embodiment, the internal/external elements may be changed, omitted, replaced by other elements or integrated. According to an embodiment, additional elements may be added to the 360 video reception apparatus.

In another aspect, the operation method of the 360 video reception apparatus according to the aforementioned embodiment may be related to a 360 video transmitting method and a 360 video receiving method. The 360 video transmitting/receiving method according to an embodiment may be performed by the aforementioned 360 video transmission/reception apparatus or embodiments of the apparatus.

Respective embodiments of the 360 video transmission/reception apparatus and the 360 video transmission/reception method according to the aforementioned embodiments, and embodiments of inner/external elements thereof may be combined. For example, embodiments of the projection processor and embodiments of the data encoder may be combined to produce embodiments of the 360 video transmission apparatus as much as the combined embodiments of the projection processor and the data encoder.

Figure 7:
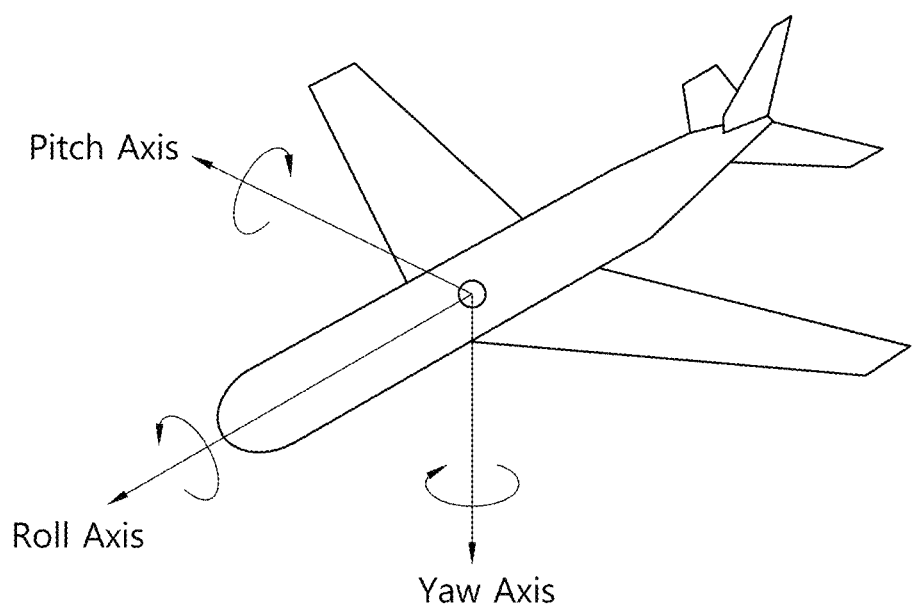
FIG. 7 is a diagram showing the concept of aircraft principal axes for describing 3D space according to an embodiment of the present invention.

FIG. 7 is a diagram showing the concept of aircraft principal axes for describing 3D space according to an embodiment of the present invention.

In the present invention, the concept of aircraft principal axes may be used in order to express a specific point, position, direction, distance, area, etc. in the 3D space. That is, in the present invention, the 3D space before projection or after re-projection may be described, and the concept of principal aircraft axes may be used in order to perform signaling thereon. In some embodiments, a method of using an orthogonal coordinate system or a spherical coordinate system using X, Y, and Z-axes may be used.

An aircraft may freely rotate in three dimensions. Axes constituting the three dimensions are referred to as a pitch axis, a yaw axis, and a roll axis. In the present specification, these terms may also be expressed either as pitch, yaw, and roll or as a pitch direction, a yaw direction, and a roll direction.

In one example, the roll axis may correspond to X axis in the orthogonal coordinate system or the back-to-front axis. Or, in the shown concept of principal aircraft axes, the roll axis may be an axis extending from the forward portion to the tail of the aircraft. Rotation in the roll direction may be rotation performed about the roll axis. The range of a roll value indicating an angle of rotation about the roll axis may be between −180 degree and 180 degree. In this case, −180 degree and 180 degree, which are edge values, may be included in the range of a roll value.

In another embodiment, the pitch axis may correspond to Y axis in the orthogonal coordinate system or the side-to-side axis. Or, the pitch axis may be an axis about which the forward portion of the aircraft is rotated upwards/downwards. In the shown concept of principal aircraft axes, the pitch axis may be an axis extending from one wing to another wing of the aircraft. The range of a pitch value indicating an angle of rotation about the pitch axis may be between −90 degree and 90 degree. In this case, −90 degree and 90 degree, which are edge values, may be included in the range of a pitch value.

In yet another example, the yaw axis may correspond to Z axis in the orthogonal coordinate system or the vertical axis. Or, the yaw axis may be an axis about which the forward portion of the aircraft is rotated leftwards/rightwards. In the shown concept of principal aircraft axes, the yaw axis may be an axis extending from the top to the bottom of the aircraft. The range of a yaw value indicating an angle of rotation about the yaw axis may be between −180 degree and 180 degree. In this case, −180 degree and 180 degree, which are edge values, may be included in the range of a yaw value.

The center point, which is the basis for determining the yaw axis, the pitch axis, and the roll axis in a 3D space according to an embodiment, may not be static.

As described above, the 3D space in the present invention may be described using the pitch, yaw, and roll concept.

Meanwhile, as described above, video data projected on a 2D image may undergo a region-wise packing process in order to improve video coding efficiency. The region-wise packing process may be a process of individually processing the video data projected on the 2D image for each region. The term "regions" may indicate divided parts of the 2D image on which 360 video data are projected, and the regions may be partitioned depending on a projection scheme. The 2D image may be referred to as a video frame or a frame.

Regarding this, the present invention proposes metadata for the region-wise packing process depending on a projection scheme, and a method for signaling the metadata. The region-wise packing process may be performed more efficiently based on the metadata.

Figure 8:
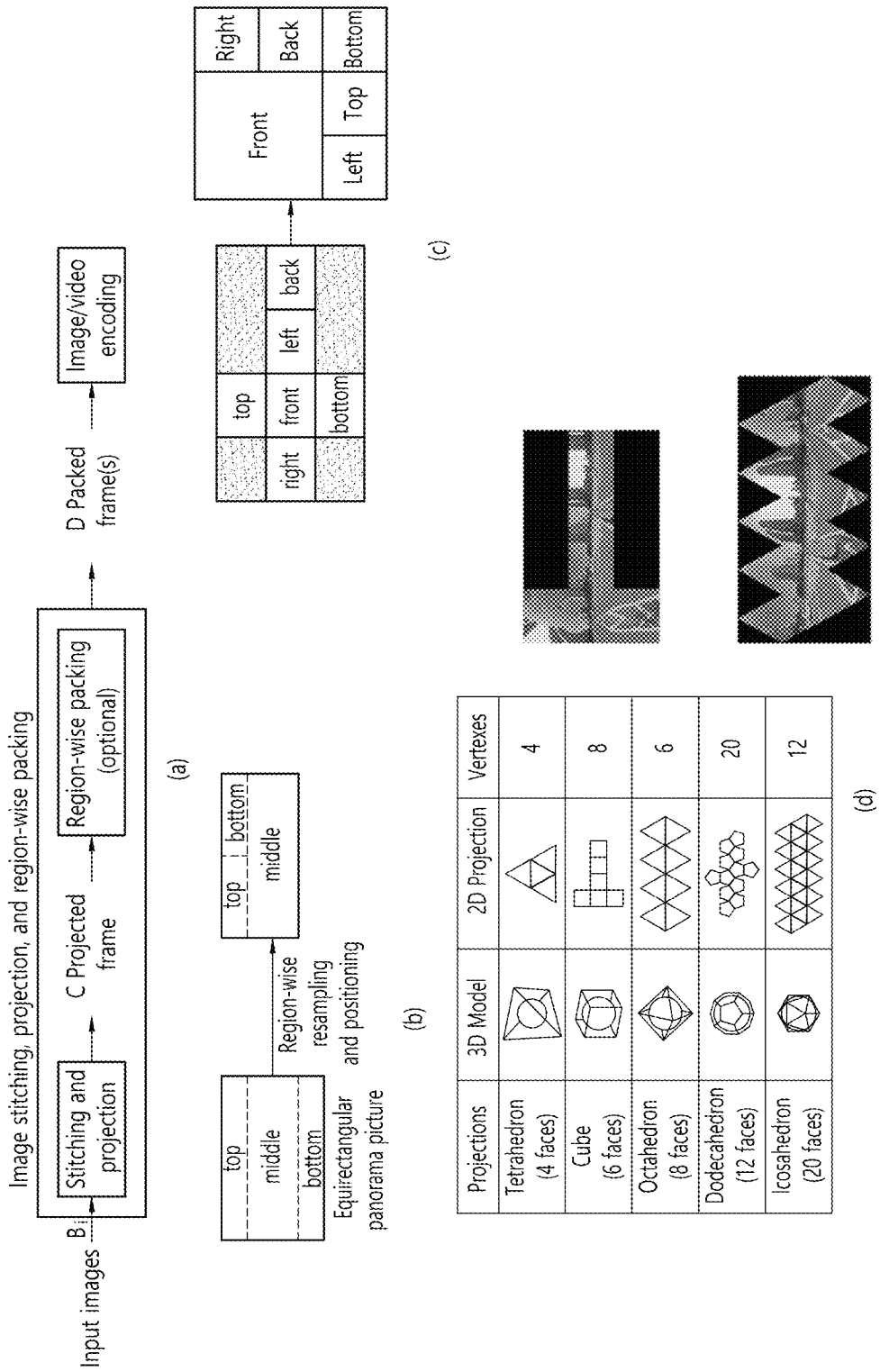
FIG. 8 exemplarily shows a 2D image having underwent 360-degree video processing process and a region-wise packing process according to a projection format.

FIG. 8 exemplarily shows a 2D image having underwent 360 video processing process and a region-wise packing process according to a projection format.

In FIG. 8, (a) may show a process of processing input 360 video. Referring to (a) of FIG. 8, input viewpoint-wise 360 video data may be stitched or projected on a 3D projection structure according to various projection schemes, and the 360e video data projected on the 3D projection structure may be expressed as a 2D image. That is, the 360 video data may be stitched, and may be projected as the 2D image. The 2D image, on which the 360 video is projected, may be expressed as a projected frame. In addition, the projected frame may undergo the aforementioned region-wise packing process. That is, a process of dividing an area including the projected 360 video data on the projected frame into regions, and rotating or rearranging each region or increasing or decreasing resolution of each region may be performed. In other words, the region-wise packing process may indicate a process of mapping the projected frame as one or more packed frames. The region-wise packing process may be optionally performed, and, if the region-wise packing process is not performed, the packed frame and the projected frame may be identical to each other. If the region-wise packing process is performed, each region of the projected frame may be mapped to the region of the packed frame, and it is possible to derive metadata that represents a position, a shape, and a size of a region of the packed frame to which each region of the projected frame is mapped.

In FIG. 8, (b) and (c) may show examples in which each region of the projected frame is mapped to a region of the packed frame. Referring to (b) of FIG. 8, the 360 video data may be projected on a 2D image (or frame) according to a panoramic projection scheme. The top region, the middle region, and the bottom region of the projected frame may undergo the region-wise packing process and hence rearranged as shown in the right drawing. Here, the top region may be a region representing the upper surface of the panorama on the 2D image, the middle region may be a region representing the middle surface of the panorama on the 2D image, and the bottom region may be a region representing the bottom surface of the panorama on the 2D image. In addition, referring to (c) of FIG. 8, the 360 video data may be projected on a 2D image (or frame) according to a cubic projection scheme. The front region, the back region, the top region, the bottom region, the right-side region, and the left-side region of the projected frame may undergo the region-wise packing process and hence rearranged as shown in the right drawing. Here, the front region may be a region representing the front surface of the cube on the 2D image, the back region may be a region representing the back surface of the cube on the 2D image. In addition, the top region may be a region representing an upper surface of the cube on the 2D image, and the bottom region may be a region representing the bottom surface of the cube on the 2D image. In addition, the right-side region may be a region representing the right-side surface of the cube on the 2D image, and the left-side region may be a region representing the left-side surface of the cube on the 2D image.

In FIG. 8, (d) may show various 3D projection formats into which the 360 video data may be projected. Referring to (d) of FIG. 8. The 3D projection formats may include a tetrahedron, a cube, a octahedron, a dodecahedron, and an icosahedron. The 2D projections shown in (d) of FIG. 8, may represent projected frames which represents the 360 video data projected into a 3D projection format on a 2D image.

The projection formats are merely exemplary, and, according to an embodiment, some or all of various projection formats (or projection schemes) may be used. A projection format used for 360 video may be indicated, for example, through a projection format field of metadata.

FIGS. 9A to 9B exemplarily show projection formats according to some embodiments of the present invention.

In FIG. 9A, (a) may show an equirectangular projection format. When the equirectangular projection format is used, a point (r, θ0, 0), that is, a point where θ=θ0 and φ=0, on a spherical surface and a central pixel on a 2D image may be mapped. A principal point of a front camera may be assumed to be a point (r, 0, 0) on the spherical surface. In addition, φ0=0 may be fixed. Therefore, a value (x, y) transformed into XY coordinate system may be transformed into a (X, Y) pixel on the 2D image through the following equation.

$$X = K_x^* x + X_O = K_x^* (\theta - \theta_0)^* r + X_O \qquad \text{[Equation 1]}$$
$$Y = -K_y^* y - Y_O$$

In addition, if a left top pixel on the 2D image is positioned at (0, 0) in the XY system, an offset value for X axis and an offset value for Y axis may be represented by the following equation.

$$X_O = K_x^* \pi^* r \qquad \text{[Equation 2]}$$
$$Y_O = -K_y^* \pi / 2^* r$$

Using the above, a transformation equation into the XY coordinate system may be as below.

$$X = K_x x + X_O = K_x^* (\pi + \theta - \theta_0)^* r \qquad \text{[Equation 3]}$$
$$Y = -K_y y - Y_O = K_y^* (\pi/2 - \varphi)^* r$$

For example, if θ0=0, that is, if a central pixel on a 2D image indicates data of θ=0 on a spherical surface, the spherical surface may be mapped to an area of a horizontal length (width)=2Kxπ and a vertical length (height)=Kxπr on the 2D image based on (0,0). Data of φ=π/2 on the spherical surface may be mapped to the whole upper edge on the 2D image. In addition, data of (r, π/2, 0) on the spherical surface may be mapped to a point of (3πKxr/2, πKx r/2) on the 2D image.

At the reception side, 360 video data on the 2D image may be re-projected to the spherical surface. This may be represented by a transformation equation as below.

$$\theta = \theta_0 + X/K_x^* r - \pi \quad \text{[Equation 4]}$$
$$\varphi = \pi/2 - Y/K_y^* r$$

For example, a pixel at XY coordinates of (K×πr, 0) on a 2D image may be re-projected to a point where θ=θ0 and φ=π/2 on a spherical surface.

In FIG. 9A, (b) may show a cubic projection format. For example, stitched 360 video data may appear on a spherical surface. The projection processor may project the 360 video data on a 2D image in the form of a cube. The 360 video data on the spherical surface may correspond to respective surfaces of the cube. As a result, the 360 video data may be projected on the 2D image, as shown in at the left side or the right side of (b) in FIG. 9A.

In FIG. 9A, (c) may show a cylindrical projection format. On the assumption that stitched 360 video data appear on a spherical surface, the projection processor may project the 360 video data on a 2D image in the form of a cylinder. The 360-degree video data on the spherical surface may correspond to the side, the top, and the bottom of the cylinder. As a result, the 360 video data may be projected on the 2D image, as shown in the left side or the right side of (c) in FIG. 9A.

In FIG. 9A, (d) may show a tile-based projection format. If the tile-based projection scheme is used, the aforementioned projection processor may divide 360 video data on a spherical surface into one or more sub-areas, as shown in (d) of FIG. 9A, and project on a 2D image. The sub-areas may be called tiles.

In FIG. 9B, (e) may show a pyramid projection format. On the assumption that stitched 360 video data appear on a spherical surface, the projection processor may regard the 360 video data as a pyramid and project the 360 video data on a 2D image in the form of a pyramid. The 360 video data on the spherical surface may correspond to four surfaces (the front, the left top, the left bottom, the right top, and the right bottom) of the pyramid. As a result, the 360-degree video data may be projected on the 2D image, as shown at the left side or the right side of (e) of FIG. 9B. In this case, the bottom surface may be a region including data acquired by a camera that faces forward.

In FIG. 9B, (f) may show a panoramic projection format, If the panoramic projection format is used, the aforementioned projection processor may project only a side surface of 360 video data on a spherical surface on a 2D image, as shown in (f) of FIG. 9B. This may be the same as the case where the top and bottom surfaces do not exist in the cylindrical projection scheme.

Meanwhile, according to one embodiment, projection may be performed without a stitching process. In FIG. 9B, (g) may show the case where projection is performed without the stitching process. If projection is performed without the stitching process, the aforementioned projection processor may project 360 video data intact on a 2D image, as shown in (g) of FIG. 9B. In this case, a stitching process may be not performed, and intact images acquired by a camera may be projected on the 2D image.

Referring to (g) of FIG. 9B, two images may be projected on a 2D image without a stitching process. Each of the images may be a fish-eye image acquired by a spherical camera (or a fish-eye camera) through each sensor. As described above, at the reception side, image data acquired from camera sensors may be stitched, and the stitched image data may be mapped to a spherical surface to render spherical video, that is, 360 video.

Figure 10A:
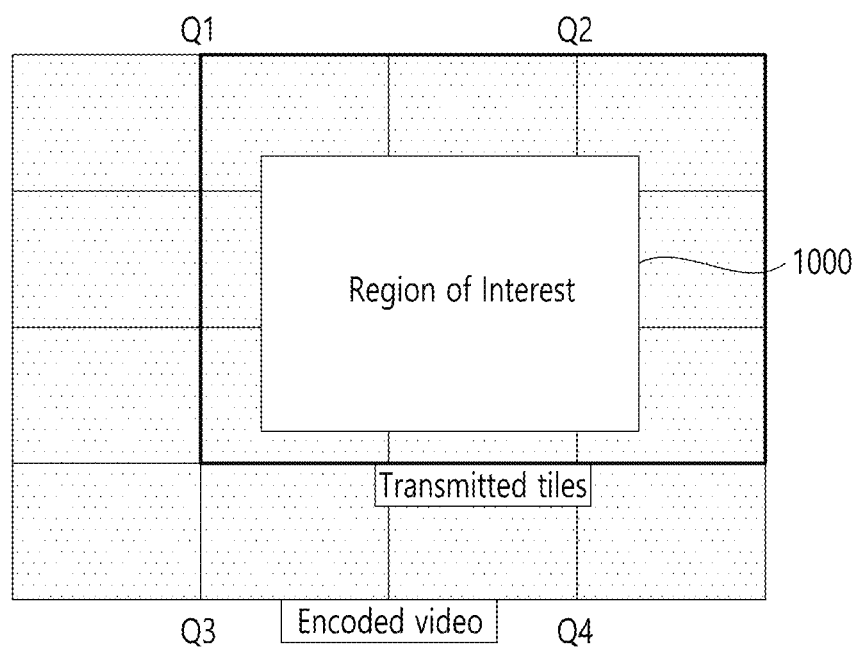
FIGS. 10A and 10B are diagrams showing tiles according to some embodiments of the present invention.
Figure 10B:
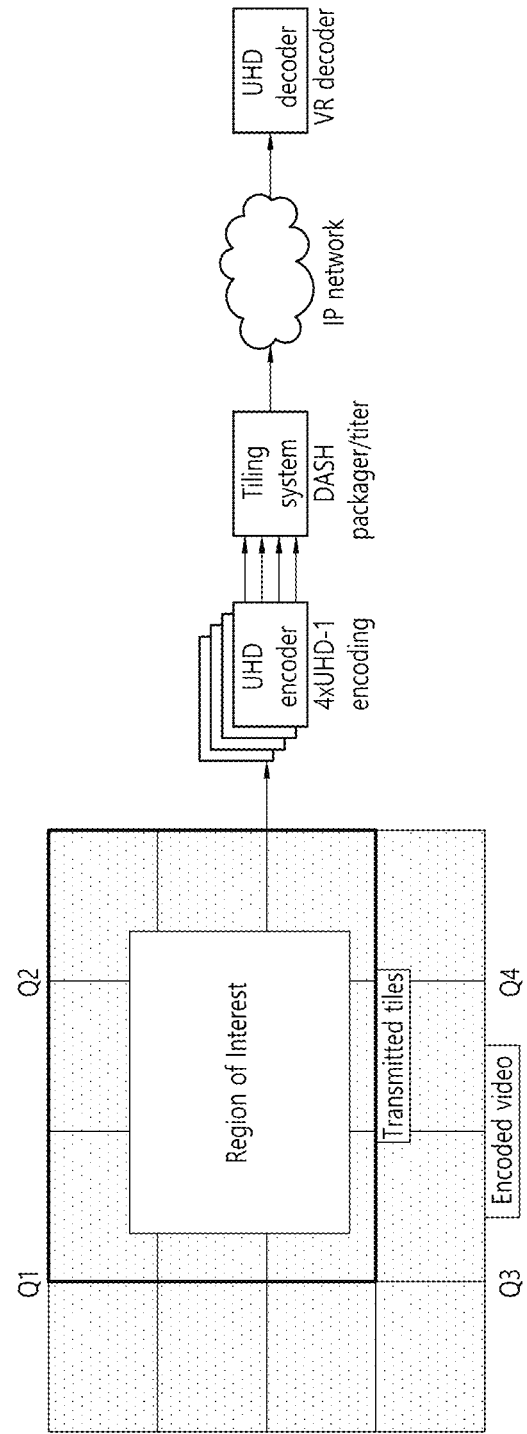

FIGS. 10A and 10B are diagrams showing tiles according to some embodiments of the present invention.

360 video data projected on a 2D image or 360 video data having undergone a region-wise packing process may be partitioned into one or more tiles. FIG. 10A shows the case where one 2D image is partitioned into 16 tiles. Here, a 2D image may be the aforementioned projected frame or packed frame. According to another embodiment of a 360 video transmission apparatus of the present invention, the data encoder is able to encode the respective tiles independently.

Region-wise packing and tiling may be different from each other. Region-wise packing may be processing each region of the 360 video data projected on the 2D image in order to improve coding efficiency or to adjust resolution. Tiling may be dividing, the data encoder, the projected frame or the packed frame into tiles and independently encoding the tiles. When the 360 video data are provided, the user does not simultaneously enjoy all parts of the 360 video data. Tiling may enable the reception side to enjoy or receive only tiles corresponding to an important part or a predetermined part, such as the viewport that is being viewed by the user, to the reception side within a limited bandwidth. The limited bandwidth may be more efficiently utilized through tiling, and calculation load for the reception side may be reduced compared to the case of processing the entire 360 video data all at once.

Since the regions and the tiles are different from each other, the two areas are not necessarily the same. In some embodiments, however, the regions and the tiles may indicate the same areas. In some embodiments, region-wise packing may be performed based on the tiles, whereby the regions and the tiles may become the same. Also, in some embodiments, in the case where the surfaces according to the projection scheme and the regions are the same, the surface according to the projection scheme, the regions, and the tiles may indicate the same areas. Depending on the context, the regions may be called VR regions, and the tiles may be called tile regions.

A region of interest (ROI) may be an area in which users are interested, proposed by a 360 content provider. The 360 content provider may produce a 360 video in consideration of the area of the 360 video in which users are expected to be interested. In some embodiments, the ROI may correspond to an area of the 360 video in which an important portion of the 360-degree video is shown.

In another embodiment of the 360 video transmission/reception apparatus according to the present invention, the reception-side feedback-processing unit may extract and collect viewport information, and may deliver the same to the transmission-side feedback-processing unit. At this process, the viewport information may be delivered using the network interfaces of both sides. FIG. 10A shows a viewport t6010 displayed on the 2D image. Here, the viewport may be located over 9 tiles on the 2D image.

In this case, the 360 video transmission apparatus may further include a tiling system. In some embodiments, the tiling system may be disposed after the data encoder (see FIG. 10B), may be included in the data encoder or the transmission-processing unit, or may be included in the 360 video transmission apparatus as a separate internal/external element.

The tiling system may receive the viewport information from the transmission-side feedback-processing unit. The tiling system may select and transmit only tiles including the viewport area. In the FIG. 10A, 9 tiles including the viewport area 1000, among a total of 16 tiles of the 2D image, may be transmitted. Here, the tiling system may transmit the tiles in a unicast manner over a broadband connection. It is because the viewport area varies depending on a user.

Also, in this case, the transmission-side feedback-processing unit may deliver the viewport information to the data encoder. The data encoder may encode the tiles including the viewport area at higher quality than other tiles.

Also, in this case, the transmission-side feedback-processing unit may deliver the viewport information to the metadata-processing unit. The metadata-processing unit may deliver metadata for the viewport area to the internal elements of the 360 video transmission apparatus, or may include the same in the 360-video related metadata.

By using this tiling method, it is possible to save transmission bandwidth and to differently perform processing for each tile, whereby efficient data processing/transmission is possible.

Embodiments related to the viewport area may be similarly applied to specific areas other than the viewport area. For example, processing performed on the viewport area may be equally performed on an area in which users are determined to be interested through the gaze analysis, ROI, and an area that is reproduced first when a user views the 360 video through the VR display (initial viewport).

According to another embodiment of the 360 video transmission apparatus, the transmission-processing unit may perform transmission processing differently for respective tiles. The transmission-processing unit may apply different transport parameters (modulation order, code rate, etc.) to the tiles such that robustness of data delivered for each region is changed.

At this point, the transmission-side feedback-processing unit may deliver the feedback information, received from the 360 video reception apparatus, to the transmission-processing unit, which may perform transmission processing differently for respective tiles. For example, the transmission-side feedback-processing unit may deliver the viewport information, received from the reception side, to the transmission-processing unit. The transmission-processing unit may perform transmission processing on tiles including the viewport area so as to have higher robustness than for the other tiles.

FIG. 11 is a view showing 360-degree-video related metadata according to an embodiment of the present invention.

The 360-degree-video related metadata may include various metadata for the 360-degree video. Depending on the context, the 360-degree-video related metadata may be called 360-degree-video-related signaling information. The 360-degree-video related metadata may be transmitted while being included in a separate signaling table, or may be transmitted while being included in DASH MPD, or may be transmitted while being included in the form of a box in a file format of ISOBMFF. In the case where the 360-degree-video related metadata are included in the form of a box, the metadata may be included in a variety of levels, such as a file, a fragment, a track, a sample entry, and a sample, and may include metadata related to data of a corresponding level.

In some embodiments, a portion of the metadata, a description of which will follow, may be transmitted while being configured in the form of a signaling table, and the remaining portion of the metadata may be included in the form of a box or a track in a file format.

According to an embodiment of the 360-degree-video related metadata, the 360-degree-video related metadata may include basic metadata about projection schemes, stereoscopy related metadata, initial-view/initial-viewport related metadata, ROI related metadata, field-of-view (FOV) related metadata, and/or cropped-region related metadata. In some embodiments, the 360-degree-video related metadata may further include metadata other than the above metadata.

Embodiments of the 360-degree-video related metadata according to the present invention may include at least one of the basic metadata, the stereoscopy related metadata, the initial-view related metadata, the ROI related metadata, the FOV related metadata, the cropped-region related metadata, and/or additional possible metadata. Embodiments of the 360-degree-video related metadata according to the present invention may be variously configured depending on possible number of metadata included therein. In some embodiments, the 360-degree-video related metadata may further include additional information.

The stereo_mode field may indicate a 3D layout supported by the 360-degree video. It is possible to indicate whether the 360-degree video supports 3D using only this field. In this case, the is_stereoscopic field may be omitted. When the field has a value of 0, the 360-degree video may have a mono mode. That is, the 2D image, on which the 360-degree video is projected, may include only one mono view. In this case, the 360-degree video may not support 3D.

When the field has a value of 1 or 2, the 360-degree video may follow a left-right layout or a top-bottom layout. The left-right layout and the top-bottom layout may be called a side-by-side format and a top-bottom format, respectively. In the left-right layout, 2D images on which a left image/a right image are projected may be located at the left/right side on an image frame. In the top-bottom layout, 2D images on which a left image/a right image are projected may be located at the top/bottom side on the image frame. In the case where the field has additional values, the values may be reserved for future use.

The initial-view related metadata may include information about the time at which a user views the 360-degree video when the 360-degree video is reproduced first (an initial viewport). The initial-view related metadata may include an initial_view_yaw_degree field, an initial_view_pitch_degree field, and/or an initial_view_roll_degree field. In some embodiments, the initial-view related metadata may further include additional information.

The initial_view_yaw_degree field, the initial_view_pitch_degree field, and the initial_view_roll_degree field may indicate an initial viewport when the 360-degree video is reproduced. That is, the very center point of the viewport that is viewed first at the time of reproduction may be indicated by these three fields. Specifically, the initial_view_yaw degree field may indicate a yaw value at the initial viewpoint. That is, the initial_view_yaw degree field may indicate the rotational direction (symbol) and the extent of rotation direction (angle) in which the position of the very center point is rotated about the yaw axis. In addition, the initial_view_pitch_degree field may indicate a pitch value at the initial viewpoint. That is, the initial_view_pitch_degree field may indicate the rotational direction (symbol) and the extent of rotation (angle) in which the position of the very center point is rotated about the pitch axis. In addition, the initial_view_roll_degree field may indicate a roll value at the initial viewpoint. That is, the initial_view_roll_degree field may indicate the rotational direction (symbol) and the extent of rotation (angle) in which the position of the very center point is rotated about the roll axis. The initial viewpoint at the time of reproduction of the corresponding 360-degree video, that is, the very center point of the view point that is viewed first at the time of reproduction may be indicated based on the initial_view_yaw_degree field, the initial_view_pitch_degree field, and the initial_view_roll_degree field. In doing so, a specific area of the 360-degree video may be displayed at the initial viewpoint for a user. In addition, the horizontal length and the vertical length (width and height) of an initial viewport based on the indicated initial viewport through the FOV may be determined. That is, the 360-degree video reception apparatus may provide a user with a predetermined area of the 360-degree video as an initial viewport using these three fields and the FOV information.

In some embodiments, the initial viewport indicated by the initial-view related metadata may be changed for each scene. That is, the scenes of the 360-degree video may be changed over time of 360 content. An initial viewport or an initial viewport at which the user views the video first may be changed for every scene of the 360-degree video. In this case, the initial-view related metadata may indicate the initial viewport for each scene. To this end, the initial-view related metadata may further include a scene identifier identifying the scene to which the initial viewport is applied. In addition, the FOV may be changed for each scene. The initial-view related metadata may further include scene-wise FOV information indicating the FOV corresponding to the scene.

The ROI related metadata may include information related to the ROI. The ROI related metadata may a 2d_roi_range_flag field and/or a 3d_roi_range_flag_field. Each of the two fields may indicate whether the ROI related metadata includes fields expressing the ROI based on the 2D image or whether the ROI related metadata includes fields expressing the ROI based on the 3D space. In some embodiments, the ROI related metadata may further include additional information, such as differential encoding information based on the ROI and differential transmission processing information based on the ROI.

In the case where the ROI related metadata includes fields expressing the ROI based on the 2D image, the ROI related metadata may include a min_top_left_x field, a max_top_left_x field, a min_top_left_y field, a max_top_left_y field, a min_width field, a max_width field, a min_height field, a max_height field, a min_x field, a max_x field, a min_y field, and/or a max_y field.

The min_top_left_x field, the max_top_left_x field, the min_top_left_y field, and the max_top_left_y field may indicate the minimum/maximum values of the coordinates of the left top end of the ROI. That is, these fields may indicate the minimum x coordinate, the maximum x coordinate, the minimum y coordinate, and the maximum y coordinate of the left top end, respectively.

The min_width field, the max_width field, the min_height field, and the max_height field may indicate the minimum/maximum values of the horizontal size (width) and the vertical size (height) of the ROI. That is, these fields may indicate the minimum value of the horizontal size, the maximum value of the horizontal size, the minimum value of the vertical size, and the maximum value of the vertical size, respectively.

The min_x field, the max_x field, the min_y field, and the max_y field may indicate the minimum/maximum values of the coordinates in the ROI. That is, these fields may indicate the minimum x coordinate, the maximum x coordinate, the minimum y coordinate, and the maximum y coordinate of the coordinates in the ROI, respectively. These fields may be omitted.

In the case where the ROI related metadata includes fields expressing the ROI based on the coordinates in the 3D rendering space, the ROI related metadata may include a min_yaw field, a max_yaw field, a min_pitch field, a max_pitch field, a min_roll field, a max_roll field, a min_field_of_view field, and/or a max_field_of_view field.

The min_yaw field, the max_yaw field, the min_pitch field, the max_pitch field, the min_roll field, and the max_roll field may indicate the area that the ROI occupies in 3D space as the minimum/maximum values of yaw, pitch, and roll. That is, these fields may indicate the minimum value of the amount of rotation about the yaw axis, the maximum value of the amount of rotation about the yaw axis, the minimum value of the amount of rotation about the pitch axis, the maximum value of the amount of rotation about the pitch axis, the minimum value of the amount of rotation about the roll axis, and the maximum value of the amount of rotation about the roll axis, respectively.

The min_field_of_view field and the max_field_of_view_field may indicate the minimum/maximum values of the FOV of the 360-degree video data. The FOV may be a range of vision within which the 360-degree video is displayed at once when the video is reproduced. The min_field_of_view field and the max_field_of_view field may indicate the minimum value and the maximum value of the FOV, respectively. These fields may be omitted. These fields may be included in FOV related metadata, a description of which will follow.

The FOV related metadata may include the above information related to the FOV. The FOV related metadata may include a content_fov_flag field and/or a content_fov field. In some embodiments, the FOV related metadata may further include additional information, such as information related to the minimum/maximum values of the FOV.

The content_fov_flag field may indicate whether information about the FOV of the 360-degree video intended at the time of production exists. When the value of this field is 1, the content_fov field may exist.

The content_fov field may indicate information about the FOV of the 360 video intended at the time of production. In some embodiments, the portion of the 360-degree video that is displayed to a user at once may be determined based on the vertical or horizontal FOV of the 360-degree video reception apparatus. Alternatively, in some embodiments, the portion of the 360-degree video that is displayed to the user at once may be determined in consideration of the FOV information of this field.

The cropped-region related metadata may include information about the area of an image frame that includes actual 360-degree video data. The image frame may include an active video area, in which actual 360-degree video data is projected, and an inactive video area. Here, the active video area may be called a cropped area or a default display area. The active video area is an area that is seen as the 360-degree video in an actual VR display. The 360-degree video reception apparatus or the VR display may process/display only the active video area. For example, in the case where the aspect ratio of the image frame is 4:3, only the remaining area of the image frame, excluding a portion of the upper part and a portion of the lower part of the image frame, may include the 360-degree video data. The remaining area of the image frame may be the active video area.

The cropped-region related metadata may include an is_cropped_region field, a cr_region_left_top_x_field, a cr_region_left_top_y field, a cr_region_width field, and/or a cr_region_height field. In some embodiments, the cropped-region related metadata may further include additional information.

The is_cropped_region field may be a flag indicating whether the entire area of the image frame is used by the 360-degree video reception apparatus or the VR display. Here, an area to which 360-video data is mapped or an area seen on the VR display may be called an active video area. This field may indicate whether the entire image frame is the active video area. In the case where only a portion of the image frame is the active video area, the following four fields may be further included.

The cr_region_left_top_x field, the cr_region_left_top_y field, the cr_region_width field, and the cr_region_height field may indicate the active video area in the image frame. These fields may indicate the x coordinate of the left top of the active video area, the y coordinate of the left top of the active video area, the horizontal length (width) of the active video area, and the vertical length (height) of the active video area, respectively. The horizontal length and the vertical length may be expressed using pixels.

The 360-video-based VR system may provide a user with visual/audible experience in a different viewing orientation from a position of the user with respect to 360 video based on the above-described 360 video processing. The VR system, which provides a user with visual/audible experience in different viewing orientation from a fixed position of the user with respect to 360 video, may be called a three degree of freedom (3DoF)-based VR system. Meanwhile, the VR system capable of providing visual/audible experience in different viewing orientations from different viewing positions at different viewpoints may be called a 3DoF+ or 3DoF plus-based VR system.

Figure 12:
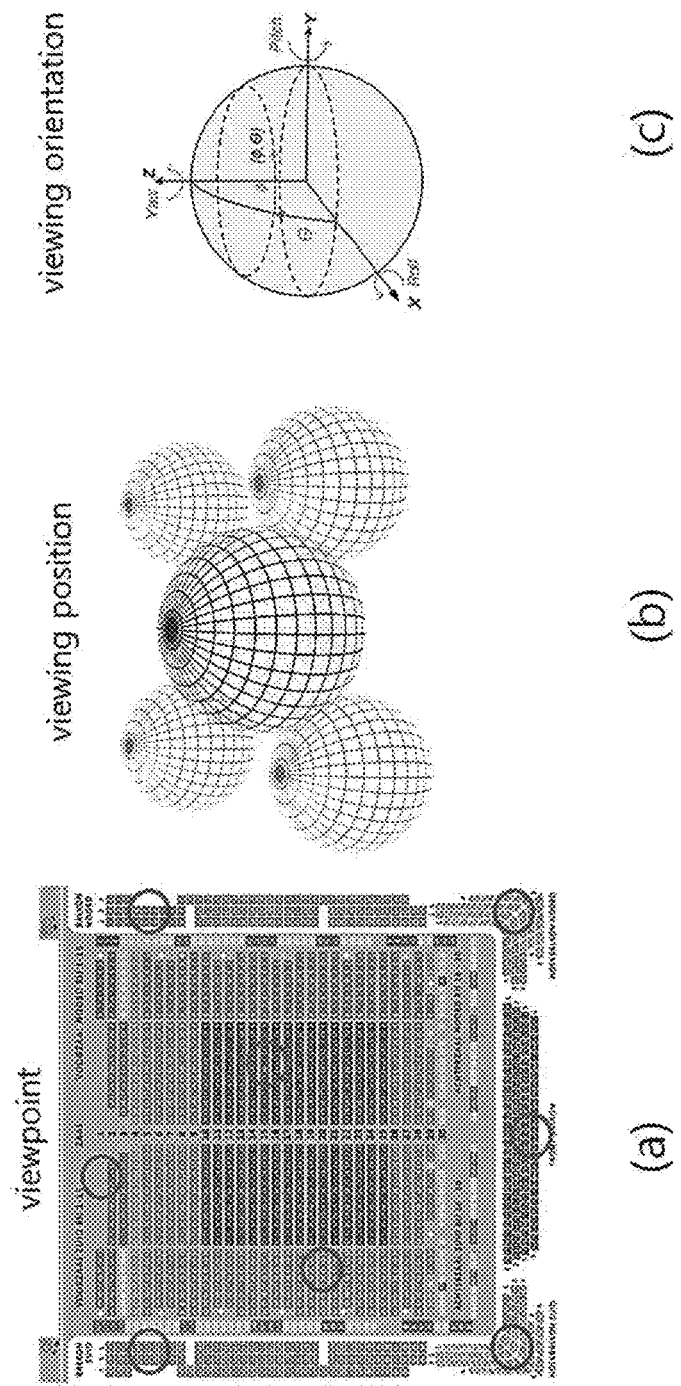
FIG. 12 schematically shows concepts of a viewpoint, a viewing position, and a viewing orientation.

FIG. 12 schematically shows concepts of a view point, a viewing position, and a viewing orientation.

Referring to FIG. 12, on the assumption of a space (e.g., a theater) as in (a), each marked circle may indicate a different view point. An image/voice provided at each view point in the same space may be associated with each other in the same time zone. In this case, different visual/audible experience may be provided to a user depending on a change in a gaze direction or head movement (e.g., head motion) of the user at a specific viewpoint. That is, a sphere of various viewing positions at a specific viewpoint may be assumed, as shown in (b), and image/voice/text information which has taken into consideration of a relative location of each viewing position may be provided.

Meanwhile, as shown in (c), visual/audible information from various directions as in legacy 3DoF may be delivered from a specific viewing position at a specific viewpoint. At this point, not just a main source (e.g., an image/voice/text) but also other various sources combined with the main source may be provided, and, in this case, information associated with or independent of a user's viewing orientation may be delivered.

FIG. 13 is a diagram schematically showing an example of architecture for providing 3DoF+ video according to an embodiment of the present invention.

FIG. 13 may show a flowchart of a 3DoF+ end-to-end system including an acquisition process, a pre-processing process, a transmission process, a (post-)processing process, a rendering process, and a feedback process of 3DoF+.

Referring to FIG. 13, the acquisition process may refer to a process of acquiring 360 video through capturing, composition, or generating the 360 video. Through the acquisition process, a plurality of image/voice information items may be acquired according to change of a viewing direction (e.g., a head motion) for a plurality of positions. In this case, the image may include not just visual information (e.g., texture) but also depth information. In this case, as shown in an example of image information indicated by reference numeral 1310, a plurality of information items for different viewing positions with different viewpoints may be acquired.

The composition process may a procedure and a method for performing composition in order to include, user experience, not just information acquired by an image/voice input device, but also an image (video/image, etc.), a voice (audio/sound effect, etc.), a text (subtitle, etc.) from an external media.

The pre-processing process is a process of preparing (pre-processing) transmission/delivery of acquired 360 video, and may include the above-described stitching, projection, region-wise packing, and/or encoding processes. That is, the pre-processing process may include a pre-processing process and an encoding process to change/make up for data of image/voice/text information according to intention of a person who made the information. For example, the process of pre-processing an image may include: a step of mapping (stitching) acquired visual information on a 360 sphere; a step of performing calibration (editing) to remove a region boundary, reduce difference in color/brightness, or apply visual effects to an image; a (view segmentation) step of segmenting an image by viewpoints; a (projection) step of mapping an image on a 360 sphere into a 2D image; a (region-wise packing) step of performing region-wise packing of an image; and a step of encoding image information. As shown in an example of a video side indicated by reference numeral 1320, a plurality of projection images from different viewing positions according to different viewpoints may be generated.

The transmission process may refer to a process of processing and transmitting image/voice data and metadata having undergone a preparation process (a pre-processing process). In order to deliver a plurality of items of image/voice data from different viewing positions according to different viewpoints and metadata related thereto, a communication network may be used or a unidirectional transmission may be utilized, as described above.

The post-processing and composition processes may refer to a post-processing process for decoding received/stored video/audio/text data and reproduce the same. For example, the post-processing process may include an unpacking process of unpacking packed images, and a re-projection process of restoring a 2D projected image into a 3D spherical image.

The rendering process may refer to a process of rendering image/video data re-projected in a 3D space and display the rendered data. In this course, an image/voice signal may be reconfigured into a form suitable to be output. It is possible to track a viewing orientation in which a region of interest for a user is present, a viewing position/head position of the ROI, and a view point of the ROI, and necessary image/voice/text information only may be selectively used based on the information. In this case, an image signal may be selected with a different viewing position according to a user's ROI, and, as a result, an image of a specific direction from a specific viewing position at a specific viewpoint may be output.

Figure 14A:
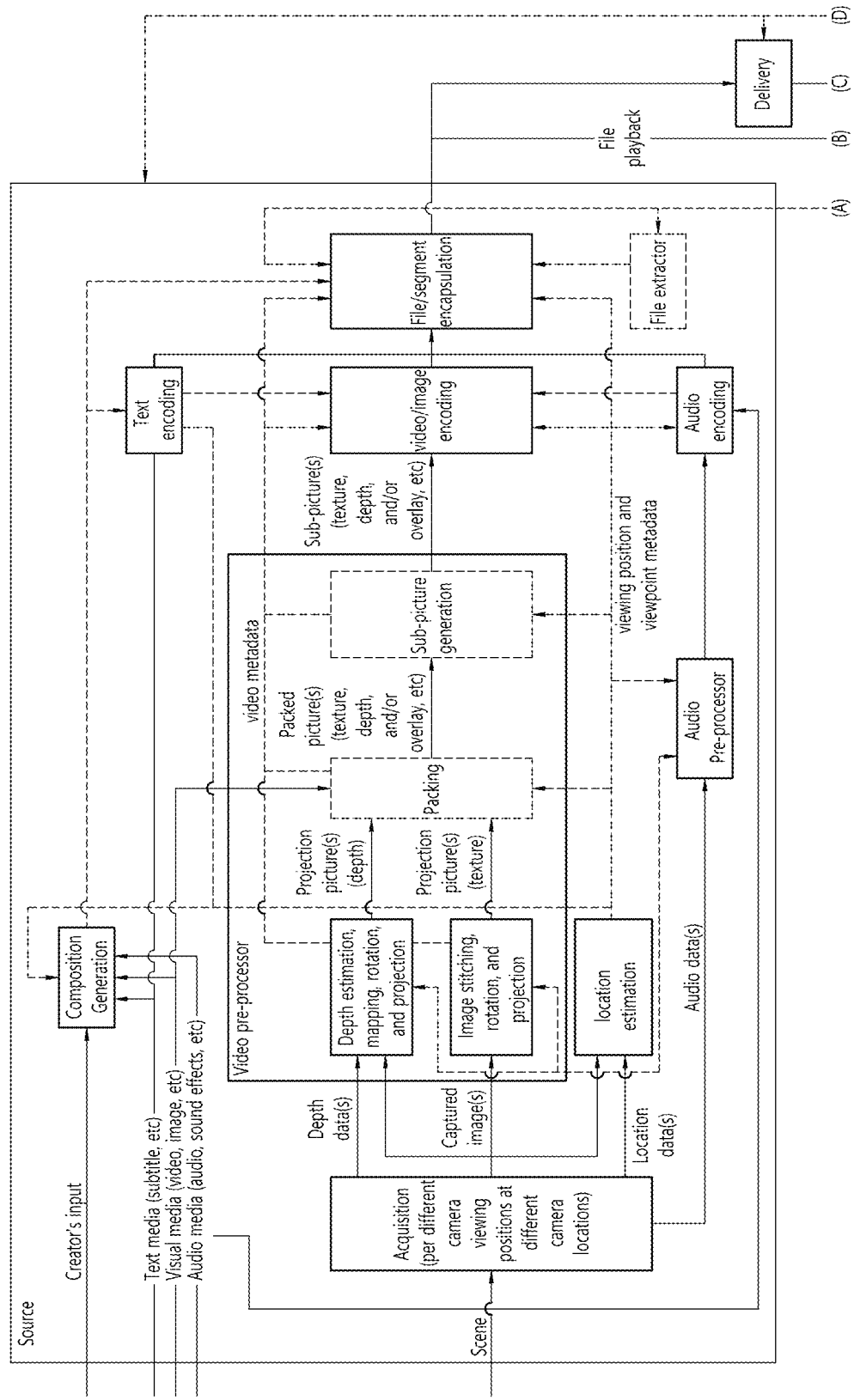
FIGS. 14A and 14B are diagrams showing an example of architecture of a three Degrees of Freedom Plus (3DoF+) end-to-end system.
Figure 14B:
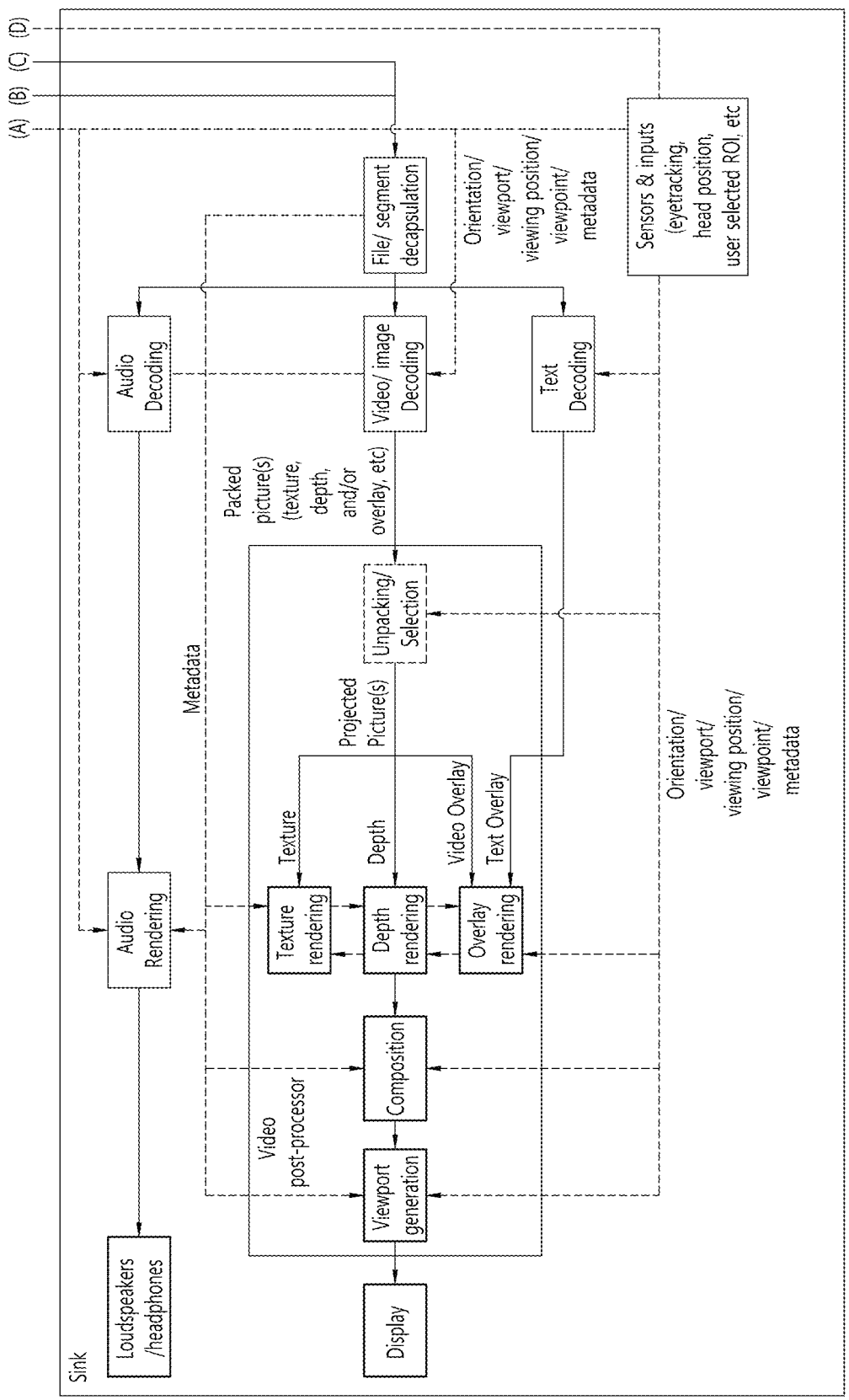

FIGS. 14A and 14B are an example of architecture of a 3DoF+ end-to-end system.

According to the architecture shown in FIGS. 14A and 14B, the above-described 3DoF+ 360 content may be provided.

Referring to FIG. 14A, a 360 video transmission apparatus (transmission point) may be composed largely of: a part (an acquisition unit) for acquiring 360 video (image)/audio data; a part (a video/audio pre-processor) for processing the acquired data; a part (a composition generation unit) for compositing additional information; a part (an encoding unit) for encoding text, audio, and projected 360 video; and a part (an encapsulation unit) for encapsulating the encoded data. As described above, the encoded data may be output in a bitstream form, and the encoded data may be encapsulated into a file format such as ISOBMFF and CFF or may be processed into the form of other DASH segment or the like. The encoded data may be delivered to a 360 video reception apparatus through a digital storage medium, or, although explicitly illustrated, the encoded data may undergo a process necessary for transmission by a transmission processor, as described above, and then transmitted through a broadcast network or a broadband.

In the data acquisition part, different information items may be acquired simultaneously or continuously according to a sensor orientation (a viewing orientation in an image), a sensor position (or a viewing position in an image), and a location at which a sensor acquires information (or a viewpoint in an image), and, in this case, video, image, audio, viewpoint information, etc. may be acquired.

In the case of image data, texture information and depth information may be acquired, and different video pre-processing may be performed according to characteristics of each component. For example, in the case of texture information, a 360 omnidirectional image may be constructed using images of different viewing orientations from the same viewing position at the same viewpoint based on image sensor viewpoint information, and, to this end, a stitching process may be performed. In addition, projection and/or region-wise packing may be performed to change an image to a format to be encoded. For example, a depth image may be acquired usually by a depth camera, and, in this case, the depth image may be made in the form of texture. Alternatively, depth data may be generated based on additionally measured data. After each component image is generated, additional conversion (packing) is performed on a corresponding component into a video format for efficient compression or sub-picture generation is performed to reconfigure a corresponding component into actually necessary portions by partitioning the same. Information on image configuration used in a video pre-processing step is delivered through video metadata.

In the case where image/voice/text information given in addition to acquired data (or data to be primarily serviced) is provided, it is necessary to provide information to composite the information and the data at a final reproduction time. The composition generation unit generates information, which is used to composite externally generated media data (video/image for an image, audio/effect sound for a voice, subtitle for a text, etc.) at a final reproduction step, according to intention of a producer, and the generated information is delivered through composition metadata.

Image/voice/text information having underwent respective corresponding processes is compressed using corresponding respective encoders, and encapsulated by an application based on a file/or segment unit. In this case, according to a file or segment configuration method, it is possible to extract only necessary information (by a file extractor).

In addition, information necessary to reconfigure each data in a receiver is delivered on a codec level or a file format/system level, and, in this case, the data includes video/audio metadata for reconfiguring video/audio, composition metadata for overlay, viewing position and viewpoint metadata on video/audio reproduction-allowed viewpoints and a viewing position dependent on each viewpoint, etc. Such information may be processed by an additional metadata processor.

Referring to FIG. 14B, a 360 video reception apparatus (a reception point) may be composed largely of: a part (a file/segment decapsulation unit) for decapsulating a received file or segment; a part (a decoding unit) for generating image/voice/text information based on a bit stream; a part (a post-processor) for reconfiguring image/voice text; a part (a tracking unit) for tracking a user's ROI; and a display which is a display device.

Bit streams generated through decapsulation may be partitioned into image/voice/text according to a type of data and then individually decoded into a reproducible format.

In the tracking part, information on a viewpoint of a user's ROI, a viewing position at the corresponding viewpoint, and a viewing orientation from the corresponding viewing position may be generated based on information of a sensor and information of a user input, and the generated information may be used to select or extract the ROI in each module of the 360 video reception apparatus or to perform post-processing to highlight the ROI. In addition, if the generated information is delivered to a 360 video transmission apparatus, the generated information may be used in various image reconfiguration methods (viewport/viewing position/viewpoint dependent processing) for efficient bandwidth use.

A method for processing a decoded image signal may vary according to any of various processing methods depending on an image configuration method. When image packing is performed in the 360 video transmission apparatus, a process of reconfiguring an image based on information delivered through metadata is necessary. In this case, video metadata generated by the 360 video transmission apparatus may be used. In addition, in the case where the decoded image includes images of multiple-viewpoints, multiple viewing positions, or multiple viewing orientations, information matching with a viewpoint, a viewing position, or viewing orientation of a user's ROI generated through tracking may be selected and processed. In this case, viewing position and viewpoint related metadata generated by the transmission point may be used. In addition, in the case where multiple components are delivered with respect to a specific viewpoint, viewing position, or viewing orientation or video information for overlay is delivered additionally, a rendering process for respective corresponding information may be included. Video data (texture, depth, overlay) having gone through the additional rendering process goes through a composition process, and, in this case, composition metadata generated by the transmission point may be used. As a result, information necessary to reproduce a viewport according to the user's ROI may be generated.

A decoded voice signal is used to generate a voice signal through an audio renderer and/or post-processing. In this case, information matching with the user's demand may be generated based on information on a user's ROI and metadata delivered to the 360 video reception apparatus.

A decoded text signal may be delivered to an overlay renderer to be processed into text-based overlay information such as subtitle. If necessary, an additional text post-processing process may be included.

Figure 15:
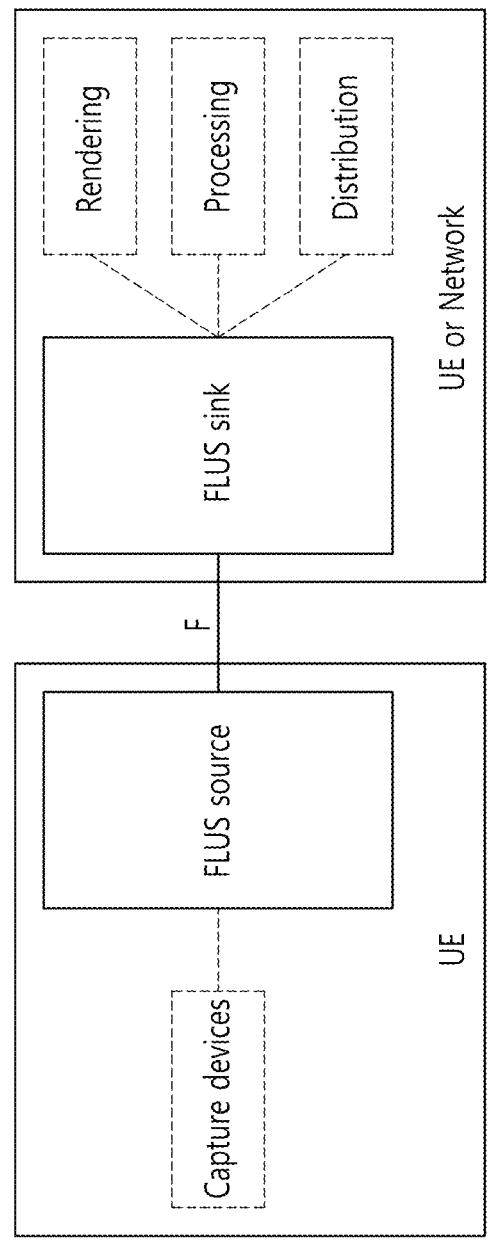
FIG. 15 is a diagram schematically showing an example of Framework for Live Uplink Streaming (FLUS) architecture.

FIG. 15 is a diagram schematically showing examples of FLUS architecture.

FIG. 15 shows an example in which a User Equipment (UE) or another UE or a network perform communication a wireless communication system based on Framework for Live Uplink Streaming (FLUS). An FLUS source and an FLUS sink may transmit and receive data to and from each other using an F reference point.

In the present specification, an "FLUS source" may indicate an apparatus that transmits data to a FLUS sink through the F reference point based on FLUS. However, the FLUS source does not always transmit data to a FLUS sink, and, in some cases, the FLUS source may receive data from the FLUS sink through the F reference point. The FLUS source may be construed to be identical/similar to an image transmission apparatus or 360 video transmission apparatus disclosed throughout the present specification, to include the image transmission apparatus or 360 video transmission apparatus, or to be included in the image transmission apparatus or 360 video transmission apparatus. The FLUS source may be a UE, a network, a server, a cloud server, a Set Top Box (STB), a base station, a PC, a desktop, a laptop, a camera, a camcorder, a TV, and the like and may be an component or module included in the exemplary apparatuses, and furthermore apparatuses similar to the exemplary apparatuses may operate as FLUS sources. Examples of the FLUS source are not limited thereto.

In the present specification, an "FLUS sink" may indicate an apparatus that receives data from an FLUS sink through a F reference point based on FLUS. However, the FLUS source does not always receive data from the FLUS sink, and, in some cases, the FLUS sink may transmit data to the FLUS sink through the F reference point. The FLUS sink may be construed to be identical/similar to an image reception apparatus or 360 video reception apparatus disclosed throughout the present specification, to include the image reception apparatus or 360 video reception apparatus, or to be included in the image reception apparatus or 360 video reception apparatus. The FLUS sink may be a UE, a network, a server, a cloud server, a Set Top Box (STB), a base station, a PC, a desktop, a laptop, a camera, a camcorder, a TV, and the like and may be an component or module included in the exemplary apparatuses, and furthermore apparatuses similar to the exemplary apparatuses may operate as FLUS sinks. Examples of the FLUS sink are not limited thereto.

Referring to FIG. 15, it is illustrated that an FLUS source and capture devices compose one UE, but exemplary embodiments of the present invention are not limited thereto. The FLUS source may include capture devices, and the FLUS source itself including the capture devices may be a UE. Alternatively, the capture devices may be not included in the UE and may transmit media information to a UE. The number of capture devices may be one or more.

Referring to FIG. 15, it is illustrated that an FLUS sink, a rendering module (or unit), a processing module (or unit), and a distribution module (or unit) compose one UE or network, but exemplary embodiments of the present invention are not limited thereto. The FLUS sink may include at least one of the rendering module, the processing module, or the distribution module, and the FLUS sink itself including the rendering module, the processing module, and the distribution module may be a UE or network. Alternatively, at least one of the rendering module, the processing module, or the distribution module may be not included in a UE or network, and the FLUS sink may transmit media information to at least one of the rendering module, the processing module, or the distribution module. The number of rendering modules, the number of processing modules, and the number of distribution modules may be at least one, and, in some cases, some of them may not exist.

In one example, the FLUS sink may operate as a Media Gateway Function (MGW) and/or an Application Function (AF).

In FIG. 15, the F reference point connecting the FLUS source and the FLUS sink may allow the FLUS source to establish and control a single FLUS session. In addition, the F reference point may enable the FLUS sink to authenticate and authorize the FLUS source. In addition, the F reference point may support a function of protecting security of the FLUS control plane (F-C) and the FLUS user plane (F-U).

In one embodiment, each of the FLUS source and the FLUS sink may include an FLUS ctrl module, and the respective FLUS ctrl modules of the FLUS source and the FLUs sink may be connected through the F-C. The FLUS ctrl module and the F-C may provide a function of performing downstream distribution on a media in which the FLUs sink is uploaded, provide media instantiation selection, and support configuration of static metadata for a session. In one example, when the FLUS sink is only capable of rendering, the F-C may not exist.

In one embodiment, the F-C may be used to establish and control an FLUS session. The F-C may be used to allow the FLUS source to select a FLUS media instantiation such as MTSI, provide static metadata associated with a media session, and select and configure the processing and distribution functions.

The FLUS media instance may be defined as part of the FLUS session. The F-U may, in some cases, contain media stream establishment procedures, and a plurality of media streams may be generated for one FLUS session.

A media stream may include media components of a single content type such as audio, video, and text, and may include media components of different content types such as audio and video. The FLUS session may be composed of a plurality of identical content types. For example, the FLUS session may be composed of a plurality of media streams for video.

In addition, in one embodiment, each of the FLUS source and the FLUS sink may include an FLUS media module, and the respective FLUS media modules of the FLUS source and the FLUs sink may be connected through the F-U. The FLUS media module and the F-U may provide a function of generating one or more media sessions and a function of transmitting media data through a media stream. In some cases, a media session establishment protocol (e.g., IMS session set-up for MTSI-based FLUS).

Figure 16:
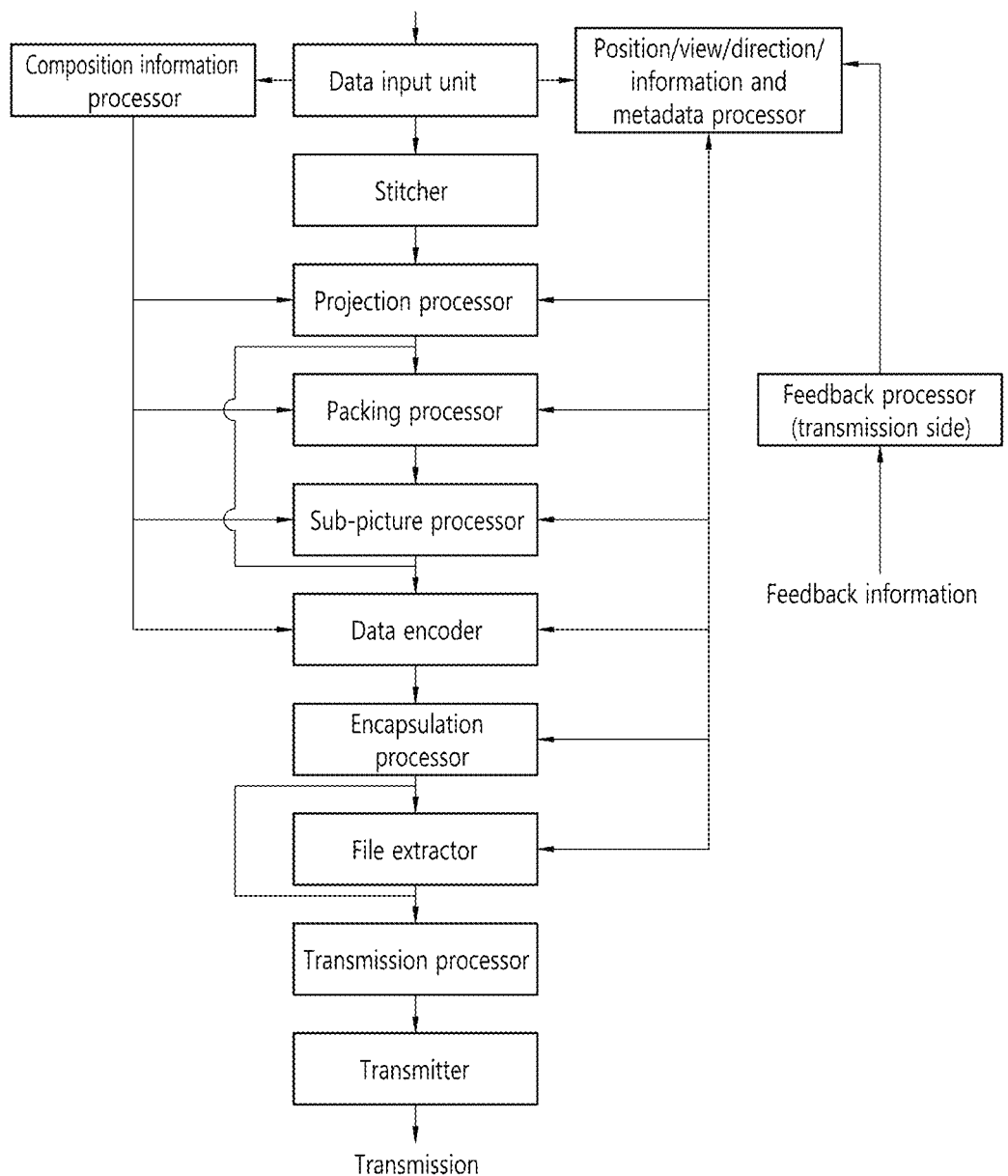
FIG. 16 is a diagram schematically showing an example of configuration of a 3DoF+ transmission point.

FIG. 16 is a diagram schematically showing an example of configuration of a 3DoF+ transmission point.

Referring to FIG. 16, if input data is an image output from a camera, a transmission point (a 360 video transmission apparatus) may perform a stitching process for each viewpoint/viewing position/component to reconfigure a sphere image. When a sphere image for each viewpoint/viewing position/component is configured, the image may be projected into a 2D image for coding. According to an application, a packing process may be performed to pack multiple images into an integrated image or an image may be partitioned into sub-pictures of detailed regions. As described above, region-wise packing may be an optional process and thus may not be performed, and, in this case, a packing processor may be omitted. If the input data is image/voice/text additional information, a method for adding the information to a central image to be displayed may be informed, and additional data may be transmitted together. An encoding process of generating a compressed image and added data into a bit stream, and an encapsulation process of transforming the bit stream into a file format for transmission or storage may be performed. In this case, depending on a demand from an application or system, a process of extracting a file necessary for a receiver may be performed. The generated bit stream may be transformed into a transmission format by a transmission processor and then transmitted. In this case, a transmission-side feedback processor may process viewpoint/viewing position/viewing orientation information and necessary metadata based on information received from the reception point so that the transmitter may process the information and the metadata.

Figure 17:
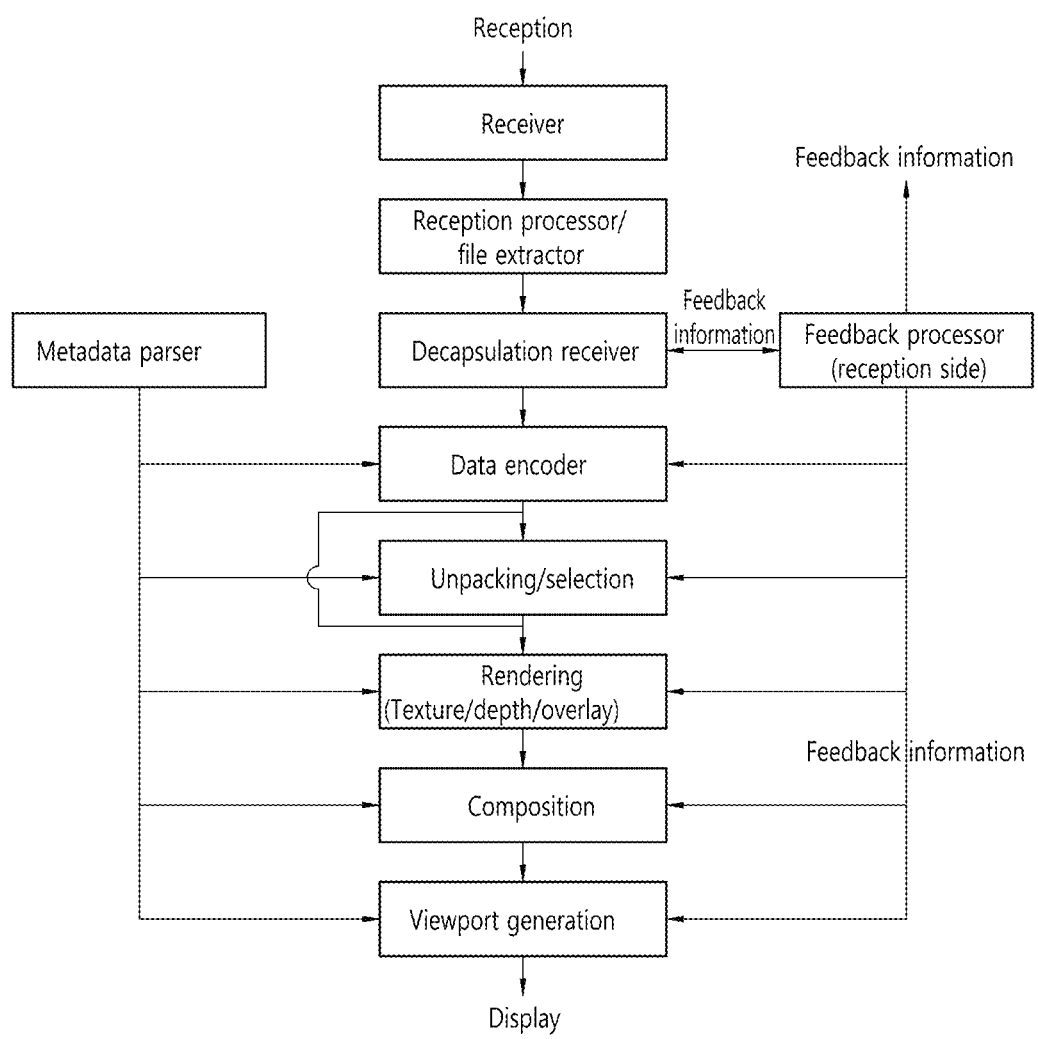
FIG. 17 is a diagram schematically showing an example of configuration of a 3DoF+ reception point.

FIG. 17 is a diagram schematically showing an example of configuration of a 3DoF+ receiver.

Referring to FIG. 17, a reception point (a 360 video reception apparatus) may receive a bit stream transmitted from a transmission point, and extract a necessary file from the bit stream. It is possible to select an image stream in a generated file format using viewpoint/viewing position/viewing orientation information and video metadata delivered from a feedback processor, and to reconfigure the selected bit stream into image information using a decoder. Packed images may be unpacked based on packing information transmitted through metadata. If the packing process is omitted in the transmission point, unpacking in the reception point may be omitted as well. In addition, as necessary, it is possible to perform a process of selecting an image suitable for a viewpoint/viewing position/viewing orientation delivered from the feedback processor and a necessary component. It is possible to perform a rendering process of reconfiguring an image into a format suitable to reproduce texture, depth, overlay information of the image. Before generating a final image, a composition process may be performed to integrate information of different layers, and an image suitable for a display viewport may be generated and reproduced.

Meanwhile, metadata about 360-degree video may include a syntax element for a viewpoint information structure in an embodiment. The syntax element for the viewpoint information structure may provide viewpoint information including a viewpoint position and yaw, pitch and roll angles of the x axis, y axis and z axis of a global coordinate system with respect to a common reference coordinate system of viewpoints. The syntax element for the viewpoint information structure may be represented through the syntax of the following table 1, for example.

TABLE 1

```
aligned(8) ViewpointInfoStruct(gcs_rotated_flag) {
    ViewpointPosStruct( );
    if (gcs_rotated_flag) {
        ViewpointGlobalCoordinateSysRotationStruct( );
    }
}
aligned(8) ViewpointPosStruct( ) {
    signed int(32) viewpoint_pos_x;
    signed int(32) viewpoint_pos_y;
    signed int(32) viewpoint_pos_z;
    unsigned int(1) viewpoint_gpspos_present_flag;
    bit(31) reserved = 0;
    if(viewpoint_gpspos_present_flag) {
        signed int(32) viewpoint_gpspos_longitude;
        signed int(32) viewpoint_gpspos_latitude;
        signed int(32) viewpoint_gpspos_altitude;
    }
}
```

TABLE 1-continued

```
aligned(8) class ViewpointGlobalCoordinateSysRotationStruct( ) {
    signed int(32) viewpoint_gcs_yaw;
    signed int(32) viewpoint_gcs_pitch;
    signed int(32) viewpoint_gcs_roll;
}
```

The syntax of the table 1 includes ViewpointInfoStruct, gcs_rotated_flag, viewpoint_pos_x, viewpoint_pos_y, viewpoint_pos_z, viewpoint_gpspos_present_flag, viewpoint_gpspos_longitude, viewpoint_gpspos_latitude, viewpoint_gpspos_altitude, viewpoint_gcs_yaw, viewpoint_gcs_pitch, and viewpoint_gcs_roll.

ViewpointInfoStruct may correspond to an example representing the syntax element for the viewpoint information structure. However, an example of the syntax element representing the viewpoint information structure is not limited to ViewpointInfoStruct.

When gcs_rotated_flag is 1, information on a yaw rotation angle, a pitch rotation angle and a roll rotation angle of the x axis, y axis and z axis of the global coordinate system with respect to the common reference coordinate system may be represented. When gcs_rotated_flag is 0, information about a yaw rotation angle, a pitch rotation angle and a roll rotation angle of the x axis, y axis and z axis, respectively, of the global coordinate system relative to the common reference coordinate system may not be represented.

The information on a yaw rotation angle, a pitch rotation angle and a roll rotation angle of the x axis, y axis and z axis, respectively, of the global coordinate system relative to the common reference coordinate system may be represented as viewpoint_gcs_yaw, viewpoint_gcs_pitch and viewpoint_gcs_roll, for example. The unit may be $2^{-16}$ degrees. The range of viewpoint_gcs_yaw may be $-180*2^{16}$ to $180*2^{16}-1$, the range of viewpoint_gcs_pitch may be $-90*2^{16}$ to $90*2^{16}$, and the range of viewpoint_gcs_roll may be $-180*2^{16}$ to $180*2^{16}-1$.

viewpoint_pos_x, viewpoint_pos_y and viewpoint_pos_z may represent the position of a viewpoint in millimeters when (0, 0, 0) is set to the center of the common reference coordinate system in a 3-dimensional space.

When viewpoint_gpspos_present_flag is 1, viewpoint_gpspos_longitude, viewpoint_gpspos_latitude and viewpoint_gpspos_altitude may be represented. When viewpoint_gpspos_present_flag is 0, viewpoint_gpspos_longitude, viewpoint_gpspos_latitude and viewpoint_gpspos_altitude may not be represented. viewpoint_gpspos_longitude, viewpoint_gpspos_latitude and viewpoint_gpspos_altitude may represent the longitude, latitude and altitude of geolocation of a viewpoint.

In an embodiment, a viewpoint configuration box may store metadata related to a viewpoint. The viewpoint configuration box may be represented as ViewpointConfigBox of the following table 2, for example.

TABLE 2

```
class ViewpointConfigBox(type) extends FullBox('vwcf', 0, 0) {
    bit(6) reserved = 0;
    unsigned int(1)      viewpoint_pos_changed;
    unsigned int(1)      gcs_rotated_flag;
    ViewpointInfoStruct(gcs_rotated_flag);
    unsigned int(16) viewpoint_id;
    string viewpoint_label;
}
```

The syntax of the table 2 includes ViewpointConfigBox, viewpoint_pos_changed, viewpoint_id, and viewpoint_label.

When viewpoint_pos_changed is 0, a viewpoint position may remain unchanged.

When viewpoint_pos_changed is 1, the viewpoint position may be changed. When viewpoint_pos_changed is 1, a dynamic viewpoint timed metadata track may be represented in a file. The dynamic viewpoint timed metadata track may represent that viewpoint parameters dynamically change over time.

viewpoint_id may represent a unique identifier of a viewpoint. Two or more viewpoints cannot have the same viewpoint_id. viewpoint_label may be a null-terminated UTF-8 string that provides a text label readable by a person with respect to a viewpoint.

ViewpointConfigBox may be represented in arbitrary boxes of a file.

In an embodiment, 360-degree metadata about viewpoint track grouping may be provided. Tracks belonging to the same viewpoint may have the same track_group_id for track_group_type 'vipo', and track_group_id of tracks from a specific viewpoint may differ from track_group_id of tracks from a different viewpoint. When track grouping with respect to an arbitrary track in a file is not indicated by default, the file may be considered to include only content with respect to viewpoints. An example of a syntax for viewpoint track grouping is shown in the following table 3.

TABLE 3

```
aligned(8) class ViewpointGroupBox extends
TrackGroupTypeBox('vipo') {
    bit(6)       reserved = 0;
    unsigned int(1)    viewpoint_pos_changed;
    unsigned int(1)    gcs_rotated_flag;
    unsigned int(1)    gcs_rotated_changed;
    if(viewpoint_pos_changed == 0){
        ViewpointPosStruct( );
        ViewpointInfoStruct(gcs_rotated_flag);
    }
    unsigned int(16) viewpoint_id;
    string viewpoint_label;
}
```

Tracks having the same track_group_id in TrackGroupTypeBox having track_group_type of 'vipo' may be included in the same viewpoint.

When viewpoint_pos_changed is 0, the position of a viewpoint related to tracks may remain unchanged. When viewpoint_pos_changed is 1, the position of a viewpoint related to tracks may be changed. When viewpoint_pos_changed is 1, a dynamic viewpoint timed metadata track may be represented in a file. The dynamic viewpoint timed metadata track may represent that viewpoint parameters dynamically change over time.

When gcs_rotated_changed is 1, a yaw rotation angle, a pitch rotation angle and a roll rotation angle of the x axis, y axis and z axis, respectively, of a global coordinate system relative to a common reference coordinate system may dynamically change over time. When gcs_rotated_changed is 1, the dynamic viewpoint timed metadata track may indicate viewpoint parameters that dynamically change over time. When gcs_rotated_changed is 0, values of viewpoint_gcs_yaw, viewpoint_gcs_pitch and viewpoint_gcs_roll may not change over time.

viewpoint_id may represent a unique identifier of a viewpoint. Two or more viewpoints do not have the same viewpoint_id.

viewpoint_label may be a null-terminated UTF-8 string that provides a text label readably by a person with respect to a viewpoint.

In an embodiment, metadata about a 360-degree video may provide dynamic viewpoint information. A dynamic viewpoint timed metadata track may indicate viewpoint parameters that dynamically change over time. In an example, when an OMAF player starts playback after switching from a viewpoint to a specific viewpoint, the OMAF player may use signaled information as follows. If a recommended viewing orientation is explicitly signaled, the OMAF player may follow the recommended viewing orientation by parsing information on the recommended viewing orientation. If not, the OMAF player may be expected to maintain a viewing orientation immediately before viewpoint switching occurs.

A track sample entry type 'dyvp' may be used. An example of a syntax representing this is shown in the following table 4.

TABLE 4

```
class DynamicViewpointSampleEntry extends
MetaDataSampleEntry('dyvp') {
    ViewpointPosStruct( );
    unsigned int(32) viewpoint_id;
    bit(6) reserved = 0;
    unsigned int(1) dynamic_gcs_rotated_flag;
    unsigned int(1) viewpoint_gpspos_present_flag;
    if (dynamic_gcs_rotated_flag == 0) {
        ViewpointGlobalCoordinateSysRotationStruct( );
    }
    signed int(32) viewpoint_pos_x_min;
    signed int(32) viewpoint_pos_x_max;
    signed int(32) viewpoint_pos_y_min;
    signed int(32) viewpoint_pos_y_max;
    signed int(32) viewpoint_pos_z_min;
    signed int(32) viewpoint_pos_z_max;
    if (viewpoint_gpspos_present_flag) {
        signed int(32) viewpoint_gpspos_longitude_min;
        signed int(32) viewpoint_gpspos_longitude_max;
        signed int(32) viewpoint_gpspos_latitude_min;
        signed int(32) viewpoint_gpspos_latitude_max;
        signed int(32) viewpoint_gpspos_altitude_min;
        signed int(32) viewpoint_gpspos_altitude_max;
    }
}
```

In the table 4, viewpoint_id may indicate a viewpoint ID of a viewpoint related to all samples that refer to a sample entry.

When dynamic_gcs_rotated_flag is 1, a yaw rotation angle, a pitch rotation angle and a roll rotation angle of the x axis, y axis and z axis, respectively, of the global coordinate system relative to the common reference coordinate system may be indicated in a sample format. When gcs_rotated_changed is 0, values of viewpoint_gcs_yaw, viewpoint_gcs_pitch and viewpoint_gcs_roll may not change in all samples that refer to sample entry.

When viewpoint_gpspos_present_flag is 1, viewpoint_gpspos_longitude, viewpoint_gpspos_latitude and viewpoint_gpspos_altitude may be represented in a sample format. When viewpoint_gpspos_present_flag is 0, viewpoint_gpspos_longitude, viewpoint_gpspos_latitude and viewpoint_gpspos_altitude may not be represented in all samples that refer to sample entry.

ViewpointPosStruct( ) may indicate an initial viewpoint position of a related viewpoint.

ViewpointGlobalCoordinateSysRotationStruct( ) may represent yaw, pitch and roll rotation angles for the common reference coordinate system for each sample that refers to sample entry.

viewpoint_pos_x_min and viewpoint_pos_x_max may represent a minimum value and a maximum value of viewpoint_pos_x in all samples that refer to sample entry.

viewpoint_pos_y_min and viewpoint_pos_y_max may represent a minimum value and a maximum value of viewpoint_pos_y in all samples that refer to sample entry.

viewpoint_pos_z_min and viewpoint_pos_z_max may represent a minimum value and a maximum value of viewpoint_pos_z in all samples that refer to sample entry.

viewpoint_gpspos_longtitude_min and viewpoint_gpspos_longtitude_max may represent a minimum value and a maximum value of viewpoint_gpspos_longtitude in all samples that refer to sample entry.

viewpoint_gpspos_latitude_min and viewpoint_gpspos_latitude_max may represent a minimum value and a maximum value of viewpoint_gpspos_latitude in all samples that refer to sample entry.

viewpoint_gpspos_altitude_min and viewpoint_gpspos_altitude_max may represent a minimum value and a maximum value of viewpoint_gpspos_altitude in all samples that refer to sample entry.

In an embodiment, an example of a sample syntax having a sample entry type of 'dyvg' is shown in the following table 5.

TABLE 5

```
aligned(8) DynamicViewpointSample( ) {
    ViewpointInfoStruct(dynamic_gcs_rotated_flag);
}
```

In an embodiment, metadata about a 360-degree video may provide dynamic viewpoint group information. A dynamic viewpoint group timed metadata track may represent information on a group including a viewpoint that dynamically changes over time. A track sample entry type 'dyvg' may be used and sample entry of the aforementioned sample entry type may be represented as shown in the following table 6.

TABLE 6

```
class DynamicViewpointGroupEntry extends
MetaDataSampleEntry('dyvg') {
    unsigned int(32)  viewpoint_id;
    unsigned int(8)   num_groups_max;
}
``` viewpoint_id may represent a viewpoint ID of a viewpoint related to all samples that refer to sample entry. numb_groups_max may represent a maximum number of groups to which viewpoints belong in samples that refer to sample entry.

In an embodiment, a sample syntax of a sample entry type 'dyvg' may be represented as shown in the following table 7, for example.

TABLE 7

```
aligned(8) DynamicViewpointGroupSample( ) {
    unsigned int(8) num_groups;
    for (i = 0; i < num_groups; i++) {
        unsigned int(32)  vp_group_id;
        unsigned int(32)  anchor_viewpoint_id;
        unsigned int(1)   non_contiguous_flag;
        unsigned int(7)   num_viewpoints;
    }
}
```

In the table 7, num_groups may represent the number of groups to which a viewpoint belongs in each sample. vp_group_id may represent the ID of a group to which a viewpoint belongs. anchor_viewpoint_id may represent a value of viewpoint_id of a viewpoint that is an anchor of a plurality of viewpoints in a group. When non_contiguous_flag is 0, contiguous switching between viewpoints may be performed in the same group. When non_contiguous_flag is 1, switching between viewpoints in the same group may correspond to non-contiguous switching. num_viewpoints may represent the number of viewpoints in the same group. Parameters (num_groups, vp_group_id, anchor_viewpoint_id, non_contiguous_flag, num_viewpoints, etc.) shown in the table 7 may be represented in arbitrary boxes in a file, such as a track group box and a sample group box.

In an embodiment, 360-degree video metadata may include initial viewing orientation metadata of a viewpoint track group. An initial viewing orientation metadata track may represent an initial viewing orientation of related viewpoint media tracks. A viewpoint video is played through one or more tracks, and the initial viewing orientation metadata track may be related to one or more media tracks having 'cdsc' track reference which satisfies a condition of 'both track_group_id equal to track_IDs[i] and (flags & 1) of TrackGroupTypeBox equal to 1'.

In an embodiment, 360-degree video metadata may include information on a sample group with respect to initial viewing orientations of a plurality of viewpoints. A timed metadata track having a sample entry type of 'invo' may include one or more SampleToGroupBox having grouping_type of 'vwpt'. SampleToGroupBox may represent allocation of samples in timed metadata (and corresponding samples in media tracks) to viewpoints. When SampleToGroupBox having grouping_type of 'vwpt' is represented, SampleGroupDescriptionBox of the same grouping type may be represented and include the ID of a specific viewpoint of a group to which samples belong. Sample group entry 'ViewpointEntry' having grouping_type of 'vwpt' may be represented as shown in the following table 8, for example.

TABLE 8

```
class ViewpointEntry( ) extends SampleGroupDescriptionEntry('vwpt') {
    unsigned int(32)   viewpoint_id;
    bit(6)             reserved = 0;
    unsigned int(1)    viewpoint_pos_changed;
    unsigned int(1)    gcs_rotated_flag;
    ViewpointInfoStruct(gcs_rotated_flag);
}
``` viewpoint_id may represent a viewpoint ID of a viewpoint related to a group of samples. An initial viewing orientation of the group of samples may be applied to a media track related to the viewpoint ID.

When the value of viewpoint_pos_changed is 0, this may represent that the position of a viewpoint related to a group of samples remains unchanged. When the value of viewpoint_pos_changed is 1, the position of the viewpoint may be changed. When the value of viewpoint_pos_changed is 1, a dynamic viewpoint timed metadata track may be represented in a file. The dynamic viewpoint timed metadata track may represent viewpoint parameters that dynamically change over time.

When gcs_rotated_flag is 1, information on a yaw rotation angle, a pitch rotation angle and a roll rotation angle of the x axis, y axis and z axis, respectively, of the global coordinate system relative to the common reference coordinate system may be represented. When gcs_rotated_flag is 0, information on a yaw rotation angle, a pitch rotation angle and a roll rotation angle of the x axis, y axis and z axis, respectively, of the global coordinate system relative to the common reference coordinate system may not be represented.

ViewpointInfoStruct may provide viewpoint information related to a sample group including a viewpoint position and yaw, pitch and roll angles of the x axis, y axis and z axis of the global coordinate system with respect to the common reference coordinate system.

Meanwhile, specific terms or sentences for defining specific information or concepts are used in the specification. For example, a specific term or sentence for defining specific metadata in the specification. In an example, a viewpoint ID of a viewpoint related to all samples that refer to sample entry is defined as "viewpoint_id" in the specification. However, "viewpoint_id" may be replaced by various terms such as viewpointID and viewpoint_identifier, and in interpretation of a specific term or sentence used to define specific information or concept in the entire specification, interpretation limited to the name thereof should not be made and it is necessary to interpret the term focusing on various operations, functions and effects according to details intended to be represented by the term.

Figure 18:
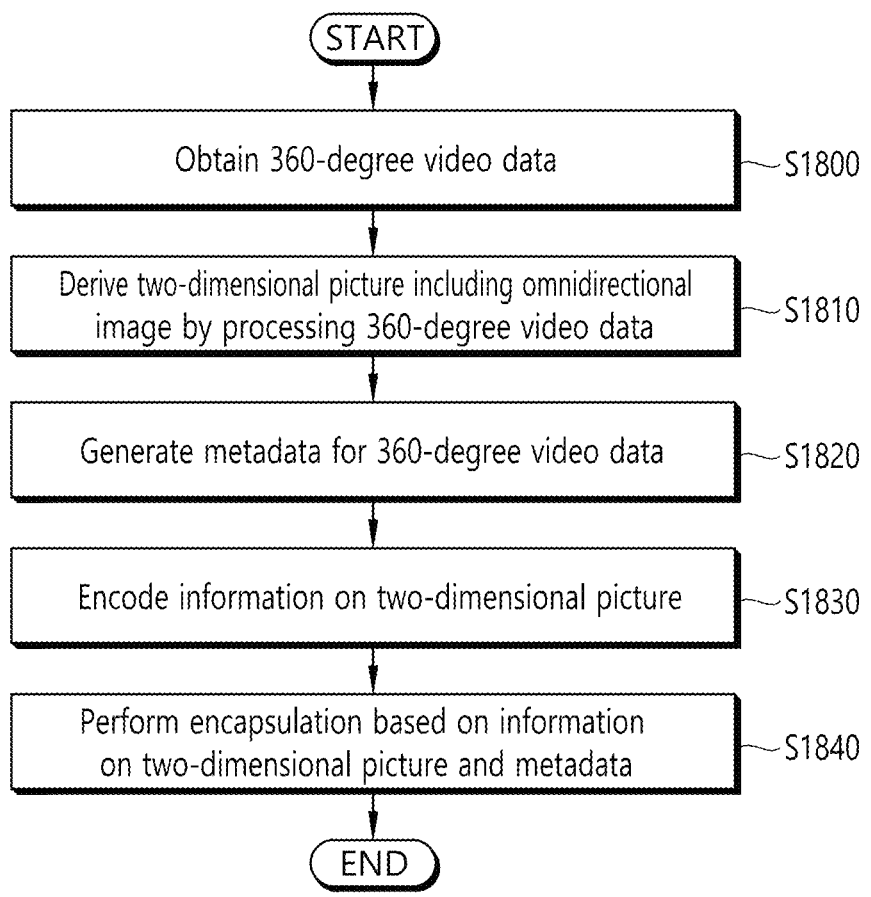
FIG. 18 is a flowchart illustrating an operation method of a 360-degree video transmission apparatus according to an embodiment.
Figure 19:
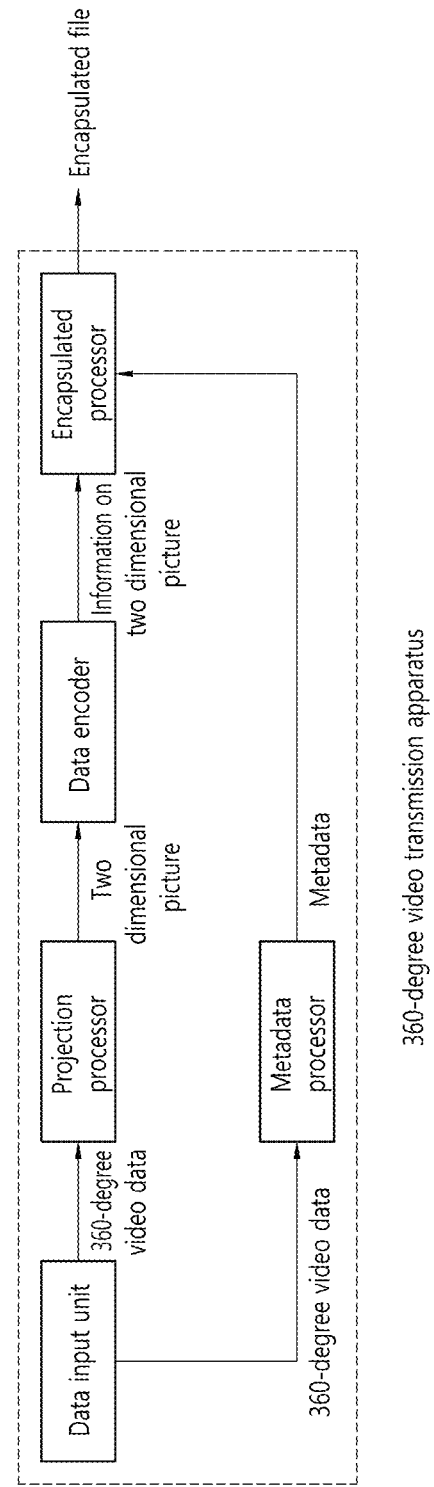
FIG. 19 is a block diagram illustrating a configuration of the 360-degree video transmission apparatus according to an embodiment.

FIG. 18 is a flowchart illustrating an operation method of a 360-degree video transmission apparatus according to an embodiment and FIG. 19 is a block diagram illustrating a configuration of the 360-degree video transmission apparatus according to an embodiment.

Each step shown in FIG. 18 may be performed by the 360 video transmission apparatus shown in FIG. 5, the 360 video transmission apparatus shown in FIG. 14a, the FLUS source shown in FIG. 15 or the 360-degree video transmission apparatus shown in FIG. 19. In an example, S1800 of FIG. 18 may be performed by the data input unit of the 360 video transmission apparatus shown in FIG. 5, S1810 of FIG. 18 may be performed by the projection processor of the 360 video transmission apparatus shown in FIG. 5, S1820 of FIG. 18 may be performed by the metadata processor shown in FIG. 5, S1830 of FIG. 18 may be performed by the data encoder of the 360 video transmission apparatus shown in FIG. 5, and S1840 of FIG. 18 may be performed by the encapsulation processor of the 360 video transmission apparatus shown in FIG. 5. Accordingly, in description of the steps of FIG. 18, description of the same parts as those in FIGS. 5, 14a and 15 will be omitted or simplified.

As shown in FIG. 19, the 360-degree video transmission apparatus according to an embodiment may include a data input unit, a projection processor, a metadata processor, a data encoder and an encapsulation processor. However, all components shown in FIG. 19 may not be prerequisites of the 360-degree video transmission apparatus and the 360-degree video transmission apparatus may be realized by more or fewer components than those shown in FIG. 19.

In the 360-degree video transmission apparatus according to an embodiment, the data input unit, the projection processor, the metadata processor, the data encoder and the encapsulation processor may be realized by separate chips or at least two components may be realized by one chip.

In the specification, "360 video" and "360-degree video" may indicate the same object although the names thereof are different. Accordingly, the "360 video transmission apparatus" shown in FIG. 5 and the "360-degree video transmission apparatus" shown in FIG. 19 may perform the same/similar operations although they have different names and the "360 video reception apparatus" shown in FIG. 6 and a "360-degree video reception apparatus" shown in FIG. 21 may perform the same/similar operations although they have different names.

The 360-degree video transmission apparatus according to an embodiment may obtain 360-degree video data (S1800). For example, the data input unit of the 360-degree video transmission apparatus may obtain 360-degree video data captured by at least one camera.

The 360-degree video transmission apparatus according to an embodiment may derive a 2-dimensional picture including an omnidirectional image by processing the 360-degree video data (S1810). More specifically, the projection processor of the 360-degree video transmission apparatus may derive a 2-dimensional picture including an omnidirectional image by processing the 360-degree video data.

The 360-degree video transmission apparatus according to an embodiment may generate metadata with respect to the 360-degree video data (S1820). More specifically, the metadata processor of the 360-degree video transmission apparatus may generate metadata with respect to the 360-degree video data.

In an embodiment, the metadata may include a dynamic global coordinate system rotation flag which indicates whether relative rotation angles between a common reference coordinate system of a dynamic viewpoint and a global coordinate system are changed.

In an example, the dynamic global coordinate system rotation flag may be represented as dynamic_gcs_rotated_flag.

In an embodiment, the dynamic global coordinate system rotation flag is for a sample entry, and the relative rotation angles between the common reference coordinate system of the dynamic viewpoint and the global coordinate system remain unchanged in samples that refer to the sample entry when the dynamic global coordinate system rotation flag indicates 0.

In an embodiment, when the dynamic global coordinate system rotation flag indicates 0, the metadata may include information on a yaw rotation angle, a pitch rotation angle and a roll rotation angle of the x axis, y axis and z axis of the global coordinate system relative to the common reference coordinate system. The information on the yaw rotation angle, the pitch rotation angle and the roll rotation angle of the x axis, y axis and z axis of the global coordinate system relative to the common reference coordinate system may be signaled based on a syntax element ViewpointGlobalCoordinateSysRotationStruct ( ), for example.

In an embodiment, when the dynamic global coordinate system rotation flag indicates 1, metadata about a sample that refers to the sample entry may include information on a yaw rotation angle, a pitch rotation angle and a roll rotation angle of the x axis, y axis and z axis of the global coordinate system relative to a common reference coordinate system related to the sample.

In an embodiment, a plurality of viewpoints may be categorized into at least one viewpoint group and the metadata may include viewpoint group structure information of each of the at least one viewpoint group.

In the specification, "first viewpoint group" and "second viewpoint group" arbitrarily define viewpoint groups included in 360 video data and thus those skilled in the art may easily understand that the viewpoint groups do not represent previously defined viewpoint groups or the ordinal numbers indicating the viewpoint groups do not have special meanings.

In an embodiment, the at least one viewpoint group may include a first viewpoint group and a second viewpoint group, and when the viewpoint group including the dynamic viewpoint is changed from the first viewpoint group to the second viewpoint group, the 360-degree video data processing method is based on viewpoint group structure information on the second viewpoint group. In an example, the metadata may include a viewpoint group structure information flag that indicates whether viewpoint group structure information is changed, and the viewpoint group structure information flag may be represented as dynamic_vwpt_group_flag, for example.

In an embodiment, the viewpoint group structure information includes at least one of information on an ID of an anchor viewpoint of a viewpoint group, information on whether viewpoints included in the viewpoint group are contiguous, and information on the number of viewpoints included in the viewpoint group.

The 360-degree video transmission apparatus according to an embodiment may encode information on the 2-dimensional picture (S1830). More specifically, the data encoder of the 360-degree video transmission apparatus may encode information on the 2-dimensional picture In an embodiment, the 360-degree video transmission apparatus may encapsulate the information on the 2-dimensional picture based on the metadata (Step S1840). More specifically, the encapsulation processor of the 360-degree video transmission apparatus may encapsulate the information on the 2-dimensional picture based on the metadata.

According to the 360-degree video transmission apparatus and the operation method of the 360-degree video transmission apparatus shown in FIGS. 18 and 19, the 360-degree video transmission apparatus according to an embodiment may obtain 360-degree video data (S1800), derive a 2-dimensional picture including an omnidirectional image by processing the 360-degree video data (S1810), generate metadata about the 360-degree video data (S1820), encode information on the 2-dimensional picture (S1830), and perform encapsulation based on the information on the 2-dimensional picture and the metadata (S1840). Here, the metadata includes the dynamic global coordinate system rotation flag that indicates whether relative rotation angles between a common reference coordinate system of a dynamic viewpoint and a global coordinate system are changed. Accordingly, it is possible to effectively signal the dynamic global coordinate system rotation flag that indicates whether relative rotation angles between a common reference coordinate system of a dynamic viewpoint and a global coordinate system are changed.

Figure 20:
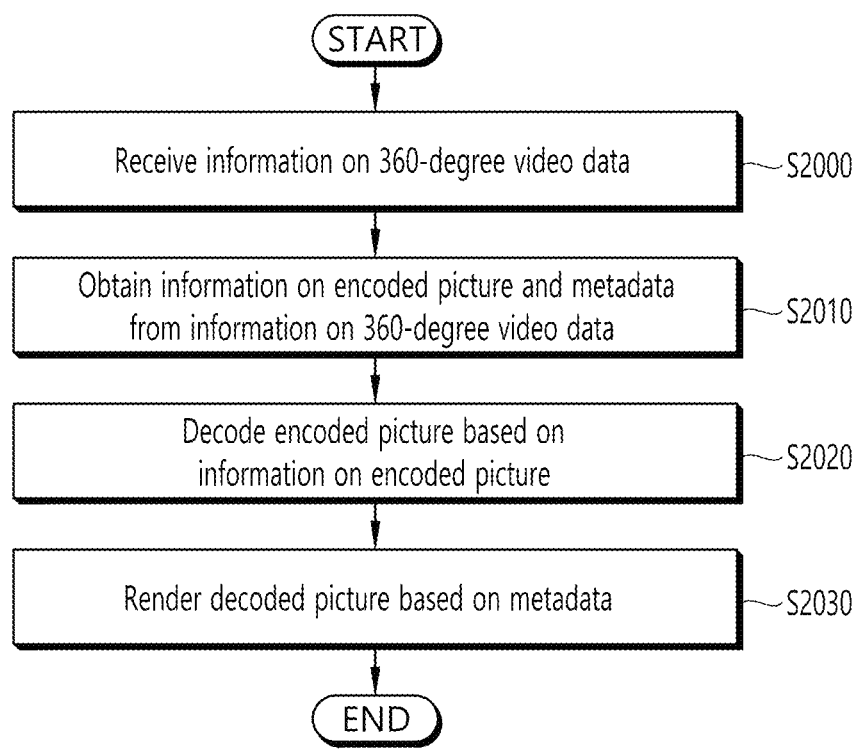
FIG. 20 is a flowchart illustrating an operation method of a 360-degree video reception apparatus according to an embodiment.
Figure 21:
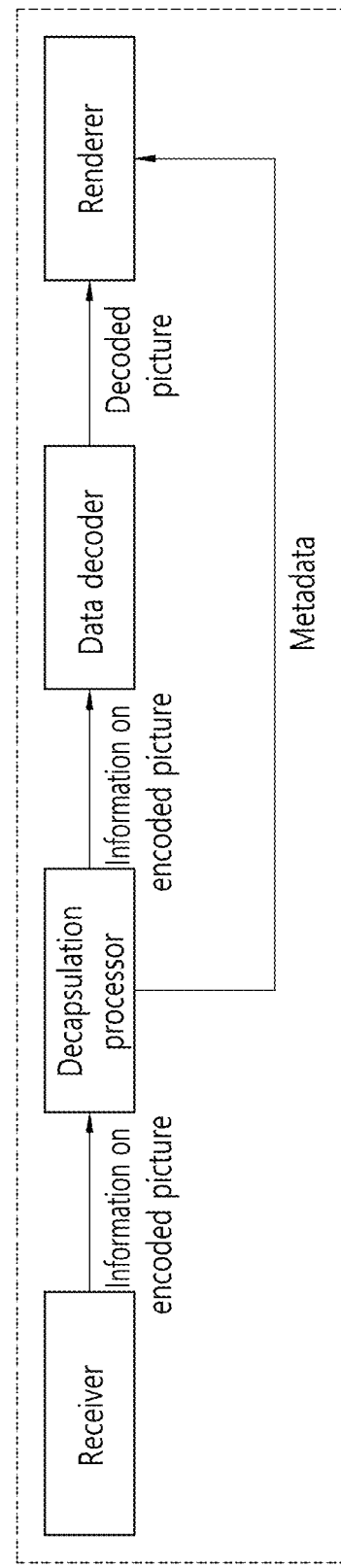
FIG. 21 is a block diagram illustrating a configuration of the 360-degree video reception apparatus according to an embodiment.

FIG. 20 is a flowchart illustrating an operation method of a 360-degree video reception apparatus according to an embodiment and FIG. 21 is a block diagram illustrating a configuration of the 360-degree video reception apparatus according to an embodiment.

The 360-degree video reception apparatus and the operation method thereof shown in FIGS. 20 and 21 may partially correspond to the 360-degree video transmission apparatus and the operation method thereof shown in FIGS. 18 and 19. Accordingly, description of the same operations may be simplified or omitted.

Each step shown in FIG. 20 may be performed by the 360 video reception apparatus shown in FIG. 6, the 360 video reception apparatus shown in FIG. 14*b*, the FLUS sink shown in FIG. 15 or the 360-degree video reception apparatus shown in FIG. 21. In an example, S2000 of FIG. 20 may be performed by the receiver of the 360 video reception apparatus shown in FIG. 6, S2010 of FIG. 20 may be performed by the decapsulation processor of the 360 video reception apparatus shown in FIG. 6, S2020 of FIG. 20 may be performed by the data decoder of the 360 video reception apparatus shown in FIG. 6, and S2030 of FIG. 20 may be performed by the renderer shown in FIG. 6. Accordingly, in description of the steps of FIG. 20, description of the same parts as those in FIGS. 6, 14*b* and 15 will be omitted or simplified.

As shown in FIG. 21, the 360-degree video reception apparatus according to an embodiment may include a receiver, a decapsulation processor, a data decoder and a renderer. However, all components shown in FIG. 21 may not be prerequisites of the 360-degree video reception apparatus and the 360-degree video reception apparatus may be realized by more or fewer components than those shown in FIG. 21.

In the 360-degree video reception apparatus according to an embodiment, the receiver, the decapsulation processor, the data decoder and the renderer may be realized by separate chips or at least two components may be realized by one chip.

The 360-degree video reception apparatus according to an embodiment may receive information on 360-degree video data (S2000). More specifically, the receiver of the 360-degree video reception apparatus may receive information on 360-degree video data.

In an embodiment, the 360-degree video reception apparatus may receive information on 360-degree video data from a 360-degree video transmission apparatus, and the information on 360-degree video data may include a file derived by performing encapsulation based on information on a picture encoded in the 360-degree video transmission apparatus and metadata about the 360-degree video data, for example. However, examples are not limited thereto.

The 360-degree video reception apparatus according to an embodiment may obtain information on the encoded picture and the metadata from the information on the 360-degree video data (S2010). More specifically, a reception processor, a metadata parser or the decapsulation processor of the 360-degree video reception apparatus may obtain the information on the encoded picture and the metadata from the information on the 360-degree video data.

In an embodiment, the metadata may include a dynamic global coordinate system rotation flag which indicates whether relative rotation angles between a common reference coordinate system of a dynamic viewpoint and a global coordinate system are changed.

In an example, the dynamic global coordinate system rotation flag may be represented as dynamic_gcs_rotated_flag.

In an embodiment, the dynamic global coordinate system rotation flag relates to sample entry, and the relative rotation angles between the common reference coordinate system of the dynamic viewpoint and the global coordinate system remain unchanged in samples that refer to the sample entry when the dynamic global coordinate system rotation flag indicates 0.

In an embodiment, when the dynamic global coordinate system rotation flag indicates 0, the metadata may include information on a yaw rotation angle, a pitch rotation angle and a roll rotation angle of the x axis, y axis and z axis of the global coordinate system relative to the common reference coordinate system. The information on the yaw rotation angle, the pitch rotation angle and the roll rotation angle of the x axis, y axis and z axis of the global coordinate system relative to the common reference coordinate system may be signaled based on a syntax element ViewpointGlobalCoordinateSysRotationStruct ( ), for example.

In an embodiment, when the dynamic global coordinate system rotation flag indicates 1, metadata about a sample that refers to the sample entry may include information on a yaw rotation angle, a pitch rotation angle and a roll rotation angle of the x axis, y axis and z axis of the global coordinate system relative to a common reference coordinate system related to the sample.

In an embodiment, a plurality of viewpoints may be categorized into at least one viewpoint group and the metadata may include viewpoint group structure information of each of the at least one viewpoint group.

In an embodiment, the at least one viewpoint group may include a first viewpoint group and a second viewpoint group, and when the viewpoint group including the dynamic viewpoint is changed from the first viewpoint group to the second viewpoint group, the 360-degree video data processing method is based on viewpoint group structure information on the second viewpoint group. In an example, the metadata may include a viewpoint group structure information flag that indicates whether viewpoint group structure information is changed, and the viewpoint group structure information flag may be represented as dynamic_vwpt_group_flag, for example.

In an embodiment, the viewpoint group structure information includes at least one of information on an ID of an anchor viewpoint of a viewpoint group, information on whether viewpoints included in the viewpoint group are contiguous, and information on the number of viewpoints included in the viewpoint group.

In an embodiment, the 360-degree video data reception apparatus may communicate with at least one of a mobile terminal, a network and an self-driving vehicle.

The 360-degree video reception apparatus according to an embodiment may decode a picture based on the information on the encoded picture (S2020). More specifically, the data decoder of the 360-degree video reception apparatus may decode the picture based on the information on the encoded picture.

The 360-degree video reception apparatus according to an embodiment may render the decoded picture based on the metadata (S2030). More specifically, the renderer of the 360-degree video reception apparatus may render the decoded picture based on the metadata.

According to the 360-degree video reception apparatus and the operation method of the 360-degree video reception apparatus shown in FIGS. 20 and 21, the 360-degree video reception apparatus according to an embodiment receive information on 360-degree video data (S2000), obtain information on an encoded picture and metadata from the information on the 360-degree video data (S2010), decode a picture based on the information on the encoded picture (S2020), and render the decoded picture based on the metadata (S2030). Here, the metadata includes the dynamic global coordinate system rotation flag that indicates whether relative rotation angles between a common reference coordinate system of a dynamic viewpoint and a global coordinate system are changed. Accordingly, it is possible to effectively signal the dynamic global coordinate system rotation flag that indicates whether relative rotation angles between a common reference coordinate system of a dynamic viewpoint and a global coordinate system are changed.

The above-described embodiments of the present invention are applicable to VR and AR. The above-described embodiments of the present invention may be realized based on a chipset described below.

Figure 22:
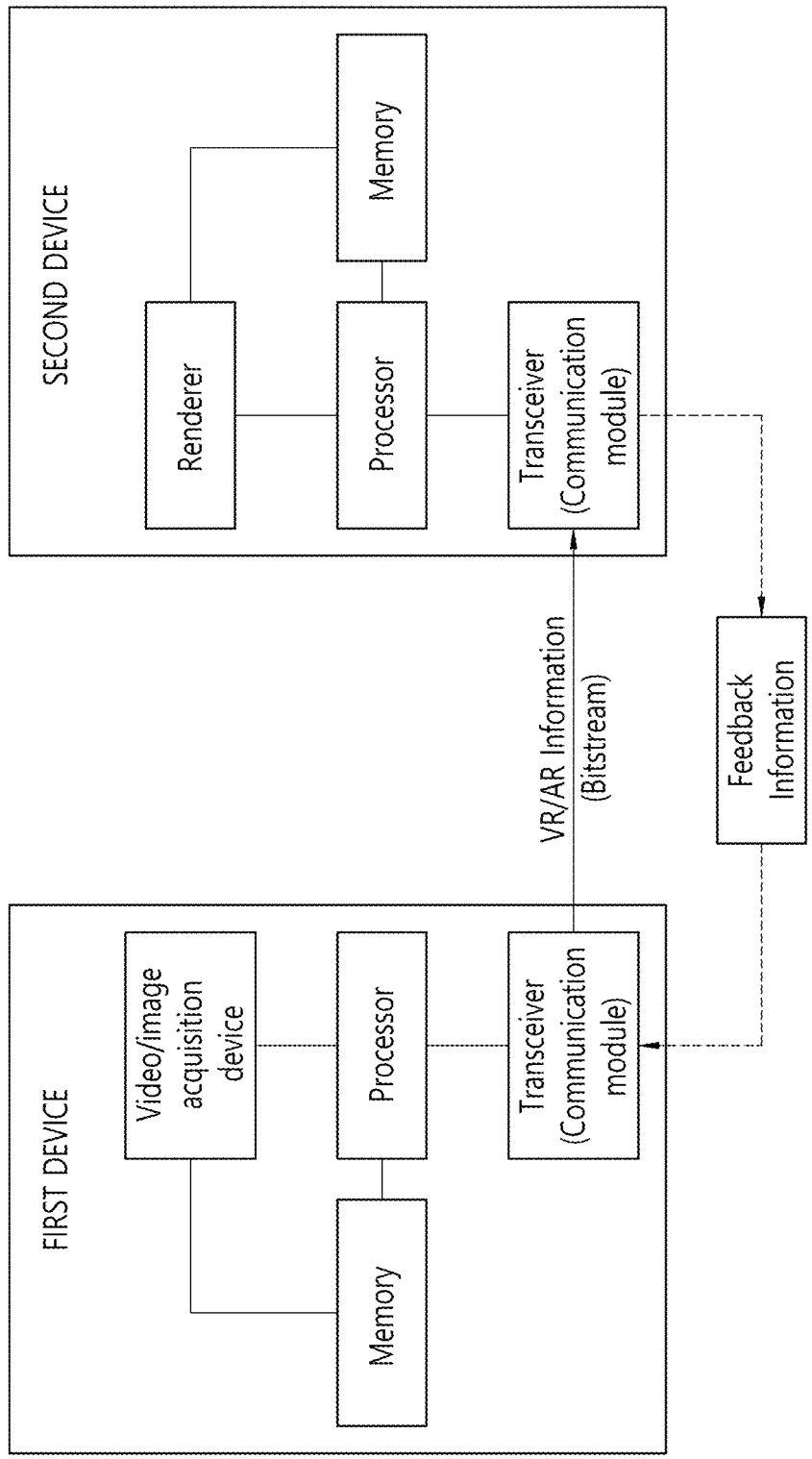
FIG. 22 exemplarily shows devices which may support embodiments of the present invention.

FIG. 22 exemplarily shows devices for supporting the embodiments of the present invention. For example, the first device may include a transmission apparatus (e.g., 360 video transmission apparatus) and the second device may include a reception apparatus (e.g., 360 video reception apparatus).

The technical features of the specification with respect to the above-described transmission apparatus and reception apparatus may be applied to this embodiment.

For example, the first device may include a processor, a memory, a video/image acquisition device and a transceiver. The processor may be configured to perform proposed functions, procedures and/or methods described in the specification. For example, the processor may be configured to control and/or perform the above-described procedures such as stitching, projection, (region-wise) packing, composition, (video/image) encoding, metadata generation and processing. The processor may be configured to control and/or perform a 360 video/image acquisition procedure and a procedure for encapsulation and transmission of VR/AR information (e.g., 360 video/image data and the like). The processor may control composition and transmission of the metadata described in the embodiments of the present invention. The memory is operatively connected to the processor and stores various types of information for operating the processor. The transceiver is operatively connected to the processor and transmits and/or receives wired/wireless signals.

In addition, the second device may include a processor, a memory, a transceiver and a renderer, for example. The renderer may be omitted and an external device may be provided. The processor may be configured to perform proposed functions, procedures and/or methods described in the specification. For example, the processor may be configured to control and/or perform the above-described procedures such as metadata acquisition and processing, (video/image) decoding, (region-wise) unpacking, selection, composition, re-projection and rendering. The processor may be configured to control and/or perform a procedure for decapsulation and reception of VR/AR information (e.g., 360 video/image data and the like). The processor may control composition and transmission of the metadata described in the embodiments of the present invention. The memory is operatively connected to the processor and stores various types of information for operating the processor. The transceiver is operatively connected to the processor and transmits and/or receives wired/wireless signals.

In the specification, the processor may include an application-specific integrated circuit (ASIC), other chipsets, a logic circuit and/or a data processing device. The memory may include a read-only memory (ROM), a random access memory (RAM)), a flash memory, a memory card, a storage medium and/or other storage devices. The transceiver may include a baseband circuit for processing RF signals. When an embodiment is realized by software, techniques described in the specification may be realized by modules (e.g., procedures, functions, and the like) which execute the functions described in the specification. The modules may be stored in the memory and executed by the processor. The memory may be realized in the processor. Alternatively, the memory may be realized outside the processor and connected to the processor such that it may communicate with the processor through various means known in the art.

The first device may be a base station, a network node, a transmission terminal, a reception terminal, a wireless device, a wireless communication device, a vehicle, a vehicle having an automated traveling function, a connected car, an unmanned aerial vehicle (UAV), an artificial intelligence (AI) module, a robot, an augmented reality (AR) device, a virtual reality (VR) device, a mixed reality (MR) device, a hologram device, a public safety device, an MTC device, an IoT device, medical equipment, a FinTech device (or a financial device), a safety device, a weather/environment device, a device related to 5G service, or a device related to the fourth industrial revolution.

The second device may be a base station, a network node, a transmission terminal, a reception terminal, a wireless device, a wireless communication device, a vehicle, a vehicle having an automated traveling function, a connected car, an unmanned aerial vehicle (UAV), an artificial intelligence (AI) module, a robot, an augmented reality (AR) device, a virtual reality (VR) device, a mixed reality (MR) device, a hologram device, a public safety device, an MTC device, an IoT device, medical equipment, a FinTech device (or a financial device), a safety device, a weather/environment device, a device related to 5G service, or a device related to the fourth industrial revolution.

For example, terminals may include a cellular phone, a smart phone, a laptop computer, a digital broadcast terminal, personal digital assistants (PDA), a portable multimedia player (PMP), a navigation device, a slate PC, a tablet PC, an ultrabook, and wearable devices (e.g., a smartwatch, a smart glass, a head mounted display (HMD), etc.). For example, the HMD may be a display device put on the head of a user. For example, the HMD may be used to realize VR, AR or MR.

For example, the UAV may be an air vehicle flying without a person according to a wireless control signal. For example, the VR device may include a device that realizes objects and backgrounds of virtual worlds. For example, the AR device may include a device that connects objects or backgrounds of a virtual world to objects or backgrounds of a real world. For example, the MR device may include a device that fuses objects or backgrounds of a virtual world with objects or backgrounds of a real world. For example, the hologram device may include a device that records and reproduces three-dimensional information to realize a 360-degree three-dimensional image using interference of light occurring when two laser beams meet, called holography. For example, the public safety device may include an image relay device, an image device that may be put on the body of a user, or the like. For example, the MTC device and the IoT device may be devices that do not require direct intervention or operation of a person. For example, the MTC device and the IoT device may include a smart meter, a vending machine, a thermometer, a smart lamp, a door lock, various sensors, etc. For example, the medical equipment may be a device used for the purpose of diagnosing, treating, mitigating, handling or preventing a disease. For example, the medical equipment may be a device used for the purpose of diagnosing, treating, mitigating or correcting an injury or a disorder. For example, the medical equipment may be a device used for the purpose of checking, replacing or modifying a structure or a function. For example, the medical equipment may be a device used for birth control. For example, the medical equipment may include a device for medical treatment, a device for surgery, an (in vitro) diagnostic device, a hearing aid, a device for treatment, etc. For example, the security device may be a device provided to avert risk that may occur and maintain safety. For example, the safety device may be a camera, a CCTV, a recorder or a black box. For example, the FinTech device may be a device that may provides financial services such as mobile payment. For example, the FinTech device may include a payment device, a point of sales (POS) device, or the like. For example, the weather/environment device may include a device that monitors or predicts weather/environment.

The first device and/or the second device may have one or more antennas. For example, the antenna may be configured to transmit and receive wireless signals.

The above-described technique features according to the present invention may be applied to various services such as VR/AR. In addition, the above-described technique features according to the present invention may be performed through fifth generation (5G) or next-generation communication. For example, data (including video/image bitstreams, metadata, and the like, for example) output from a transmission apparatus (e.g., 360 video transmission apparatus) may be transmitted to a reception apparatus (e.g., 360 video reception apparatus) through 5G communication. Furthermore, a (VR/AR) image/video acquisition device may be separately provided to transmit an image/video acquired through 5G communication to the transmission apparatus. Moreover, the transmission apparatus and/or the reception apparatus according to the present invention may support various service scenarios through 5G communication.

Figure 23:
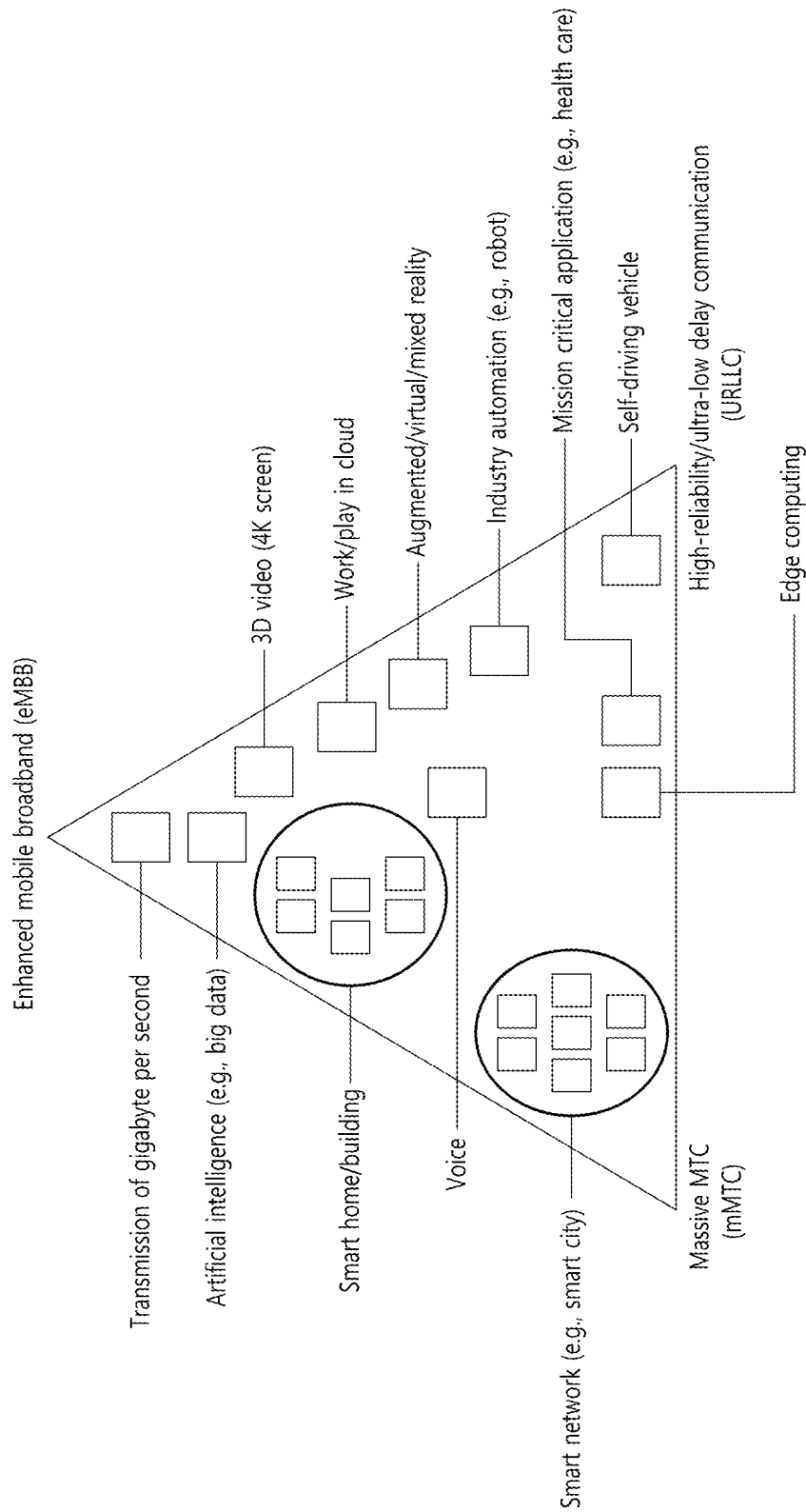
FIG. 23 shows an example of a 5G usage scenario to which the technical features of the present invention are applicable.

FIG. 23 shows an example of a 5G usage scenario to which the technical features of the present invention are applicable. The 5G usage scenario illustrated here is merely an example and the technical features of the present invention may also be applied to other 5G usage scenarios that are not illustrated.

Referring to FIG. 23, three main requirement domains include (1) an enhanced mobile broadband (eMBB) domain, (2) a massive machine type communication (mMTC) domain and (3) an ultra-reliable and low latency communications (URLLC) domain. Some usage examples may require multiple domains and other usage examples may focus only on one key performance indicator (KPI). 5G supports such various usage examples through flexible and reliable methods.

The eMBB focuses on overall enhancement of data rate, delay, user density, mobile broadband access capacity and coverage. The eMBB aims at a throughput of about 10 Gbps. The eMBB surpasses basic mobile Internet access and covers abundant interactive operations and media and entertainment applications in cloud or augmented reality. Data is one of kernel power of 5G, and dedicated voice services may not be seen in 5G era. In 5G, voice is expected to be processed as an application program using data connection simply provided by a communication system. A main cause of increased traffic is increase in content sizes and increase in the number of applications which require a high data transfer rate. Streaming services (audio and video) and interactive video and mobile Internet connection will be used more widely as a larger number of devices are connected to the Internet. Such a large amount of applications require connection that is always on in order to push real-time information and notification. Cloud storage and application rapidly increase in a mobile communication platform and may be applied to both business and entertainment. The cloud storage is a special usage example that drives the growth of an uplink data transfer rate. 5G is also used for remote works on the cloud and requires much lower end-to-end delay such that excellent user experience is maintained when a tactile interface is used. Cloud game and video streaming, for example, in entertainment is another key element that increases demand for mobile broadband capability. Entertainment is necessary for smart phones and tablets in any place including high mobility environments such as trains, cars and aircrafts. Another usage example is augmented reality and information search for entertainment. Here, augmented reality requires very low delay and instantaneous data quantity.

The mMTC is designed to facilitate communication between a large amount of low-cost devices driven by batteries and supports applications such as smart metering, distribution, fields and body sensors. The mMTC aims at a battery having durability of about ten years and about a million devices per 1 km². The mMTC allows smooth connection of embedded sensors in all fields and is an example of most expected 5G usage examples. Potentially, the number of IoT devices is predicted to reach 20.4 billion until 2020. Industrial IoT is one of domains in which 5G performs a key role for facilitating smart city, asset tracking, smart utility and agricultural and safety infrastructure.

The URLLC causes devices and machines to perform communication with considerably high reliability and very low delay and high availability and thus is ideal for vehicle communication, industry control, factory automation, remote operation, smart grid and public safety applications. The URLLC aims at a delay of about 1 ms. The URLLC includes new services which will change industry through remote control of major infrastructure and super-reliable/low-delay links such as self-driving vehicles. A certain level of reliability and delay is essential for smart grid control, industry automation, robot engineering, and unmanned aerial vehicle control and adjustment.

Next, a plurality of usage examples included in the triangle of FIG. 23 will be described in more detail.

5G is a means for providing streams estimated as several hundred megabits per second to gigabits per second and may complement fiber-to-the-home (FTTH) and cable based broadband (or DOCSIS). Such a high speed may be required to deliver TV content in resolution of 4K or higher (6K, 8K and more) as well as virtual reality (VR) and augmented reality (AR). VR and AR applications include almost immersive sports games. A specific application may require special network settings. For example, in the case of a VR game, a game company may need to integrate a core server with an edge network server of a network operator in order to minimize delay.

Automotive is expected to become important new power in 5G along with many usage examples for mobile communication for vehicles. For example, entertainment for passengers simultaneously requires high capacity and high mobile broadband. This is because future users continuously expect high-quality connection irrespective of their locations and speeds. Another usage example in the automotive field is an augmented reality dashboard. A driver may identify an object overlaid on the front windshield in the dark through the augmented reality dashboard. The augmented reality dashboard displays information on a distance and motion of an object which will be notified of by a driver in an overlay manner. In the future, a wireless module facilitates communication between vehicles, information exchange between a vehicle and supported infrastructure and information exchange between a vehicle and another connected device (e.g., a device carried by a pedestrian). A safety system performs guidance of an alternative course of a behavior such that a driver may perform further safe driving to lower danger of accident. The next step will be a remote controlled vehicle or an self-driving vehicle. This requires very reliable and rapid communication between different self-driving vehicles and/or between a vehicle and infrastructure. In the future, self-driving vehicles will perform all driving activities and drivers will concentrate only on traffic abnormality that cannot be identified by vehicles. Technical requirements of self-driving vehicles are ultra-low delay and ultra-high reliability such that traffic safety increases to a level that cannot be accomplished by humans.

Smart city and smart home mentioned as a smart society will be embedded in a high density wireless sensor network. Distributed networks of intelligent sensors will identify conditions with respect to cost- and energy-effective maintenance of a city or home. Similar settings may be performed for each home. A temperature sensor, a window and heating controller, a security system and home appliances are connected in a wireless manner. Most of such sensors typically require a low data transfer rate, low power and low cost. However, real-time HD video, for example, may be required by a specific type device for monitoring.

Consumption and distribution of energy including heat and gas are highly dispersed and thus automated control of a dispersed sensor network is required. A smart grid collects information and connects such sensors using digital information and communication technology such that the sensors operate according to the collected information. Since this information may include behaviors of providers and consumers, the smart grid may enhance distribution of fuel such as electricity according to efficiency, reliability, economical efficiency, sustainability of production and automation. The smart grid may be regarded as another sensor network with a low delay.

Health field has many applications which may receive the benefit of mobile communication. Communication systems may support remote diagnosis which provides remote clinical treatment. This may aid in lowering a barrier to distance and enhance access to medical services that cannot be continuously used in remote rural areas. Furthermore, this is used to save lives in important treatment and emergency. Mobile communication based wireless sensor networks may provide remote monitoring and sensors for parameters such as a heart rate and a blood pressure.

Wireless and mobile communication becomes important in industry application fields. Wiring requires high installation and maintenance costs. Accordingly, possibility of change to wireless links which may reconfigure cables is an attractive opportunity in many industry fields. To accomplish this, however, operation of wireless connection with delay, reliability and capacity similar to those of cables and simplification of management thereof are required. Low delay and very low error probability are new requirements that need to be connected to 5G.

Logistic cargo tracking is an important usage example with respect to mobile communication that facilitates inventory and package tracking in any place using a location-based information system. Usage examples of logistic cargo tracking typically require a low data rate, but a wide range and reliable location information are necessary.

In addition, embodiments according to the present invention may be performed in order to support extended reality (XR). XR is the general term for virtual reality (VR), augmented reality (AR) and mixed reality (MR). VR technology provides objects or backgrounds of the real world as only CG images, AR technology provides virtually generated CG images overlaid on an actual object image, and MR technology is a computer graphic technique of mixing and combining virtual objects and providing the mixed and combined virtual objects to the real world.

The MR technology is similar to the AR technology in that a real object and a virtual object are displayed together. However, a virtual object is used in such a manner that it complements a real object in the AR technology, whereas a virtual object and a real object are equally used in the MR technology.

XR technology is applicable to a head-mount display (HMD), a head-op display (HUD), a cellular phone, a tablet PC, a laptop computer, a desktop computer, TV, digital signage, etc., and a device to which the XR technology is applied may be called an XR device. An XR device may include the above-described first device and/or second device.

The XR device may be connected to various services through communication networks based on 5G communication.

Figure 24:
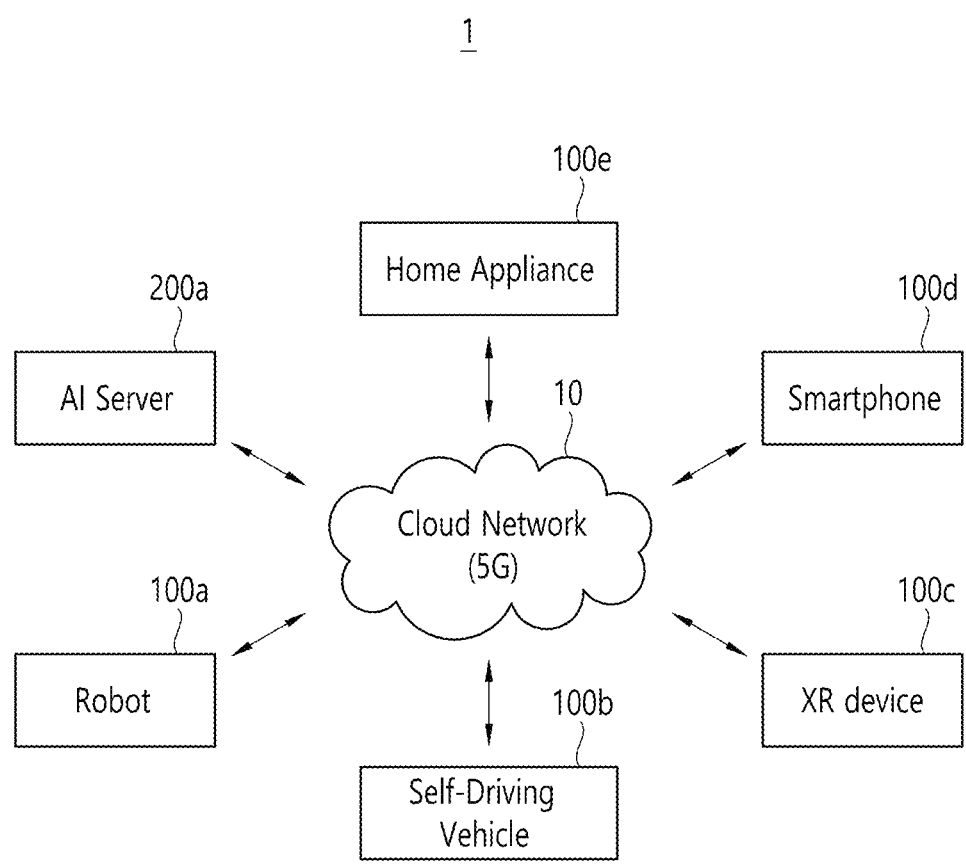
FIG. 24 is a service system according to an embodiment of the present invention.

FIG. 24 shows a service system according to an embodiment of the present invention.

Referring to FIG. 24, an XR device 100c may be connected to at least one of an AI server 200a, a robot 100a, a self-driving vehicle 100b, a smart phone 100d and a home appliance 100e through a network 10. Here, the robot 100a, the self-driving vehicle 100b, the XR device 100c, the smart phone 100d or the home appliance 100e to which AI technology is applied may be referred to as an AI device.

The network 10 may include wired/wireless communication networks. The network 10 may include a cloud network. The cloud network may refer to a network which constitutes a part of cloud computing infrastructure or exists in the cloud computing infrastructure. Here, the cloud network may be configured using a 3G network, a 4G or LTE (Long Term Evolution) network, a 54G network, or the like.

The devices 100a to 100e and 200a constituting the system 1 may be connected through the cloud network 10. Particularly, the devices 100a to 100e and 200a may communicate through a base station or directly communicate with one another without a base station.

The AI server 200a may include a server that performs AI processing and a server that performs computation with respect to big data.

The AI server 200a may be connected to at least one of the robot 100a, the self-driving vehicle 100b, the XR device 100c, the smart phone 100d and the home appliance 100e through the network 10 and aid in at least part of AI processing of the connected AI devices 100a to 100e.

Here, the AI server 200a may learn an artificial neural network according to a machine learning algorithm in place of the AI devices 100a to 100e and directly store a learning model or transmit the learning model to the AI devices 100a to 100e.

Here, the AI server 200a may receive input data from the AI devices 100a to 100e, infer result values with respect to the received input data using a learning model, generate a response or a control command based on the inferred result values and transmit the response or control command to the AI devices 100a to 100e.

Alternatively, the AI devices 100a to 100e may directly infer result values with respect to input data using a learning model and generate responses or control commands based on the inferred result values.

The XR device 100c may be realized by a head-mount display (HMD), a head-up display (HUD) mounted in a vehicle, a TV, a cellular phone, a smart phone, a computer, a wearable device, a home appliance, a digital signage, a vehicle, a fixed robot, a mobile robot, or the like.

The XR device 100c may acquire information on a surrounding space or a real object by analyzing 3-dimensional point cloud data or image data obtained through various sensors or from an external device to generate position data and attribute data with respect to 3-dimensional points, render an XR object to be output and output the XR object. For example, the XR device may correlate an XR object including additional information on a recognized object with the recognized object and output the XR object.

The XR device 100c may perform the aforementioned operations using a learning model composed of at least one artificial neural network. For example, the XR device 100c may recognize a real object from 3-dimensional point cloud data or image data using the learning model and provide information corresponding to the recognized real object. Here, the learning model may be directly learnt in the XR device 100c or learn in an external device such as the AI server 200a.

Here, although the XR device 100c may directly generate results using the learning model and perform operations, the XR device 100c may transmit sensor information to an external device such as the AI server 200a, receive results generated according thereto and perform operations.

The robot 100a may include a guidance robot, a transport robot, a cleaning robot, a wearable robot, an entertainment robot, a pet robot, an unmanned flight robot, a drone, etc.

The robot 100a may include a robot control module for controlling operations and the robot control module may refer to a software module or a chip that realizes the software module as hardware.

The robot 100a may acquire state information of the robot 100a, detect (recognize) surrounding environments and objects, generate map data, determine moving routes and moving plans, determine a response to a user interaction or determine an operation using sensor information acquired from various types of sensors.

Here, the robot 100a may use sensor information acquired from at least one of a lidar, a radar and a camera in order to determine a moving route and a moving plan.

The XR device 100c may be remotely connected to and/or remotely control the robot 100a through the network 10. In this case, the robot 100a may perform operations or move by sharing the field of vision or a screen with a user who uses the XR device 100c and controlling a driver based on control/interaction of the user. Here, the robot 100a may acquire intention information of an interaction according to operation or voice utterance of the user, determine a response based on the acquired intention information and perform an operation.

The robot 100a to which the XR technology is applied may refer to a robot that is the object of a control/interaction in an XR image. In this case, the robot 100a may be distinguished from the XR device 100c and interoperate therewith. When the robot 100a that is the object of a control/interaction in an XR image acquires sensor information from sensors including a camera, the robot 100a or the XR device 100c may generate an XR image based on the sensor information and the XR device 100c may output the generated XR image. In addition, the robot 100a may operate based on a control signal input through the XR device 100c or an interaction of a user.

For example, the user may check an XR image corresponding to the view of the remotely interoperating robot 100a through an external device such as the XR device 100c and adjust an automatic moving route of the robot 100a, control an operation or movement of the robot 100a or check information on a surrounding object through an interaction.

The self-driving vehicle 100b may include a moving robot, a vehicle, a train, a manned/unmanned flight vehicle, a ship, etc.

The self-driving vehicle 100b may include a self-driving control module for controlling a self-driving function, and the self-driving control module may refer to a software module or a chip that realizes the software module as hardware. Although the self-driving control module may be included in the self-driving vehicle 100b as a component thereof, it may be configured as separate hardware and connected to the self-driving vehicle 100b.

The self-driving vehicle 100b may acquire state information of the self-driving vehicle 100b, detect (recognize) surrounding environments and objects, generate map data, determine moving routes and traveling plans or determine an operation using sensor information acquired from various types of sensors.

Here, the self-driving vehicle 100b may use sensor information acquired from at least one of a lidar, a radar and a camera in order to determine a moving route and a traveling plan like the robot 100a.

Particularly, the self-driving vehicle 100b may recognize an environment or an object with respect to an area that cannot be viewed or an area a predetermined distance or longer therefrom by receiving sensor information from external devices or receiving directly recognized information from external devices.

The XR device 100c may be remotely connected to and/or remotely control the self-driving vehicle 100b through the network 10. In this case, the self-driving vehicle 100b may perform operations or travel by sharing the field of vision or a screen with a user who uses the XR device 100c and controlling a driver based on control/interaction of the user. Here, the robot 100a may acquire intention information of an interaction according to operation or voice utterance of the user, determine a response based on the acquired intention information and perform an operation.

The self-driving vehicle 100b to which the XR technology is applied may refer to a self-driving vehicle including a means for providing XR images or a self-driving vehicle that is the object of a control/interaction in an XR image. Particularly, the self-driving vehicle 100b that is the object of a control/interaction in an XR image may be distinguished from the XR device 100c and interoperate therewith.

The self-driving vehicle 100b including a means for providing XR images may acquire sensor information from sensors including a camera and output an XR image generated based on the acquired sensor information. For example, the self-driving vehicle 100b may provide an XR object corresponding to a real object or an object in an image to a passenger by including an HUD and outputting an XR image.

Here, even when the XR object is output to the HUD, the XR object may be output such that at least a part thereof overlaps with a real object at which a passenger gazes. On the other hand, when an XR object is output to a display included in the self-driving vehicle 100b, the XR object may be output such that at least a part thereof overlaps with an object in an image. For example, the self-driving vehicle 100b may output XR objects corresponding to objects such as roads, other vehicles, traffic lights, traffic signs, two-wheeled vehicles, pedestrians and buildings.

When the self-driving vehicle 100b that is the object of a control/interaction in an XR image acquires sensor information from sensors including a camera, the self-driving vehicle 100b or the XR device 100c may generate an XR image based on the sensor information and the XR device 100c may output the generated XR image. In addition, the self-driving vehicle 100b may operate based on a control signal input through an external device such as the XR device 100c or an interaction of a user.

The XR device 100c may be included in the robot 100a and/or the self-driving vehicle 100b to provide separate XR content to a user or provide images of the inside/outside of the robot 100a and/or the self-driving vehicle 100b to the user.

The XR device 100c may be used for various services such as entertainment, exercise, education, traffic, medical treatment, e-commerce, manufacture, and national defense. For example, a user may experience and/or watch movies, theme parks and sports through the XR device 100c, and medical care training, training in dangerous environments such as a fire site, and the like may be supported through the XR device 100c. Furthermore, pathfinding services such as AR Ways using simultaneous localization and mapping (SLAM) may be provided and a user may access a virtual shopping mall, shop articles and purchase products through the XR device 100c.

Each part, module or unit described above may be a processor or a hardware part that is stored in a memory (or a storage unit) and performs consecutive processes. Each step described in the aforementioned embodiments may be performed by a processor or hardware parts. Each module/block/unit described in the aforementioned embodiments may operate as hardware/processors. In addition, the methods proposed by the present invention may be realized by code. This code may be written in a processor-readable storage medium and thus may be read by a processor provided by the apparatus.

In the above-described embodiments, although the methods have been described based on the flowcharts using a series of the steps or blocks, the present invention is not limited to the sequence of the steps, and some steps may be performed at different sequences from the above-described steps or may be performed simultaneously with the steps. Furthermore, those skilled in the art will understand that the steps shown in the flowcharts are not exclusive and may include other steps or one or more steps of the flowcharts may be deleted without affecting the scope of the present invention.

When the embodiments are realized by software in the present invention, the above-described methods may be realized by a module (a process, a function, etc.) that perform the above-described functions. The module may be stored in a memory and executed by a processor. The memory may be provided inside or outside the processor and connected to the processor through various known means. The processor may include an application-specific integrated circuit (ASIC), other chipsets, a logic circuit and/or a data processing apparatus. The memory may include a read-only memory (ROM), a random access memory (RAM), a flash memory, a memory card, a storage medium and/or other storage devices.

Internal components of the above-described apparatuses may be processors that execute consecutive processes stored in a memory or hardware components configured as hardware. These components may be provided inside/outside the apparatuses.

The above-described modules may be omitted or replaced by other modules that perform similar/identical operations according to embodiments.

What is claimed is:

1. A 360-degree video data processing method performed by a 360-degree video reception apparatus, the method comprising:
receiving 360-degree video data and metadata for the 360-degree video data;
decapsulating the 360-degree video data and the metadata;
decoding the 360-degree video data; and rendering the 360-degree video data based on the metadata,
wherein the metadata includes a timed metadata track including a dynamic global coordinate system rotation flag for a sample entry representing whether yaw, pitch and roll rotation angles of x-axis, y-axis, and z-axis, respectively, of a global coordinate system of a viewpoint relative to a common reference coordinate system are dynamically changed over time,
in response to a value of the dynamic global coordinate system rotation flag being 0, the yaw, pitch and roll rotation angles of x-axis, y-axis, and z-axis, respectively, of the global coordinate system of the viewpoint relative to the common reference coordinate system remain unchanged in samples referring to the sample entry,
in response to a value of the dynamic global coordinate system rotation flag is-being 1, the metadata further includes viewpoint rotation information including information on yaw, pitch and roll rotation angles of x-axis, y-axis, and z-axis, respectively, of the global coordinate system relative to the common reference coordinate system for each sample referring to the sample entry.

2. The method of claim 1, wherein when the value of the dynamic global coordinate system rotation flag is 0, the metadata comprises information on yaw, pitch and roll rotation angles of x-axis, y-axis, and z-axis, respectively, of the global coordinate system relative to the common reference coordinate system.

3. The method of claim 1, wherein viewpoints comprised in the 360-degree video data are categorized into at least one viewpoint group, and
wherein the metadata comprises viewpoint group structure information of each of the at least one viewpoint group.

4. The method of claim 3, wherein the at least one viewpoint group comprises a first viewpoint group and a second viewpoint group, and
wherein when a viewpoint group comprising the dynamic viewpoint is changed from the first viewpoint group to the second viewpoint group, the 360-degree video data processing method is based on viewpoint group structure information for the second viewpoint group.

5. The method of claim 3, wherein the viewpoint group structure information comprises at least one of information on an ID of an anchor viewpoint of a viewpoint group, information representing whether viewpoints included in the viewpoint group are contiguous, and information on the number of viewpoints included in the viewpoint group.

6. A 360-degree video data processing method performed by a 360-degree video transmission apparatus, the method comprising:
obtaining 360-degree video data;
generating metadata for the 360-degree video data;
encoding the 360-degree video data; and
encapsulating the 360-degree video data and the metadata,
wherein the metadata includes a timed metadata track including a dynamic global coordinate system rotation flag for a sample entry representing whether yaw, pitch and roll rotation angles of x-axis, y-axis, and z-axis, respectively, of a global coordinate system of a viewpoint relative to a common reference coordinate system are dynamically changed over time,
in response to a value of the dynamic global coordinate system rotation flag being 0, the yaw, pitch and roll rotation angles of x-axis, y-axis, and z-axis, respectively, of the global coordinate system of the viewpoint relative to the common reference coordinate system remain unchanged in samples referring to the sample entry,
in response to a value of the dynamic global coordinate system rotation flag being 1, the metadata further includes viewpoint rotation information including information on yaw, pitch and roll rotation angles of x-axis, y-axis, and z-axis, respectively, of the global coordinate system relative to the common reference coordinate system for each sample referring to the sample entry.

7. The method of claim 6, wherein when the value of the dynamic global coordinate system rotation flag is 0, the metadata comprises information on yaw, pitch and roll rotation angles of x-axis, y-axis, and z-axis, respectively, of the global coordinate system relative to the common reference coordinate system.

8. The method of claim 6, wherein a plurality of viewpoints are categorized into at least one viewpoint group, and
wherein the metadata comprises viewpoint group structure information of each of the at least one viewpoint group.

9. The method of claim 8, wherein the at least one viewpoint group comprises a first viewpoint group and a second viewpoint group, and
wherein when a viewpoint group comprising the dynamic viewpoint is changed from the first viewpoint group to the second viewpoint group, the 360-degree video data processing method is based on viewpoint group structure information for the second viewpoint group.

10. The method of claim 1, wherein the 360-degree video data reception apparatus communicates with at least one of a mobile terminal, a network and a self-driving vehicle.

11. A 360-degree video reception apparatus for processing 360-degree video data, the apparatus comprising:
a receiver configured to receive 360-degree video data and metadata for the 360-degree video data;
a decapsulator configure to decapsulate the 360-degree video data and the metadata;
a data decoder configured to decode the 360-degree video data; and
a renderer configured to render the 360-degree video data based on the metadata,
wherein the metadata includes a timed metadata track including a dynamic global coordinate system rotation flag for a sample entry representing whether yaw, pitch and roll rotation angles of x-axis, y-axis, and z-axis, respectively, of a global coordinate system of a viewpoint relative to a common reference coordinate system are dynamically changed over time,
in response to a value of the dynamic global coordinate system rotation flag being 0, the yaw, pitch and roll rotation angles of x-axis, y-axis, and z-axis, respectively, of the global coordinate system of the viewpoint relative to the common reference coordinate system remain unchanged in samples referring to the sample entry,
in response to a value of the dynamic global coordinate system rotation flag being 1, the metadata further includes viewpoint rotation information including information on yaw, pitch and roll rotation angles of x-axis, y-axis, and z-axis, respectively, of the global coordinate system relative to the common reference coordinate system for each sample referring to the sample entry.

\* \* \* \* \*